(12) United States Patent
Chen et al.

(10) Patent No.: US 10,127,477 B2
(45) Date of Patent: Nov. 13, 2018

(54) DISTRIBUTED EVENT PREDICTION AND MACHINE LEARNING OBJECT RECOGNITION SYSTEM

(71) Applicant: SAS Institute Inc., Cary, NC (US)

(72) Inventors: Xu Chen, Apex, NC (US); Tao Wang, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/686,863

(22) Filed: Aug. 25, 2017

(65) Prior Publication Data

US 2018/0053071 A1    Feb. 22, 2018

Related U.S. Application Data

(63) Continuation-in-part of application No. 15/335,530, filed on Oct. 27, 2016, now Pat. No. 9,792,562.

(60) Provisional application No. 62/325,668, filed on Apr. 21, 2016, provisional application No. 62/471,335, filed on Mar. 14, 2017, provisional application No. 62/545,923, filed on Aug. 15, 2017.

(51) Int. Cl.
| | |
|---|---|
| *G06N 5/00* | (2006.01) |
| *G06K 9/62* | (2006.01) |
| *G06N 99/00* | (2010.01) |
| *G06K 9/66* | (2006.01) |
| *G06N 3/04* | (2006.01) |
| *G06F 9/48* | (2006.01) |

(52) U.S. Cl.
CPC ............ *G06K 9/6264* (2013.01); *G06F 9/48* (2013.01); *G06K 9/627* (2013.01); *G06K 9/6259* (2013.01); *G06K 9/66* (2013.01); *G06N 3/0454* (2013.01); *G06N 5/003* (2013.01); *G06N 99/005* (2013.01)

(58) Field of Classification Search
CPC ...................................................... G06N 5/003
USPC ......................................................... 706/46
See application file for complete search history.

(56) References Cited

U.S. PATENT DOCUMENTS 8,620,842 B1 * 12/2013  Cormack ............. G06N 99/005
                                                              706/12

OTHER PUBLICATIONS

Zhu et al ("Combining Active Learning and Semi-Supervised Learning Using Gaussian Fields and Harmonic Functions" 2003.*
Zhou et al ("Learning with Local and Global Consistency" 2004).*

(Continued)

*Primary Examiner* — Lut Wong
(74) *Attorney, Agent, or Firm* — Bell & Manning, LLC

(57) ABSTRACT

A computing device predicts occurrence of an event or classifies an object using distributed unlabeled data. Supervised data that includes a labeled subset of a plurality of observation vectors is identified. A total number of threads that will perform labeling of an unlabeled subset of the plurality of observation vectors is determined. The identified supervised data is uploaded to each thread of the total number of threads. Unlabeled observation vectors are randomly select from the unlabeled subset of the plurality of observation vectors to allocate to each thread of the total number of threads. The randomly selected, unlabeled observation vectors are uploaded to each thread of the total number of threads based on the allocation. The value of the target variable for each observation vector of the unlabeled subset of the plurality of observation vectors is determined based on a converged classification matrix and output to a labeled dataset.

29 Claims, 25 Drawing Sheets

(56) References Cited

OTHER PUBLICATIONS

SAS Institute Inc. 2017. SAS® Visual Data Mining and Machine Learning 8.1: Data Mining and Machine Learning Procedures. Cary, NC: SAS Institute Inc., Mar. 2017.
SAS Institute Inc. 2016. SAS® Enterprise Miner 14.2: High-Performance Procedures. Cary, NC: SAS Institute Inc., Nov. 2016.

* cited by examiner

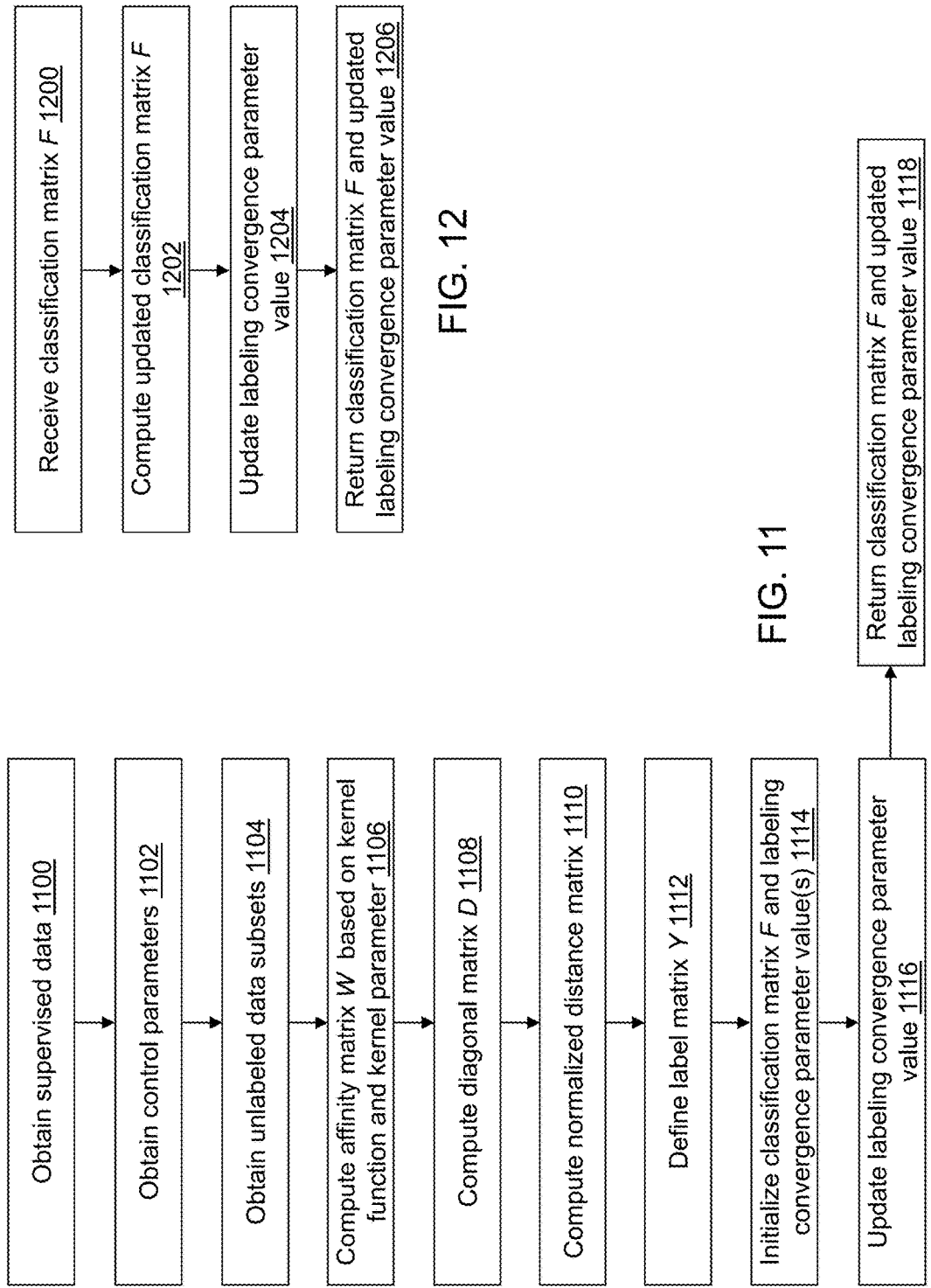

DISTRIBUTED EVENT PREDICTION AND MACHINE LEARNING OBJECT RECOGNITION SYSTEM

CROSS-REFERENCE TO RELATED APPLICATIONS

The present application claims the benefit of 35 U.S.C. § 119(e) to U.S. Provisional Patent Application No. 62/545,923 filed on Aug. 15, 2017, the entire contents of which is hereby incorporated by reference. The present application also claims the benefit of 35 U.S.C. § 119(e) to U.S. Provisional Patent Application No. 62/471,335 filed on Mar. 14, 2017, the entire contents of which is hereby incorporated by reference.

The present application is also a continuation-in-part of U.S. patent application Ser. No. 15/335,530 that was filed Oct. 27, 2016, and now issued as U.S. Pat. No. 9,792,562, the entire contents of which are hereby incorporated by reference. U.S. patent application Ser. No. 15/335,530 claimed the benefit of 35 U.S.C. § 119(e) to U.S. Provisional Patent Application No. 62/325,668 filed on Apr. 21, 2016, the entire contents of which are hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled in training data to indicate occurrence or non-occurrence of the event or to recognize/classify the object. An unsupervised learning system predicts the label, target variable y, in training data by defining a model that describes the hidden structure in the training data. Supervised learning requires that the target (dependent) variable y be labeled in training data so that a model can be built to predict the label of new unlabeled data. A supervised learning system discards observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the prediction/classification (data labeling) model.

SUMMARY

In an example embodiment, a non-transitory computer-readable medium is provided having stored thereon computer-readable instructions that, when executed by a computing device, cause the computing device to predict occurrence of an event or to classify an object using semi-supervised data to label unlabeled data in a dataset. A label set that defines permissible values for a target variable is read. Supervised data that includes a labeled subset of a plurality of observation vectors is identified. A value of the permissible values of the target variable is pre-defined for the labeled subset of the plurality of observation vectors. A total number of threads that will perform labeling of an unlabeled subset of the plurality of observation vectors is determined. The unlabeled subset of the plurality of observation vectors has not been labeled. The identified supervised data is uploaded to each thread of the total number of threads. Unlabeled observation vectors are randomly select from the unlabeled subset of the plurality of observation vectors to allocate to each thread of the total number of threads. The randomly selected, unlabeled observation vectors are uploaded to each thread of the total number of threads based on the allocation. The value of the target variable for each observation vector of the unlabeled subset of the plurality of observation vectors is determined based on a converged classification matrix. The converged classification matrix defines a label probability for each permissible value defined in the label set for each observation vector of the unlabeled subset of the plurality of observation vectors. The converged classification matrix was computed by a thread of the total number of threads. The value of the target variable for each observation vector of the unlabeled subset of the plurality of observation vectors is determined based on the defined label probability. The value of the target variable for each observation vector of the plurality of observation vectors is output to a labeled dataset.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unlabeled data in a dataset.

In an example embodiment, a method of predicting occurrence of an event or classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 11 depicts a flow diagram illustrating examples of operations initially performed by the distributed node of FIG. 3 in accordance with a fourth illustrative embodiment.

FIG. 12 depicts a flow diagram illustrating examples of operations subsequently performed by the distributed node of FIG. 3 in accordance with a fourth illustrative embodiment.

DETAILED DESCRIPTION

Figure 1:
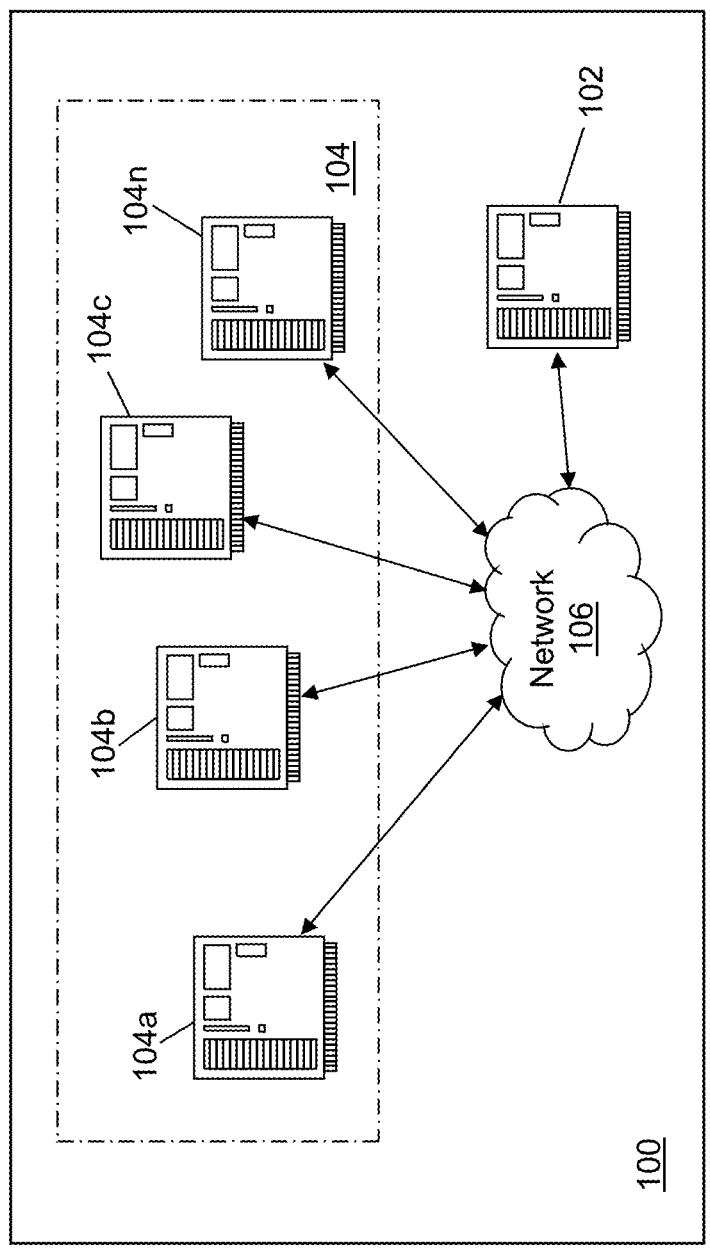
FIG. 1 depicts a block diagram of a data labeling system in accordance with an illustrative embodiment.

Referring to FIG. 1, a block diagram of a data labeling system 100 is shown in accordance with an illustrative embodiment. In an illustrative embodiment, data labeling system 100 may include master device 102, a plurality of node devices 104, and a network 106. Master device 102 stores and/or accesses a partially labeled dataset 224 (shown referring to FIG. 2). Master device 102 coordinates processing of the partially labeled dataset by each node device 300 (shown referring to FIG. 3) of the plurality of node devices 104 to define labeled dataset 228 (shown referring to FIG. 2).

One or more components of data labeling system 100 may support multithreading, as understood by a person of skill in the art. Data labeling system 100 supports distributed label processing through the use of a plurality of computing devices and/or the use of a plurality of threads of a multi-threaded computing device.

The components of data labeling system 100 may be located in a single room or adjacent rooms, in a single facility, and/or may be distributed geographically from one another. Each of master device 102 and the plurality of node devices 104 may be composed of one or more discrete devices. In an alternative embodiment, data labeling system 100 may include a single computing device that supports a plurality of threads. The described processing by node device 300 is performed by master device 102 using a different thread. For example, the single computing device may control execution of the plurality of threads to perform computations in parallel. Where the plurality of node devices 104 includes at least one computing device distinct from master device 102, each node device 300 may control execution of one or more threads to further perform computations in parallel.

Network 106 may include one or more networks of the same or different types. Network 106 can be any type of wired and/or wireless public or private network including a cellular network, a local area network, a wide area network such as the Internet or the World Wide Web, etc. Network 106 further may comprise sub-networks and include any number of devices.

For illustration, FIG. 1 represents each node device 300 as a server computer though each node device 300 can have any form factor of computing device. In general, a server computer may include faster processors, additional processors, more disk memory, and/or more random access memory (RAM) than a client computer and support multi-threading as understood by a person of skill in the art. The plurality of node devices 104 are represented to include a first server computer 104a, a second server computer 104b, a third server computer 104c, and a fourth server computer 104n though the plurality of node devices 104 can include any number of computing devices of the same or different computer form factors. The computing devices of the plurality of node devices 104 send and receive communications through network 106 to/from another of the one or more computing devices of the plurality of node devices 104 and/or to/from master device 102. The one or more computing devices of the plurality of node devices 104 may communicate using various transmission media that may be wired and/or wireless as understood by those skilled in the art.

In the illustrative embodiment, master device 102 is represented as a server computing device though master device 102 may include a computing device of any form factor. Master device 102 sends and receives communications through network 106 to/from each node device 300 of the plurality of node devices 104. Master device 102 may communicate using various transmission media that may be wired and/or wireless as understood by those skilled in the art.

Data labeling system 100 may be implemented as a grid of computers with each computing device of the plurality of node devices 104 storing a portion of the partially labeled dataset 224 as described further below. Data labeling system 100 may be implemented as a multi-node Hadoop® cluster (also referred to as a Hadoop file system (HDFS)). For instance, Apache™ Hadoop® is an open-source software framework for distributed computing supported by the Apache Software Foundation. Data labeling system 100 may use cloud computing technologies, which support on-demand network access to a shared pool of configurable computing resources (e.g., networks, servers, storage, applications and services) that can be rapidly provisioned and released with minimal management effort or service provider interaction. Data labeling system 100 may use the SAS® High Performance Analytics server developed and provided by SAS Institute Inc. of Cary, N.C., USA. Data labeling system 100 may use the SAS LASR™ Analytic Server to deliver statistical modeling and machine learning capabilities in a highly interactive programming environment, which may enable multiple users to concurrently manage data, transform variables, perform exploratory analysis, and build and compare models. Data labeling system 100 may use SAS In-Memory Statistics for Hadoop® developed and provided by SAS Institute Inc. of Cary, N.C., USA to read big data once and analyze it several times by persisting it in-memory. The SAS® Viya™ open, cloud-ready, in-memory architecture developed and provided by SAS Institute Inc. of Cary, N.C., USA also may be used as an analytic platform to enable multiple users to concurrently access data stored in partially labeled dataset 224. Data labeling system 100 may be another type and configuration or a hybrid of multiple types of systems. Of course, other distributed file systems may be used. For example, data labeling system 100 may be implemented using a TeraData® high performance database.

Figure 2:
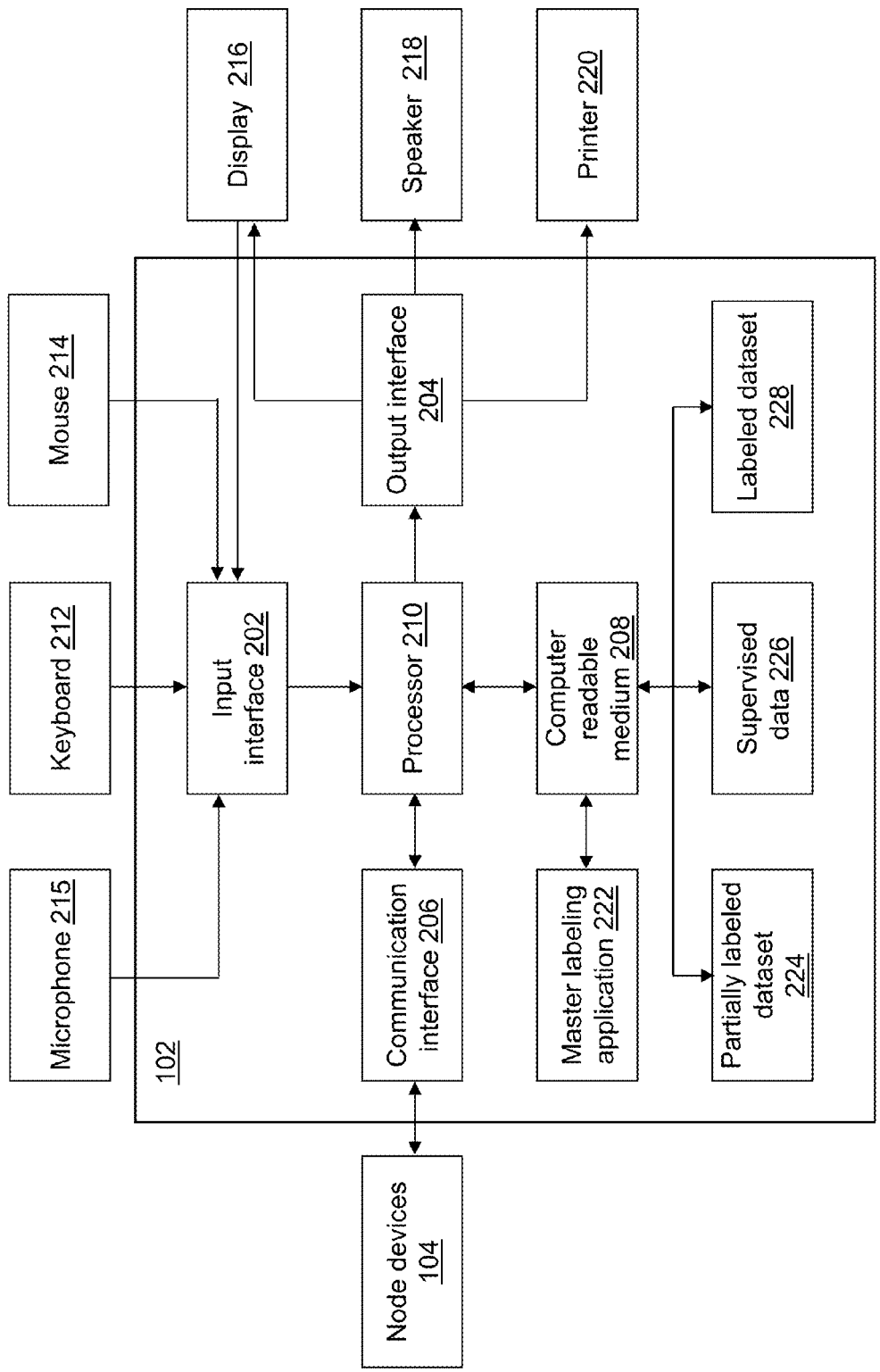
FIG. 2 depicts a block diagram of a master device of the data labeling system of FIG. 1 in accordance with an illustrative embodiment.

Referring to FIG. 2, a block diagram of master device 102 is shown in accordance with an illustrative embodiment. Master device 102 may include an input interface 202, an output interface 204, a communication interface 206, a non-transitory computer-readable medium 208, a processor 210, a master labeling application 222, partially labeled dataset 224, supervised data 226, and labeled dataset 228. Fewer, different, and/or additional components may be incorporated into master device 102.

Input interface 202 provides an interface for receiving information from the user or another device for entry into master device 102 as understood by those skilled in the art. Input interface 202 may interface with various input technologies including, but not limited to, a keyboard 212, a microphone 213, a mouse 214, a display 216, a track ball, a keypad, one or more buttons, etc. to allow the user to enter information into master device 102 or to make selections presented in a user interface displayed on display 216. The same interface may support both input interface 202 and output interface 204. For example, display 216 comprising a touch screen provides a mechanism for user input and for presentation of output to the user. Master device 102 may have one or more input interfaces that use the same or a different input interface technology. The input interface technology further may be accessible by master device 102 through communication interface 206.

Output interface 204 provides an interface for outputting information for review by a user of master device 102 and/or for use by another application or device. For example, output interface 204 may interface with various output technologies including, but not limited to, display 216, a speaker 218, a printer 220, etc. Master device 102 may have one or more output interfaces that use the same or a different output interface technology. The output interface technology further may be accessible by master device 102 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Master device 102 may have one or more communication interfaces that use the same or a different communication interface technology. For example, master device 102 may support communication using an Ethernet port, a Bluetooth antenna, a telephone jack, a USB port, etc. Data and messages may be transferred between master device 102 and the plurality of node devices 104 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Master device 102 may have one or more computer-readable media that use the same or a different memory media technology. For example, computer-readable medium 208 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Master device 102 also may have one or more drives that support the loading of a memory media such as a CD, DVD, an external hard drive, etc. One or more external hard drives further may be connected to master device 102 using communication interface 206.

Processor 210 executes instructions as understood by those skilled in the art. The instructions may be carried out by a special purpose computer, logic circuits, or hardware circuits. Processor 210 may be implemented in hardware and/or firmware. Processor 210 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Master device 102 may include a plurality of processors that use the same or a different processing technology.

Master labeling application 222 performs operations associated with extracting supervised data 226 from partially labeled dataset 224, sending a copy of supervised data 226 to each node device 300 of the plurality of node devices 104, and/or defining labeled dataset 228 from data stored in partially labeled dataset 224. Some or all of the operations described herein may be embodied in master labeling application 222.

Referring to the example embodiment of FIG. 2, master labeling application 222 is implemented in software (comprised of computer-readable and/or computer-executable instructions) stored in computer-readable medium 208 and accessible by processor 210 for execution of the instructions that embody the operations of master labeling application 222. Master labeling application 222 may be written using one or more programming languages, assembly languages, scripting languages, etc. Master labeling application 222 may be integrated with other analytic tools. For example, master labeling application 222 may be integrated as part of SAS® Enterprise Miner™ developed and provided by SAS Institute Inc. of Cary, N.C., USA that may be used to create highly accurate predictive and descriptive models based on analysis of vast amounts of data from across an enterprise.

Master labeling application 222 further may be integrated as part of SAS® Enterprise Guide, SAS® Visual Analytics, SAS® LASR™ Analytic Server, SAS® High Performance Analytics server, SAS® Viya™, SAS In-Memory Statistics for Hadoop®, SAS® Access Engine(s), etc. also developed and provided by SAS Institute Inc. of Cary, N.C., USA.

Master labeling application 222 is applicable in a variety of industries. For example, master labeling application 222 may be used to recognize text, recognize text meaning, recognize a voice, recognize speech, recognize characteristics of images such as medical images, equipment diagnostic images, terrain images, etc., recognize types of web pages, predict whether or not an event has occurred, such as an equipment failure, etc. Master labeling application 222 may be integrated with other data processing tools to automatically process data generated as part of operation of an enterprise, facility, system, device, etc., to label the data, and to provide a warning or alert associated with the labeling using input interface 202, output interface 204, and/or communication interface 206 so that appropriate action can be initiated in response to the labeling. For example, medical images that include a tumor may be recognized by master labeling application 222 which triggers a notification message sent to a clinician that a tumor has been identified based on a "tumor" label determined for the image data.

Master labeling application 222 may be implemented as a Web application. For example, master labeling application 222 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Partially labeled dataset 224 may include, for example, a plurality of rows and a plurality of columns. The plurality of rows may be referred to as observation vectors or records, and the columns may be referred to as variables. Partially labeled dataset 224 may be transposed. An observation vector $x_i$ may include a value for each of the plurality of variables associated with the observation i. Each variable of the plurality of variables describes a characteristic of a physical object, such as a living thing, a vehicle, terrain, a computing device, a physical environment, etc. For example, if partially labeled dataset 224 includes data related to operation of a vehicle, the variables may include an oil pressure, a speed, a gear indicator, a gas tank level, a tire pressure for each tire, an engine temperature, a radiator level, etc. Partially labeled dataset 224 may include data captured as a function of time for one or more physical objects.

Partially labeled dataset 224 includes supervised (human labeled) data and unsupervised (unlabeled) data. The supervised data includes a $y_i$-variable (target) value that indicates a truth related to the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system.

For example, partially labeled dataset 224 may include image data captured by medical imaging equipment (i.e., computed tomography image, magnetic resonance image, x-ray image, ultrasound image, etc.) of a body part of a living thing. A subset of the image data is labeled, for example, as either indicating existence of a medical condition or non-existence of the medical condition. Partially labeled dataset 224 may include a reference to image data that may be stored, for example, in an image file, and the existence/non-existence label associated with each image file. Partially labeled dataset 224 includes a plurality of such references. The existence/non-existence labels may be defined by a clinician or expert in the field to which data stored in partially labeled dataset 224 relates.

The data stored in partially labeled dataset 224 may be generated by and/or captured from a variety of sources including one or more sensors of the same or different type, one or more computing devices, etc. The data stored in partially labeled dataset 224 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Partially labeled dataset 224 may be stored on computer-readable medium 208 or on one or more computer-readable media of the plurality of node devices 104 and accessed by master device 102 using communication interface 206, input interface 202, and/or output interface 204. Data stored in partially labeled dataset 224 may be sensor measurements or signal values captured by a sensor, may be generated or captured in response to occurrence of an event or a transaction, generated by a device such as in response to an interaction by a user with the device, etc. The data stored in partially labeled dataset 224 may be captured at different date/time points periodically, intermittently, when an event occurs, etc. Each record of partially labeled dataset 224 may include one or more date values and/or time values.

Partially labeled dataset 224 may include data captured at a high data rate such as 200 or more observations per second for one or more physical objects. For example, data stored in partially labeled dataset 224 may be generated as part of the Internet of Things (IoT), where things (e.g., machines, devices, phones, sensors) can be connected to networks and the data from these things collected and processed within the things and/or external to the things before being stored in partially labeled dataset 224. For example, the IoT can include sensors in many different devices and types of devices. Some of these devices may be referred to as edge devices and may involve edge computing circuitry. These devices may provide a variety of stored or generated data, such as network data or data specific to the network devices themselves. Some data may be processed with an event stream processing engine, which may reside in the cloud or in an edge device before being stored in partially labeled dataset 224.

Partially labeled dataset 224 may be stored using one or more of various structures as known to those skilled in the art including one or more files of a file system, a relational database, one or more tables of a system of tables, a structured query language database, etc. on master device 102 or on the plurality of node devices 104. Master device 102 may coordinate access to partially labeled dataset 224 that is distributed across the plurality of node devices 104 that may include one or more computing devices that can communicate using a network. For example, partially labeled dataset 224 may be stored in a cube distributed across a grid of computers as understood by a person of skill in the art. As another example, partially labeled dataset 224 may be stored in a multi-node Hadoop® cluster. As another example, partially labeled dataset 224 may be stored in a cloud of computers and accessed using cloud computing technologies, as understood by a person of skill in the art. The SAS® LASR™ Analytic Server may be used as an analytic platform to enable multiple users to concurrently access data stored in partially labeled dataset 224. SAS® Viya™ may be used as an analytic platform to enable multiple users to concurrently access data stored in partially labeled dataset 224. Some systems may use SAS In-Memory Statistics for Hadoop® to read big data once and analyze it several times by persisting it in-memory for the entire session. Some systems may be of other types and configurations.

Supervised data 226 includes data from partially labeled dataset 224 for which the $y_i$-variable (target) value of each observation vector $x_i$ is labeled by a human. For example, in the medical imaging example, the label that is defined for and associated with each image file has been defined after review of the image file and a determination of the label by the human. One or more humans may label supervised data 226 at various points in time.

Labeled dataset 228 may be identical to partially labeled dataset 224 except that labeled dataset 228 includes only data such that the $y_i$-variable (target) value of each observation vector $x_i$ is labeled. For example, in the medical imaging example, the existence or non-existence label is defined for and associated with each image file though a subset of the image files are not labeled by a human, but by master labeling application 222.

Figure 3:
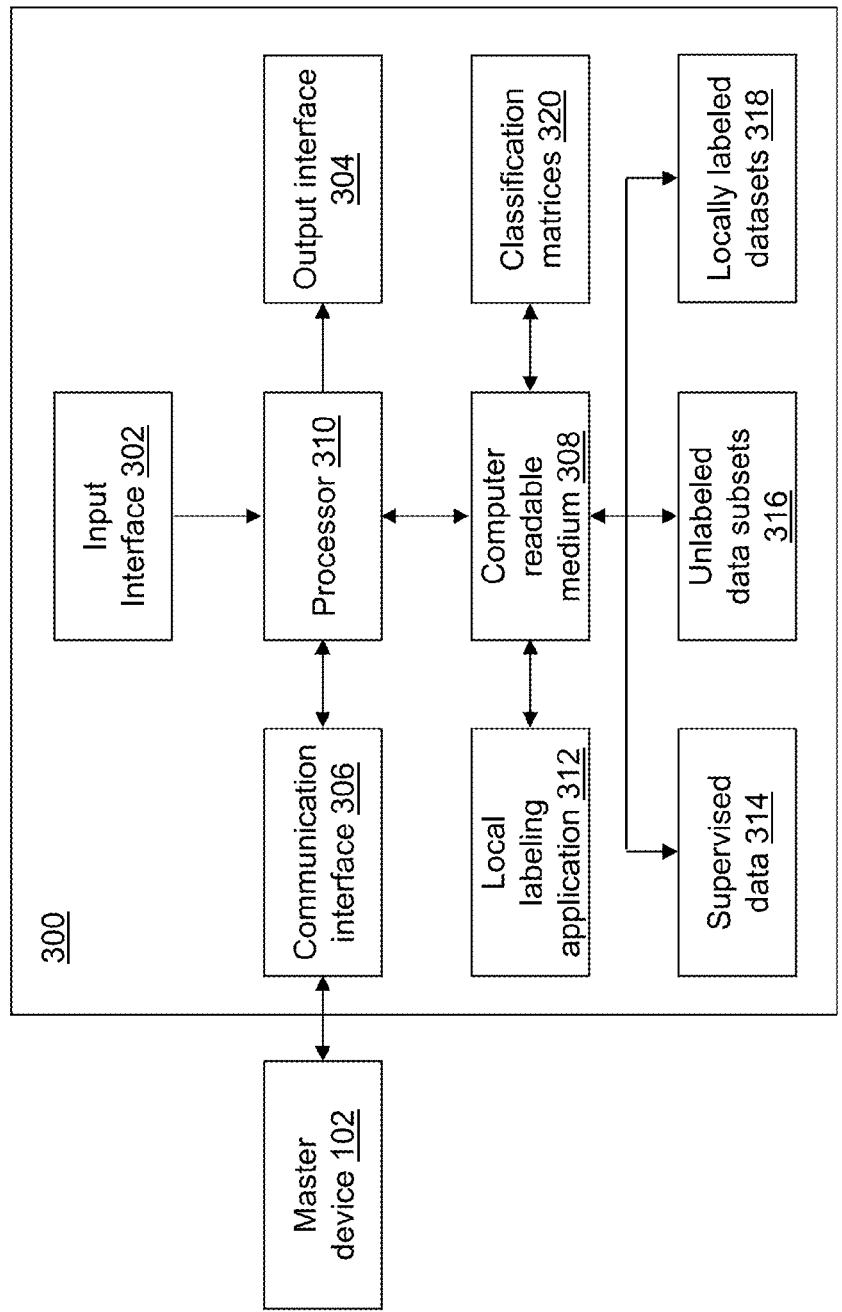
FIG. 3 depicts a block diagram of a distributed node of the data labeling system of FIG. 1 in accordance with an illustrative embodiment.

Referring to FIG. 3, a block diagram of node device 300 is shown in accordance with an illustrative embodiment. Node device 300 is an example computing device of first server computer 104a, second server computer 104b, third server computer 104c, and fourth server computer 104n. Node device 300 may include a second input interface 302, a second output interface 304, a second communication interface 306, a second non-transitory computer-readable medium 308, a second processor 310, a local labeling application 312, supervised data 314, one or more unlabeled data subsets 316, one or more locally labeled datasets 318, and one or more classification matrices 320. Supervised data 314 is a copy of supervised data 226. Fewer, different, and additional components may be incorporated into node device 300.

Each unlabeled data subset of the one or more unlabeled data subsets 316 stores a portion (subset) of the partially labeled dataset 224 for which the $y_i$-variable (target) value of each observation vector $x_i$ is not labeled. Each node device 300 of the plurality of node devices may store a different portion or portions, if executing multiple threads, of the unlabeled data (subset) as determined by master device 102. In other embodiments, the portions may include overlapping observation vectors that are included in a plurality of unlabeled data subsets 316 distributed across the threads of node device 300 or across the threads of another node device 300 of the plurality of node devices 104.

Each locally labeled dataset of the one or more locally labeled datasets 318 and each classification matrix of the one or more classification matrices 320 is associated with a distinct unlabeled data subset of the one or more unlabeled data subsets 316. A number of the one or more unlabeled data subsets 316, of the one or more locally labeled datasets 318, and of the one or more classification matrices 320 may be associated with a number of threads selected to execute local labeling application 312 on node device 300. Each locally labeled dataset of the one or more locally labeled datasets 318 and each classification matrix of the one or more classification matrices 320 is created by execution of local labeling application 312 with supervised data 314 and an associated unlabeled data subset of the one or more unlabeled data subsets 316.

Second input interface 302 provides the same or similar functionality as that described with reference to input interface 202 of master device 102 though referring to node device 300. Second output interface 304 provides the same or similar functionality as that described with reference to output interface 204 of master device 102 though referring to node device 300. Second communication interface 306 provides the same or similar functionality as that described with reference to communication interface 206 of master device 102 though referring to node device 300. Data and messages may be transferred between node device 300 and master device 102 using second communication interface 306. Second computer-readable medium 308 provides the same or similar functionality as that described with reference to computer-readable medium 208 of master device 102 though referring to node device 300. Second processor 310 provides the same or similar functionality as that described with reference to processor 210 of master device 102 though referring to node device 300.

Local labeling application 312 performs operations associated with creating each locally labeled dataset of the one or more locally labeled datasets 318 and each classification matrix of the one or more classification matrices 320 from supervised data 314 and each associated unlabeled data subset of the one or more unlabeled data subsets 316. Some or all of the operations described herein may be embodied in local labeling application 312. The operations may be implemented using hardware, firmware, software, or any combination of these methods. Referring to the example embodiment of FIG. 3, local labeling application 312 is implemented in software (comprised of computer-readable and/or computer-executable instructions) stored in second computer-readable medium 308 and accessible by second processor 310 for execution of the instructions that embody the operations of local labeling application 312. Local labeling application 312 may be written using one or more programming languages, assembly languages, scripting languages, etc. Local labeling application 312 may be implemented as a Web application. Master labeling application 222 and local labeling application 312 may be parts of the same application, may be separate applications, or may be integrated applications that are designed to interact with each other, for example, through an application programming interface.

Figure 4:
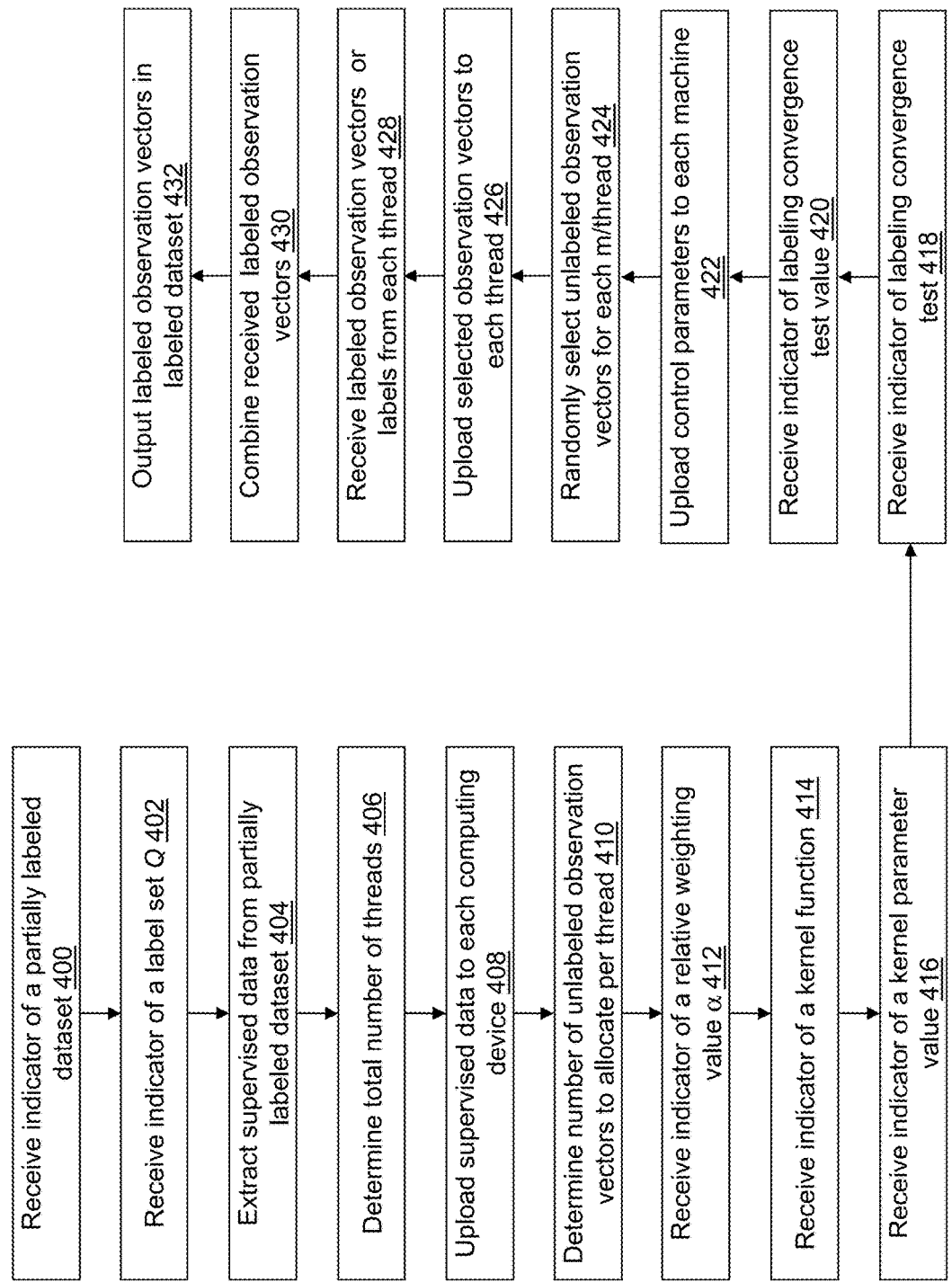
FIG. 4 depicts a flow diagram illustrating examples of operations performed by the distributed node of FIG. 3 in accordance with a first illustrative embodiment.

Referring to FIG. 4, example operations associated with master labeling application 222 are described. For example, master labeling application 222 may be used to create labeled dataset 228 from partially labeled dataset 224 using the plurality of node devices 104. Additional, fewer, or different operations may be performed depending on the embodiment of master labeling application 222. The order of presentation of the operations of FIG. 4 is not intended to be limiting. Although some of the operational flows are presented in sequence, the various operations may be performed in various repetitions, concurrently (in parallel, for example, using threads), and/or in other orders than those that are illustrated. For example, a user may execute master labeling application 222, which causes presentation of a first user interface window, which may include a plurality of menus and selectors such as drop down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by master labeling application 222.

In an operation 400, a first indicator may be received that indicates partially labeled dataset 224. For example, the first indicator indicates a location and a name of partially labeled dataset 224. As an example, the first indicator may be received by master labeling application 222 after selection from a user interface window or after entry by a user into a user interface window. In an alternative embodiment, partially labeled dataset 224 may not be selectable. For example, a most recently created dataset may be used automatically. A subset of the observation vectors $x_i$ included in partially labeled dataset 224 are labeled. Merely for illustration, a relatively small percent, such as less than 10%, of the observation vectors $x_i$ included in partially labeled dataset 224 are labeled. Partially labeled dataset 224 includes a plurality of observation vectors $x_i$ where i=1, . . . , n.

In an operation 402, a second indicator may be received that indicates a label set Q associated with partially labeled dataset 224. For example, the label set Q includes a list of permissible values that the $y_i$-variable (target) value of each observation vector $x_i$ may have. For illustration, if partially labeled dataset 224 includes text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". No $y_i$-variable (target) value indicates that the associated observation vector $x_i$ is not labeled in partially labeled dataset 224.

In an operation 404, supervised data 226 is extracted from partially labeled dataset 224. For example, a $y_i$-variable (target) value of zero may indicate that the associated observation vector $x_i$ is not labeled in partially labeled dataset 224 where the value of zero is not included in the label set Q. Thus, partially labeled dataset 224 defines a point set x={$x_1$, $x_{l+1}$, . . . , $x_n$}, where n indicates a number of data points or observation vectors $x_i$ included in partially labeled dataset 224, where the observation vectors $x_i$ (i≤l) are labeled as $y_i \in Q$, and the remaining observation vectors $x_i$ (l<i≤n) are unlabeled (not labeled as $y_i \in Q$). Thus, l indicates a number of labeled data points or observation vectors $x_i$ included in partially labeled dataset 224. The labeled data points, which have been labeled by a human, are referenced herein as supervised data or supervised data points or supervised observation vectors. For illustration, l may be a small percentage, such as less than 1% of the observation vectors $x_i$ included in partially labeled dataset 224. Master labeling application 222, possibly working with the plurality of node devices 104, determines a label from label set Q for each observation vector $x_i$ included in partially labeled dataset 224 that is not labeled. The resulting fully labeled data is stored in labeled dataset 228, where some of the labels were determined by master labeling application 222 and some of the labels were determined by the human. Supervised data 226 includes the observation vectors $x_i$ (i≤l) that are labeled as $y_i \in Q$.

In an operation 406, a total number of threads V that will execute across all of the computing devices of the plurality of node devices 104 is determined. The same or a different number of threads may be associated with each computing device. For example, a number of threads that will execute on each computing device is summed for all of the computing devices to determine the total number of threads V. As mentioned previously, all of the threads may be executed by master device 102, some of the threads may be executed by master device 102, or none of the threads may be executed by master device 102.

For illustration, using a HDFS, partially labeled dataset 224 may be distributed among a pool of data nodes (the plurality of node devices 104). A single name node (sometimes referred to as NameNode), master device 102, runs in a cluster, associated with the plurality of node devices 104, and provides management of a typical hierarchical file organization and namespace. Master device 102 coordinates the interaction with the plurality of node devices 104. The creation of a file in HDFS appears to be a single file, even though it blocks "chunks" of the file into pieces that are stored on an individual node device 300 of the plurality of node devices 104.

In an operation 408, supervised data 226 is uploaded to each of the computing devices. For example, supervised data 226 may be sent to each node device 300 or a location may be sent to each node device 300 that is accessible by each respective node device 300. Once each thread executing at each node device 300 receives or accesses supervised data 226, each thread may begin execution of local labeling application 312 to label the unlabeled observation vectors in parallel by each node device 300. For example, referring to FIG. 5, each thread begins processing in an operation 500 (shown referring to FIG. 5) by obtaining supervised data 226.

In an operation 410, a number of unlabeled data points or observation vectors to allocate to each thread is determined. For example, the number of unlabeled data points may be computed using (n−l)/V. When there is a remainder, a subset of the V threads are allocated one more unlabeled data point than the remaining subset such that the number of unlabeled data points allocated to each thread is approximately equal.

In an operation 412, a third indicator may be received that indicates a relative weighting value α, where α is selected between zero and one, non-inclusive. As described referring to FIG. 5, each data point receives information from its neighboring data points while also retaining its initial label information. The relative weighting value α specifies a relative amount of the information from its neighbors versus its initial label information. The relative weighting value α=0.5 indicates equal weight between the information from its neighbors relative to its initial label information.

In an operation 414, a fourth indicator of a kernel function to apply may be received. For example, the fourth indicator indicates a name of a kernel function. The fourth indicator may be received by master labeling application 222 after selection from a user interface window or after entry by a user into a user interface window. A default value for the kernel function may further be stored, for example, in computer-readable medium 208. As an example, a kernel function may be selected from "Gaussian", "Exponential", "Linear", "Polynomial", "Sigmoid", etc. For example, a default kernel function may be the Gaussian kernel function though any positive definite kernel function could be used. Of course, the kernel function may be labeled or selected in a variety of different manners by the user as understood by a person of skill in the art. In an alternative embodiment, the kernel function may not be selectable, and a single kernel function is implemented in master labeling application 222. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 416, a fifth indicator of a kernel parameter value to use with the kernel function may be received. For example, a value for s, the Gaussian bandwidth parameter, may be received for the Gaussian kernel function. In an alternative embodiment, the fifth indicator may not be received. For example, a default value for the kernel parameter value may be stored, for example, in computer-readable medium 208 and used automatically or the kernel parameter value may not be used. In another alternative embodiment, the value of the kernel parameter may not be selectable. Instead, a fixed, predefined value may be used.

In an operation 418, a sixth indicator of a labeling convergence test may be received. For example, the sixth indicator indicates a name of a labeling convergence test. The sixth indicator may be received by master labeling application 222 after selection from a user interface window or after entry by a user into a user interface window. A default value for the labeling convergence test may further be stored, for example, in computer-readable medium 208. As an example, a labeling convergence test may be selected from "Num Iterations", "Within Tolerance", etc. For example, a default convergence test may be "Num Iterations". Of course, the labeling convergence test may be labeled or selected in a variety of different manners by the user as understood by a person of skill in the art. In an alternative embodiment, the labeling convergence test may not be selectable, and a single labeling convergence test is implemented by master labeling application 222. For example, the labeling convergence test "Num Iterations" may be used by default or without allowing a selection.

In an operation 420, a seventh indicator of a labeling convergence test value may be received. In an alternative embodiment, the seventh indicator may not be received. For example, a default value may be stored, for example, in computer-readable medium 208 and used automatically when the seventh indicator is not received. In an alternative embodiment, the labeling convergence test value may not be selectable. Instead, a fixed, predefined value may be used. As an example, when the labeling convergence test "Num Iterations" is indicated from operation 210, the labeling convergence test value is a number of iterations $M_L$. Merely for illustration, the number of iterations $M_L$ may be set between 10 and 1000 though the user may determine that other values are more suitable for their application as understood by a person of skill in the art, for example, based on the labeling accuracy desired, computing resources available, size of partially labeled dataset 224, etc. As another example, when the labeling convergence test "Within Tolerance" is indicated from operation 210, the labeling convergence test value may be a tolerance value τ.

In an operation 422, control parameters, such as the kernel function indicated by operation 414, the kernel parameter value indicated by operation 416, label set Q indicated by operation 410, relative weighting value α indicated by operation 412, the labeling convergence test indicated by operation 418, and/or the labeling convergence test value indicated by operation 420 are uploaded to each node device 300. For example, the control parameters may be sent to each node device 300 or a location is sent to each node device 300 that is accessible by each respective node device 300. One or more of the control parameters may not be selectable and therefore may not be uploaded. For example, default or fixed functions or values may be used automatically. Once each thread executing at each node device 300 receives or accesses the control parameters, each thread begins processing an operation 502 (shown referring to FIG. 5) by obtaining the control parameters.

In an operation 424, the number of unlabeled observation vectors or data points to allocate to each thread may be randomly selected without replacement from the remaining observation vectors $x_i$ (1<i≤n) that are unlabeled (not labeled as $y_i \in Q$). In an alternative embodiment, a number of the unlabeled observation vectors or data points to allocate to each thread is also randomly selected instead of being an approximately equal allocation based on operation 410. For example, separate subsets of the observation vectors $x_i$ (1<i≤n) are created for each thread or indices to the selected subset for each thread are stored. As another option, the number of unlabeled observation vectors or data points to allocate to each thread may be randomly selected with replacement from the remaining observation vectors $x_i$ (1<i≤n) that are unlabeled (not labeled as $y_i \in Q$). For example, separate subsets of the observation vectors $x_i$ (1<i≤n) are created for each thread or indices to the selected subset for each thread are stored, but the separate subsets include overlapping observation vectors.

In an operation 426, the selected subset of unlabeled observation vectors for each thread is uploaded to the respective node device 300. For example, the selected subset or subsets may be sent to each respective node device 300 or a location is sent to each node device 300 that is accessible by each respective node device 300. Once each node device 300 receives or accesses the selected subset of unlabeled observation vectors for each thread that it will execute, each thread begins execution of local labeling application 312 to label the unlabeled observation vectors in parallel across each node device 300. For example, referring to FIG. 5, each thread begins processing in operation 504 by obtaining the selected subset of unlabeled observation vectors. Once the thread labels each unlabeled observation vector of the selected subset of unlabeled observation vectors assigned to that thread, the labels are returned to master device 102 in an operation 524 (shown referring to FIG. 5).

For illustration using HDFS, master device 102 maintains metadata about each file as well as a history of changes to the metadata. The metadata includes an enumeration of the managed files, properties of the files and the file system, as well as the mapping of blocks to files at the plurality of node devices 104. Node device 300 does not manage any information about the logical HDFS file; rather, it treats each data block as a separate file and shares the critical information with master device 102.

Illustrative options for data manipulation include distributed and repeated tables. A table is distributed when each node device 300 holds a portion of the table, but no node device 300 has access to all of the rows of the table. Only the active rows of the table are counted here. Other node devices 300 can hold replicate copies of rows to be activated in the case of a node failure. A repeated table, on the other hand, is one where each node device 300 has access to all the rows of the table. Duplicated tables are useful in some operations, such as table joins, where the rows of a dimension table need to be matched against the keys in the fact table. If all rows of the dimension table are repeated on each node device 300, the join can be completed without exchanging rows between the plurality of node devices 104. Repeated tables are not managed for failover since each node has all of the rows anyway.

Once a file is created, as data is written to the file, it is actually cached in a temporary file. When the amount of the data in that temporary file is enough to fill a block in an HDFS file, the name node is alerted to transition that temporary file into a block that is committed to a permanent data node, which is also then incorporated into the file management scheme.

In an operation 428, each observation vector $x_i$ of the unlabeled data subset is received or accessed from each thread with the $y_i$-variable (target) value determined by the associated thread. As another option, an index to the observation vector and the associated $y_i$-variable (target) value is received or accessed. A subset of a classification matrix $F_p$, where $p=1, \ldots, V$ also, or in the alternative, may be received or accessed from each thread. The subset of the classification matrix $F_p$ defines a label probability for each permissible value defined in label set Q for each observation vector $x_i$ of the unlabeled data subset assigned to that thread.

In an operation 430, the received and now labeled observation vectors $x_i$ ($1 < i \le n$) are combined with supervised data 226 (observation vectors $x_i$ ($1 < i \le l$)) and stored in labeled dataset 228. As another option, the subset of the classification matrix $F_p$ received or accessed from each thread may be used to label each unlabeled observation vector as discussed further below with reference to operation 522 of FIG. 5.

When overlapping observation vectors (the same observation vector may be provided to a plurality of threads) are distributed, the $y_i$-variable (target) value of each overlapping observation vector is determined by computing a count for the predicted label from each thread. The $y_i$-variable (target) value stored in labeled dataset 228 for each overlapping observation vector is the label with the highest computed count. In the event of a tie in the highest computed count, either label may be selected. For illustration, an average label probability distribution may be calculated for each tied label, and the label with the higher average probability distribution is selected as the final output. As another illustration, the label can be selected based on alphabetic or numeric order.

In operation 432, labeled dataset 228 is output. For example, labeled dataset 228 may be stored on master device 102 and/or on one or more computing devices of the plurality of node devices 104 and/or on another computing device in a variety of formats as understood by a person of skill in the art. All or a subset of labeled dataset 228 further may be output to display 216, to printer 220, etc. For example, medical images labeled as including a tumor may be recognized by master labeling application 222 and presented on display 216 or indicators of the medical images may be printed on printer 220. As another option, a notification message may be sent to a clinician indicating that a tumor has been identified based on a "tumor" label determined for the image data. In an illustrative embodiment, an alert message may be sent to another device using communication interface 206, printed on printer 220 or another printer, presented visually on display 216 or another display, presented audibly using speaker 218 or another speaker, etc. based on how urgent a response is needed to a certain label. For example, if a sound signal or image data indicate an intrusion into a surveilled area, a notification message may be sent to a responder.

Figure 5:
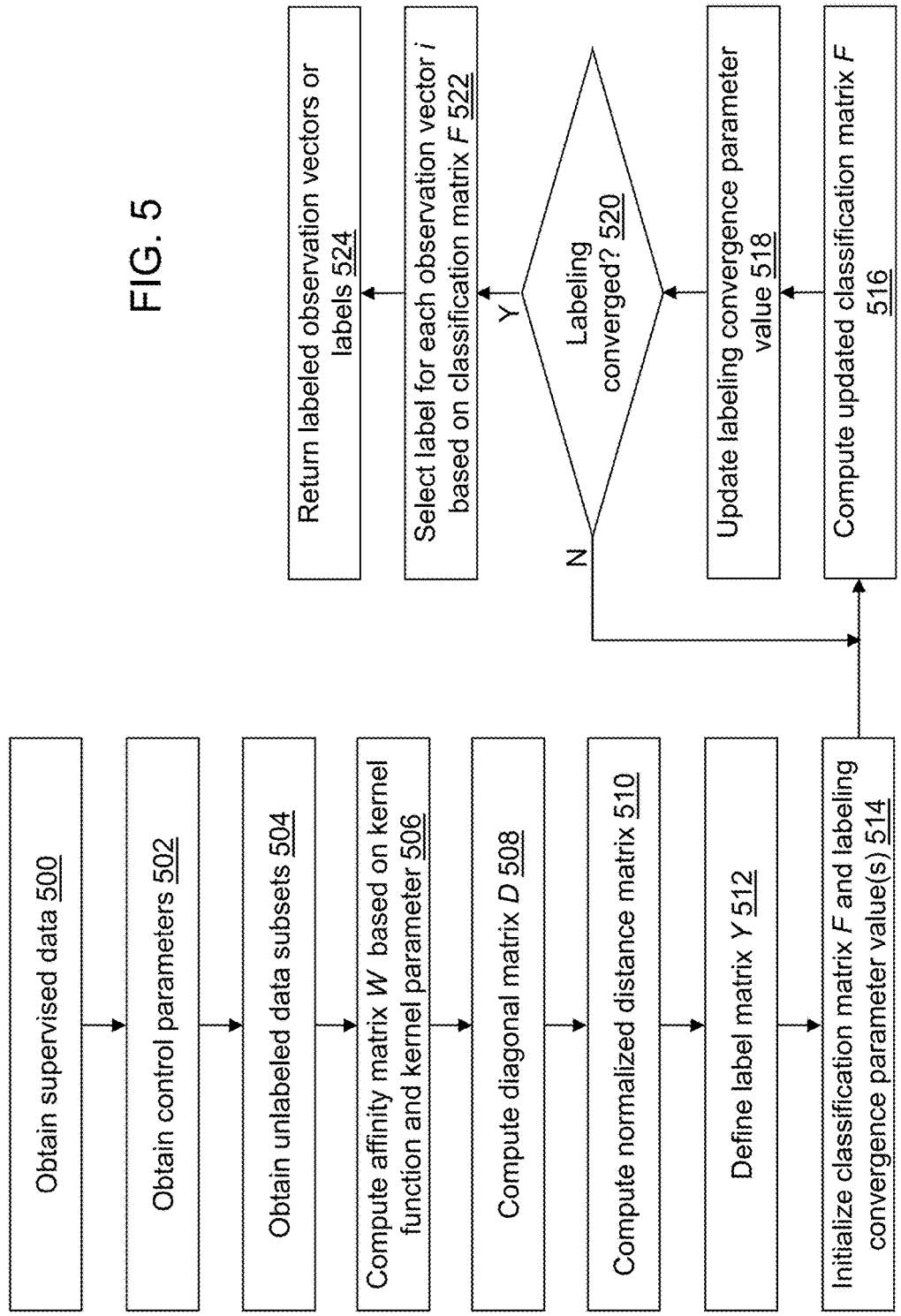
FIG. 5 depicts a flow diagram illustrating examples of operations performed by the master device of FIG. 2 in accordance with a first illustrative embodiment.

Referring to FIG. 5, example operations associated with local labeling application 212 are described. For example, local labeling application 312 may be used to create each locally labeled dataset of the one or more locally labeled datasets 318 and each classification matrix of the one or more classification matrices 320 from supervised data 314 and each associated unlabeled data subset of the one or more unlabeled data subsets 316. Additional, fewer, or different operations may be performed depending on the embodiment of local labeling application 312. The order of presentation of the operations of FIG. 5 is not intended to be limiting. Although some of the operational flows are presented in sequence, the various operations may be performed in various repetitions, concurrently (in parallel, for example, using threads), and/or in other orders than those that are illustrated. Each parallel process may create a locally labeled dataset of the one or more locally labeled datasets 318 and a classification matrix of the one or more classification matrices 320 from supervised data 314 and the associated unlabeled data subset of the one or more unlabeled data subsets 316. For example, a user may execute local labeling application 312, which causes presentation of a first user interface window, which may include a plurality of menus and selectors such as drop down menus, buttons, text boxes, hyperlinks, etc. associated with local labeling application 312 as understood by a person of skill in the art. The plurality of menus and selectors may be accessed in various orders. An indicator may indicate one or more user selections from a user interface, one or more data entries into a data field of the user interface, one or more data items read from second computer-readable medium 308 or otherwise defined with one or more default values, etc. that are received as an input by local labeling application 312.

In operation 500, supervised data 314 is obtained. For example, supervised data 314 is received from master device 102 as a copy of supervised data 226. Supervised data 314 further may be accessed from a known storage location or a storage location provided by master device 102. For illustration, SAS® Viya™ uses SAS Cloud Analytic Services (CAS), developed and provided by SAS Institute Inc. of Cary, N.C., USA, to perform tasks. A CAS action is designed to establish multiple threads. There are specified functions for setting up threads which are handled by a data access layer.

In operation 502, control parameters are obtained from master device 102. For example, the kernel function indicated by operation 414, the kernel parameter value indicated by operation 416, label set Q indicated by operation 402, relative weighting value α indicated by operation 412, the labeling convergence test indicated by operation 418, and/or the labeling convergence test value indicated by operation 420 may be received from master device 102 or accessed from a known storage location or a storage location provided by master device 102.

In operation 504, the one or more unlabeled data subsets allocated to node device 300 are obtained from master device 102 based on a number of threads selected for node device 300 to use. For example, the one or more unlabeled data subsets selected for node device 300 in operation 424 may be received from master device 102 or accessed from a known (i.e., default) storage location or the storage location provided by master device 102.

In an operation 506, an affinity matrix W is computed based on the kernel function and the kernel parameter value obtained in operation 502 or otherwise provided to each node device 300 of the plurality of node devices 104 or otherwise automatically executed by each node device 300. For example, using the Gaussian kernel function, the affinity matrix W is defined as $$W_{ij} = \exp\frac{-\|x_i - x_j\|^2}{2s^2}$$

if $i \neq j$ and $W_{ii}=0$ for $i=j$, where s is the kernel parameter value and the affinity matrix W is an n×n matrix such that $i=1, \ldots, n_p$ and $j=1, \ldots, n_p$, where $n_p$ is a number of observation vectors $x_i$ included in the unlabeled data subset allocated to the executing thread plus a number of observation vectors $x_i$ included in supervised data 314.

In an operation 508, a diagonal matrix D is computed based on the affinity matrix W. For example, using the Gaussian kernel function, the diagonal matrix D is an n×n matrix and is defined as $D_{ii}=\Sigma_{j=1}^{n_p} W_{ij}$ if $i=j$ and $D_{ij}=0$ if $i \neq j$, where $i=1, \ldots, n_p$ and $j=1, \ldots, n_p$.

In an operation 510, a normalized distance matrix S is computed based on the affinity matrix W and the diagonal matrix D. For example, the normalized distance matrix S is an n×n matrix and is defined as $S=D^{-1/2} WD^{-1/2}$.

In an operation 512, a label matrix Y is defined based on supervised data 314 obtained in operation 500 and an unlabeled data subset selected from the one or more unlabeled data subsets for execution by an allocated thread. Label matrix Y is an n×c matrix with $Y_{ik}=1$ if $x_i$ is labeled as $y_i=k$. Otherwise, $Y_{ik}=0$, where $k=1, \ldots, c$ and $i=1, \ldots, n_p$.

In an operation 514, a classification matrix F and one or more labeling convergence parameter values are initialized. Classification matrix F is an n×c matrix. For example, classification matrix F is initialized as $F(0)=Y$. One or more labeling convergence parameter values may be initialized based on the labeling convergence test obtained in operation 502 or otherwise provided to each node device 300 of the plurality of node devices 104 or otherwise automatically executed by each node device 300. As an example, when the labeling convergence test "Num Iterations" is obtained in operation 502, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$ of the supervised data 314 with the unlabeled data subset of the unlabeled data subsets 316. As another example, when the labeling convergence test "Within Tolerance" is obtained in operation 502, a first labeling convergence parameter value ΔF may be initialized to a large number and associated with the tolerance value τ.

In an operation 516, an updated classification matrix F(t+1) is computed using $F(t+1)=\alpha SF(t)+(1-\alpha)Y$, where for a first iteration of operation 228, $F(t)=F(0)$. The updated classification matrix F defines a label probability for each permissible value defined in label set Q for each observation vector $x_i$ of supervised data 314 with the unlabeled data subset allocated to the executing thread.

In an operation 518, the one or more labeling convergence parameter values are updated. As an example, when the labeling convergence test "Num Iterations" is obtained in operation 502, $t=t+1$. As another example, when the labeling convergence test "Within Tolerance" is obtained in operation 502, $\Delta F=F(t+1)-F(t)$.

In an operation 520, a determination is made concerning whether or not labeling has converged by evaluating the labeling convergence test. When labeling has converged, processing continues in an operation 522. When labeling has not converged, processing continues in operation 516 to compute a next update of classification matrix F(t+1). As an example, when the labeling convergence test "Num Iterations" is obtained in operation 502, the first labeling convergence parameter value t is compared to the labeling convergence test value that is the number of iterations $M_L$. When $t \geq M_L$, labeling has converged. As another example, when the labeling convergence test "Within Tolerance" is obtained in operation 502, the first labeling convergence parameter value ΔF is compared to the labeling convergence test value that is the tolerance value τ. When $\Delta F \leq \tau$, labeling has converged. Either or both convergence tests may be applied. Other convergence tests also, or in the alternative, may be applied.

In operation 522, the $y_i$-variable (target) value of each observation vector $x_i$ of the unlabeled data subset is labeled using F(t). $y_i$ is selected for each observation vector $x_i$ of the unlabeled data subset based on $y_i = \mathrm{argmax}_{j \leq c} F_{ij}(t)$. As a result, a label with a highest classification value as indicated by $\mathrm{argmax}_{j \leq c} F_{ij}(t)$ is selected as the $y_i$-variable (target) value or label for the observation vector $x_i$. The observation vectors included in supervised data 314 are not changed.

In operation 524, the $y_i$-variable (target) value of each observation vector $x_i$ of the unlabeled data subset selected in operation 522 is returned to master device 102. For example, the $y_i$-variable (target) value of each observation vector $x_i$ of the unlabeled data subset may be stored in a locally labeled dataset of the locally labeled datasets 318 for the allocated thread. The locally labeled datasets 318 may be sent to master device 102 or otherwise provided to master device 102. For example, the locally labeled datasets 318 may be stored in a location known to master device 102 or a location provided to master device 102.

One or more operations of operations 500 to 524 may be performed by separate threads of node device 300 or by other node devices of the plurality of node devices 104.

Figure 6A:
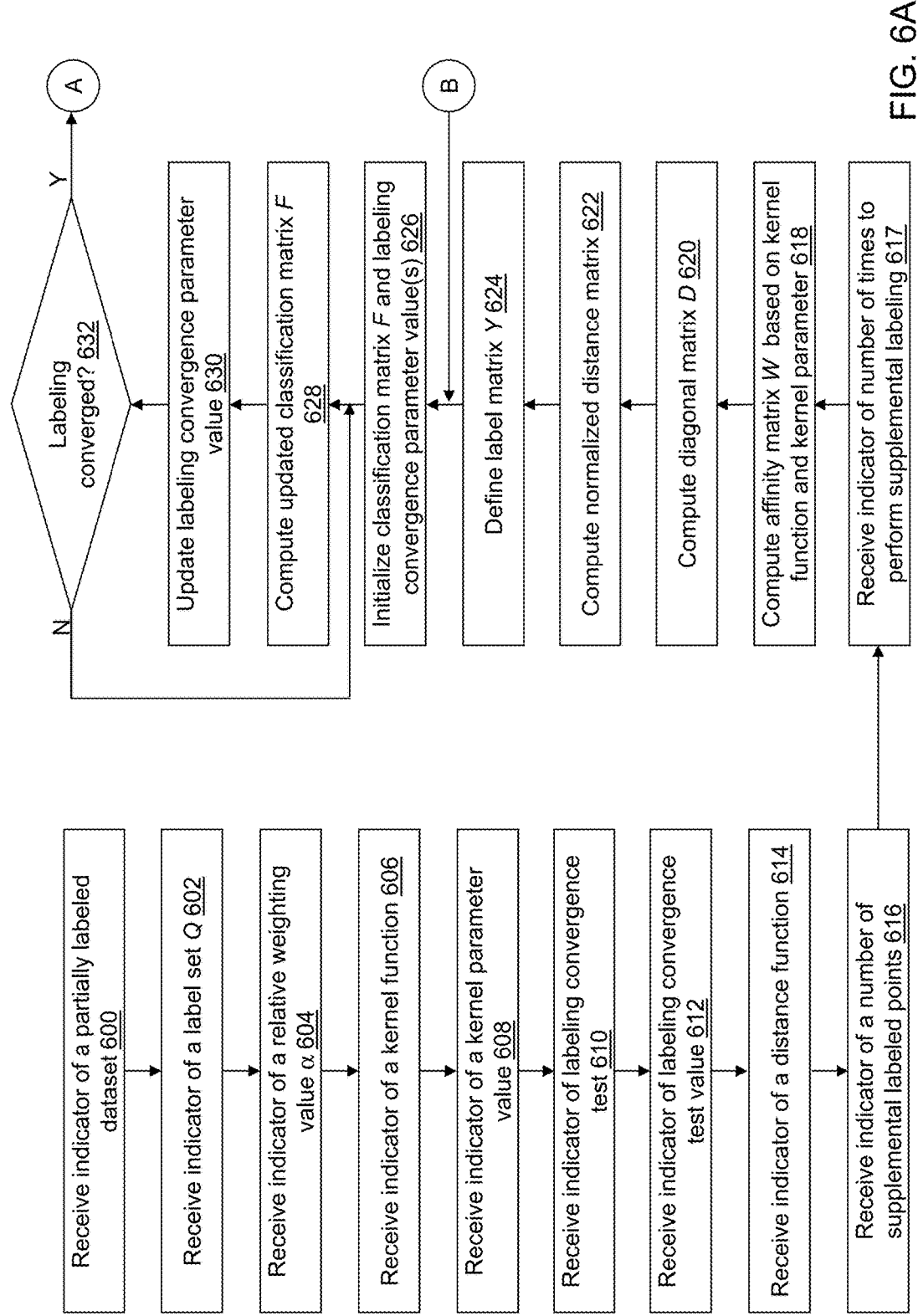
FIGS. 6A and 6B depict a flow diagram illustrating examples of operations performed by the master device of FIG. 2 in accordance with a second illustrative embodiment.
Figure 6B:
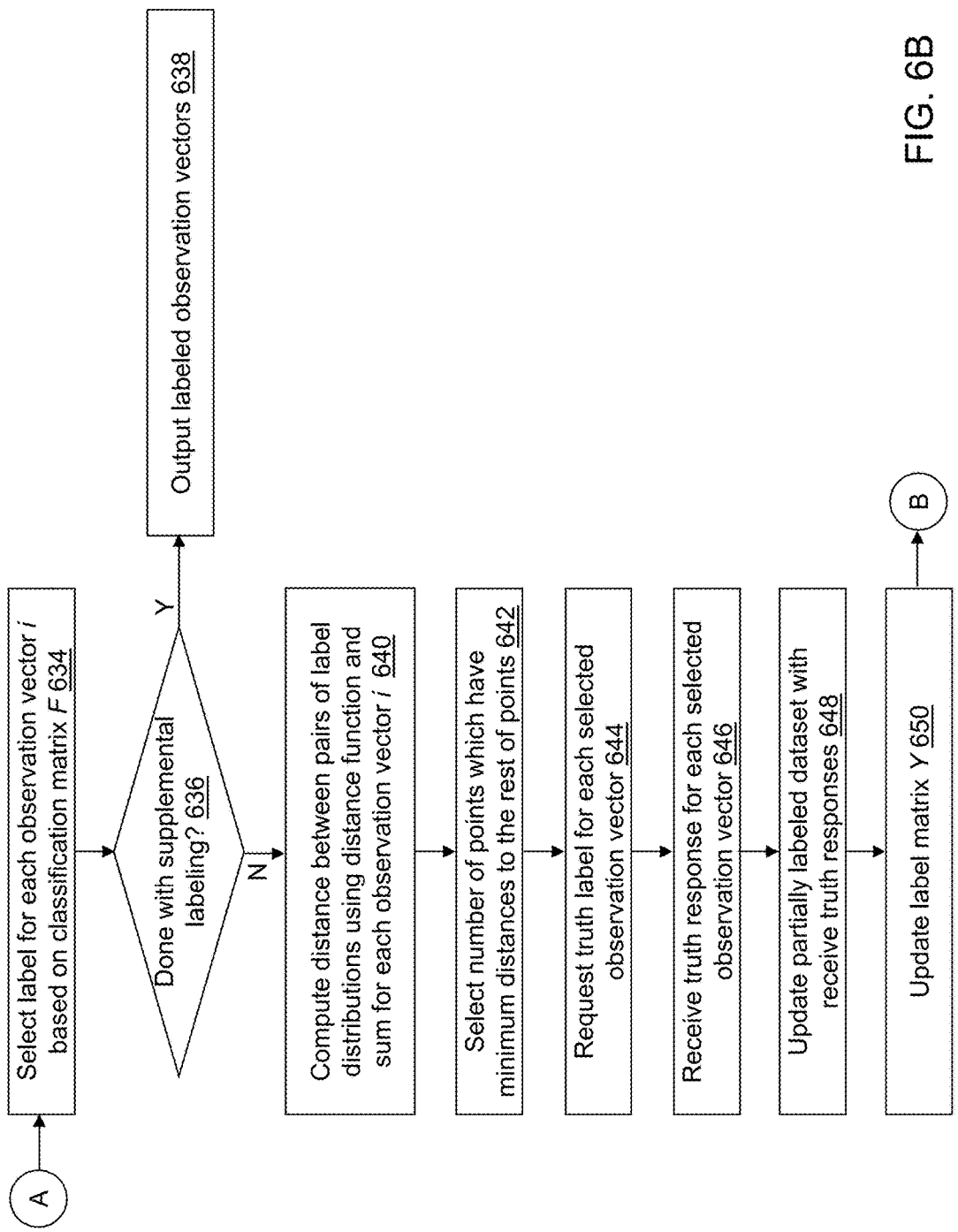
Figure 7A:
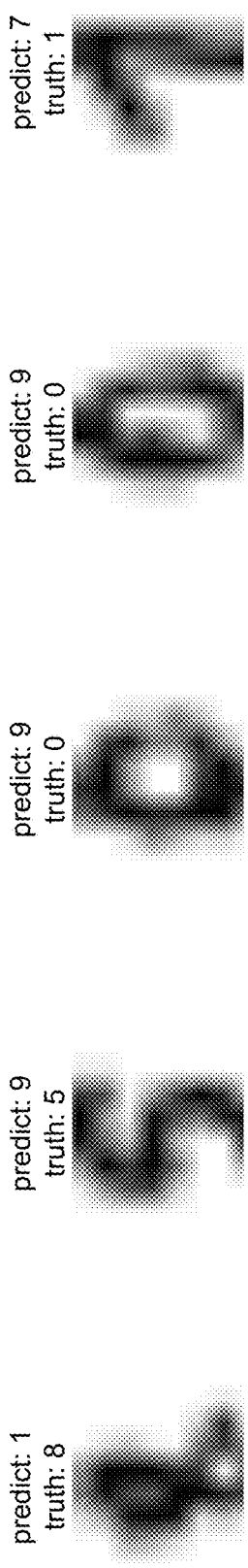
FIGS. 7A-7E depict supplemental points successively selected for labeling by the master device of FIG. 2 performing the operations of FIGS. 6A and 6B in accordance with an illustrative embodiment.
Figure 7B:
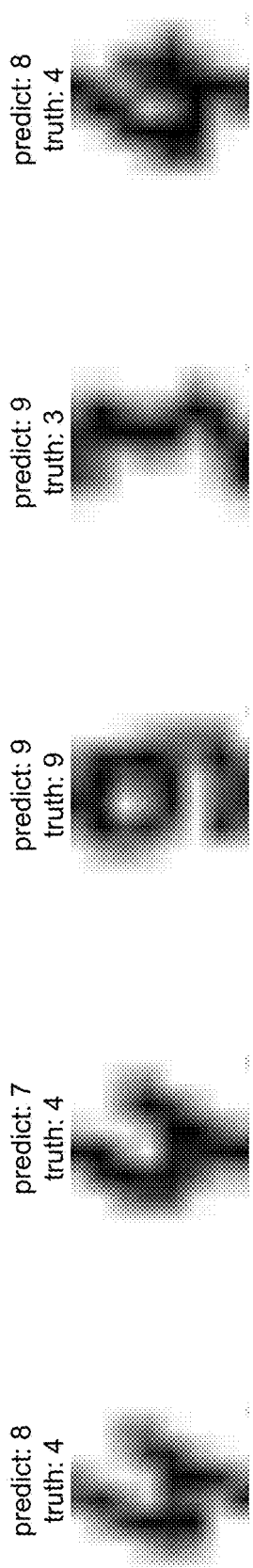
Figure 7C:
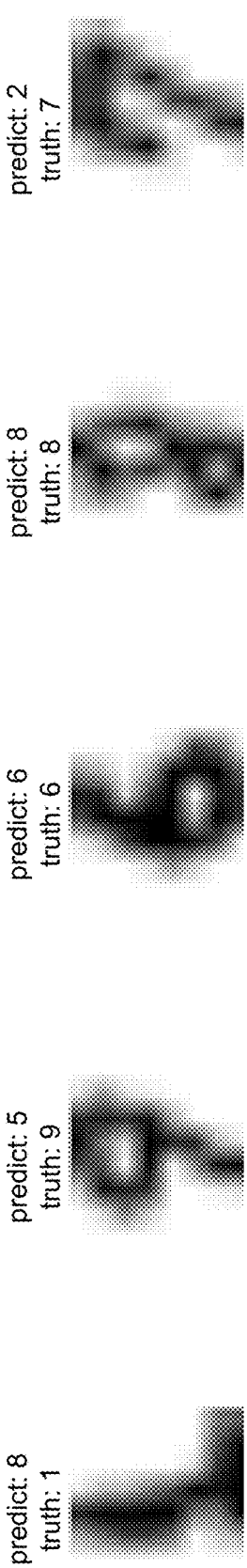
Figure 7D:
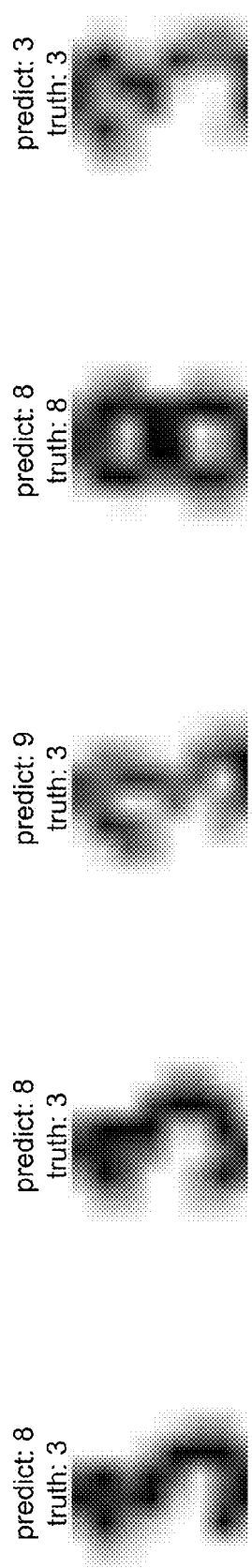
Figure 7E:
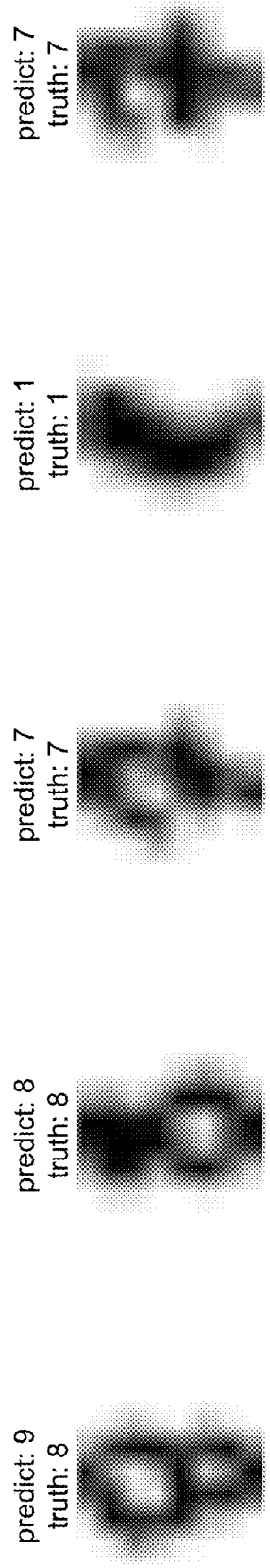

Referring to FIGS. 6A and 6B, example operations associated with master labeling application 222 are described. For example, master labeling application 222 may be used to create labeled dataset 228 from partially labeled dataset 224 without use of the plurality of node devices 104. On each iteration, additional data points of partially labeled dataset 224 are identified for truth labeling. Master labeling application 222 has been shown to improve the accuracy of labels defined in labeled dataset 228 at much lower cost due to a reduced reliance on human labor.

Additional, fewer, or different operations may be performed depending on the embodiment of master labeling application 222. The order of presentation of the operations of FIGS. 6A and 6B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute master labeling application 222, which causes presentation of a first user interface window, which may include a plurality of menus and selectors such as drop down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by master labeling application 222.

Referring to FIG. 6A, similar to operation 400, in an operation 600, the first indicator may be received that indicates partially labeled dataset 224.

Similar to operation 402, in an operation 602, the second indicator may be received that indicates a label set Q associated with partially labeled dataset 224.

Similar to operation 412, in an operation 604, the third indicator may be received that indicates a relative weighting value α, where α is selected between zero and one, non-inclusive.

Similar to operation 414, in an operation 606, the fourth indicator of a kernel function to apply may be received.

Similar to operation 416, in an operation 608, the fifth indicator of a kernel parameter value to use with the kernel function may be received.

Similar to operation 418, in an operation 610, the sixth indicator of a labeling convergence test may be received.

Similar to operation 420, in an operation 612, the seventh indicator of a labeling convergence test value may be received.

In an operation 614, an eighth indicator of a distance function may be received. For example, the eighth indicator indicates a name of a distance function. The eighth indicator may be received by master labeling application 222 after selection from a user interface window or after entry by a user into a user interface window. A default value for the distance function may further be stored, for example, in computer-readable medium 208. As an example, a distance function may be selected from "Kullback-Leibler", "Euclidian", "Manhattan", "Minkowski", "Cosine", "Chebyshev", "Hamming", "Mahalanobis", etc. As an example, a default distance function may be "Kullback-Leibler". Of course, the distance function may be labeled or selected in a variety of different manners by the user as understood by a person of skill in the art. In an alternative embodiment, the distance function may not be selectable, and a single distance function is implemented by master labeling application 222.

In an operation 616, a ninth indicator of a number of supplemental labeled points $N_{SL}$ may be received. In an alternative embodiment, the ninth indicator may not be received. For example, a default value may be stored, for example, in computer-readable medium 208 and used automatically. In another alternative embodiment, the value of the number of supplemental labeled points $N_{SL}$ may not be selectable. Instead, a fixed, predefined value may be used. The number of supplemental labeled points $N_{SL}$ defines a number of additional data points of partially labeled dataset 224 that are identified for truth labeling on each iteration as described further below. Merely for illustration, the number of supplemental labeled points $N_{SL}$ may be between 2 and 10 though the user may determine that other values are more suitable for their application.

In an operation 617, a tenth indicator of a number of times $M_{SL}$ to perform supplemental labeling may be received. In an alternative embodiment, the tenth indicator may not be received. For example, a default value may be stored, for example, in computer-readable medium 208 and used automatically when the tenth indicator is not received. In an alternative embodiment, the number of times may not be selectable. Instead, a fixed, predefined value may be used. Merely for illustration, the number of times $M_{SL}$ may be set between 3 and 1000 though the user may determine that other values are more suitable for their application as understood by a person of skill in the art, for example, based on computing resources available, size of partially labeled dataset 224, etc.

In an operation 618, an affinity matrix W is computed based on the kernel function indicated by operation 606 and the kernel parameter value indicated by operation 608. For example, using the Gaussian kernel function, the affinity matrix W is defined as $$W_{ij} = \exp\frac{-\|x_i - x_j\|^2}{2s^2}$$

if i≠j and $W_{ii}=0$ for i=j, where s is the kernel parameter value and the affinity matrix W is an n×n matrix such that i=1, ..., n and j=1, ..., n.

Similar to operation 508, in an operation 620, the diagonal matrix D is computed based on the affinity matrix W. For example, using the Gaussian kernel function, the diagonal matrix D is an n×n matrix and is defined as $D_{ii}=\Sigma_{j=1}^{n}W_{ij}$ and $D_{ij}=0$ if i≠j.

Similar to operation 510, in an operation 622, the normalized distance matrix S is computed based on the affinity matrix W and the diagonal matrix D. For example, the normalized distance matrix S is an n×n matrix and is defined as $S=D^{-1/2}WD^{-1/2}$.

In an operation 624, a label matrix Y is defined based on partially labeled dataset 224. Label matrix Y is an n×c matrix with $Y_{ik}=1$ if $x_i$ is labeled as $y_i=k$. Otherwise, $Y_{ik}=0$, where k=1, ..., c.

In an operation 626, a classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test indicated from operation 610. As an example, when the labeling convergence test "Num Iterations" is indicated from operation 610, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$. As another example, when the labeling convergence test "Within Tolerance" is indicated from operation 610, a first labeling convergence parameter value ΔF may be initialized to a large number and associated with the tolerance value τ. Either or both convergence tests may be applied. Other convergence tests may further be applied.

In an operation 628, an updated classification matrix F(t+1) is computed using F(t+1)=αSF(t)+(1−α)Y, where for a first iteration of operation 228, F(t)=F(0). The updated classification matrix F defines a label probability for each permissible value defined in label set Q for each observation vector $x_i$.

in an operation 630, the one or more labeling convergence parameter values are updated. As an example, when the labeling convergence test "Num Iterations" is indicated from operation 210, t=t+1. As another example, when the labeling convergence test "Within Tolerance" is indicated from operation 610, ΔF=F(t+1)−F(t).

In an operation 632, a determination is made concerning whether or not labeling has converged by evaluating the labeling convergence test. When labeling has converged, processing continues in an operation 634. When labeling has not converged, processing continues in operation 628 to compute a next update of classification matrix F(t+1). As an example, when the labeling convergence test "Num Iterations" is indicated from operation 610, the first labeling convergence parameter value t is compared to the labeling convergence test value that is the number of iterations K. When $t \geq M_L$, labeling has converged. As another example, when the labeling convergence test "Within Tolerance" is indicated from operation 210, the first labeling convergence parameter value ΔF is compared to the labeling convergence test value that is the tolerance value τ. When ΔF≤τ, labeling has converged.

Referring to FIG. 6B, in operation 634, the $y_i$-variable (target) value of each observation vector $x_i$ is labeled using F(t). $y_i$ is selected for each observation vector $x_i$ based on $y_i = \text{argmax}_{j \leq c} F_{ij}(t)$. As a result, a label with a highest classification value as indicated by $\text{argmax}_{j \leq c} F_{ij}(t)$ is selected as the $y_i$-variable (target) value or label for the observation vector $x_i$.

In an operation 636, a determination is made concerning whether or not supplemental labeling is done. When supplemental labeling is done, processing continues in an operation 638. When supplemental labeling is not done, processing continues in an operation 640. For example, supplemental labeling is done when a number of times operations 640-650 have been performed is greater than or equal to $M_{SL}$.

In operation 638, the $y_i$-variable (target) value of each observation vector $x_i$ selected in operation 634 is output. For example, each observation vector $x_i$ with its selected $y_i$-variable (target) value is stored in labeled dataset 228. Labeled dataset 228 may be stored on master device 102 and/or on one or more computing devices of the plurality of node devices 104 in a variety of formats as understood by a person of skill in the art. All or a subset of labeled dataset 228 further may be output to display 216, to printer 220, etc. For example, medical images labeled as including a tumor may be recognized by master labeling application 222 and presented on display 216 or indicators of the medical images may be printed on printer 220. As another option, a notification message may be sent to a clinician indicating that a tumor has been identified based on a "tumor" label determined for the image data. In an illustrative embodiment, an alert message may be sent to another device using communication interface 206, printed on printer 220 or another printer, presented visually on display 216 or another display, presented audibly using speaker 218 or another speaker, etc. based on how urgent a response is needed to a certain label. For example, if a sound signal or image data indicate an intrusion into a surveilled area, a notification message may be sent to a responder.

In an operation 640, a distance matrix Dis is computed between each pair of label distributions defined by F(t). As an example, the distance function indicated from operation 614 is used to compute distance matrix Dis between each pair of label probability distributions defined by F(t). Distance matrix Dis is a symmetric n×n matrix. For illustration, when the distance function indicated from operation 214 is "Kullback-Leibler", $$Dis_{ik} = \sum_{i=1}^{n} \sum_{j=1}^{c} F_{kj}(t) \log \frac{F_{kj}(t)}{F_{ij}(t)},$$

where k=1, . . . , n.

In an operation 642, the number of supplemental labeled points $N_{SL}$ are selected from distance matrix Dis by identifying the $N_{SL}$ data points having the smallest distances in distance matrix Dis. The index i to the observation vector $x_i$ associated with each data point may be identified as part of the selection.

In an operation 644, a truth label is requested for each of the selected $N_{SL}$ data points by presenting the observation vector $x_i$ associated with each data point. For example, if the observation vector $x_i$ includes an image, the image is presented on display 216 with a request that a user determine the truth label, the true $y_i$-variable (target) value, for that observation vector $x_i$. The truth label may represent different values dependent on what the image represents or indicates. As another example, if the observation vector $x_i$ includes a sound signal, the sound signal is played on speaker 218 with a request that a user determine the truth label, the true $y_i$-variable (target) value, for that observation vector $x_i$. The truth label may represent different values dependent on what the sound signal represents or indicates.

In an operation 646, a truth response label, the true $y_i$-variable (target) value for each observation vector $x_i$ of the selected $N_{SL}$ data points, is received. The truth response label includes one of the permissible values included in label set Q.

In an operation 648, the truth response label, the true $y_i$-variable (target) value for each observation vector $x_i$ of the selected $N_{SL}$ data points, is updated in partially labeled dataset 224. As a result, l has been increased by $N_{SL}$. Partially labeled dataset 224 may be sorted so that the newly labeled data points are included in point set x={$x_1$, . . . , $x_l$, $x_{l+1}$, . . . , $x_n$}, where the observation vectors $x_i$ (i≤l) are labeled as $y_i \in Q$, and the remaining observation vectors $x_i$ (l<i≤n) are unlabeled (not labeled as $y_i \in Q$).

In operation 650, label matrix Y is updated based on partially labeled dataset 224 updated in operation 648, and processing continue in operation 626 to reinitialize classification matrix F and update labels in partially labeled dataset 224. Operations 640-650 are performed at least once, and operations 626-634 are performed at least twice before the $y_i$-variable (target) value of each observation vector $x_i$ selected in operation 634 is output in operation 638.

Master labeling application 222 optimizes the process of selecting better labeled data to improve classification/prediction performance. By selecting the labeled data based on a distance measure, master labeling application 222 selects the most informative data since they have the smallest distance to the rest of the data in a probability space. Geometrically, these data are frequently located in the center of clusters in the probability space. By adding them into labeled dataset 124, they can significantly facilitate the learning process in comparison to random selection.

Master labeling application 222 was used with a dataset of handwritten digits as partially labeled dataset 224. Partially labeled dataset 224 included 1500 samples (observation vectors $x_i$) (n=1500), where each sample had 64 dimensions because each handwritten digit included a gray level 8 by 8 pixel image. There were 10 labels (c=10), namely, the handwritten digits from "0" to "9". Partially labeled dataset 224 included 10 samples (l=10) that were labeled by a human. The Gaussian kernel function was used for affinity matrix W with s=0.25. Intuitively, s defines how far the influence of a single training sample reaches, with low values meaning 'far' and high values meaning 'close'. The relative weighting value α was set to 0.2, where the larger the value for α, the faster labels propagate. $N_{SL}$ was set to five and the Kullback-Leibler divergence was used for the distance function. $M_L$=5 was used.

The effectiveness of master labeling application 222 can be measured using both quantitative results and qualitative results. For quantitative results, a precision, a recall, and an F1-score were computed for each of the 10 labels. Precision can be defined as $$\text{precision} = \frac{tp}{tp + fp}$$

and recall can be defined as $$\text{recall} = \frac{tp}{tp + fn},$$

where tp is the number of true positives, fp is the number of false positives, and fn is the number of false negatives. F1-score can be defined as $$F1_{score} = 2 * \frac{\text{precision} * \text{recall}}{\text{precision} + \text{recall}}.$$

For example, for a text search on a set of documents, precision is the number of correct results divided by the number of all returned results. Recall is the number of correct results divided by the number of results that should have been returned. F1-score is a measure that combines precision, and recall and is a harmonic mean of precision and recall.

For $M_{SL}$=9, master labeling application 222 achieved 94% precision and 93% recall with 50 total labeled samples (five samples having minimum distance in summed distance matrix Dis were added to partially labeled dataset 224 at each iteration) and 1450 unlabeled samples.

For qualitative results, the five samples having minimum distance in summed distance matrix Dis are shown in FIGS. 7A-7E for a first iteration of operations 640-650, for a second iteration of operations 640-650, for a third iteration of operations 640-650, for a fourth iteration of operations 640-650, and for a fifth iteration of operations 640-650, respectively. "Predict" above each image indicates the label determined in operation 634 for the sample, and "truth" above each image indicates the label received in operation 646 for the sample. Note that the number of correct predictions increases with each iteration.

The performance gains resulting from use of master labeling application 222 can be measured by comparing the precision, recall, and F1-score generated by operations 628-634 versus operations 626-650 using the same number of labeled samples. For example, operations 628-634 were performed with 15 labeled samples and the labeled points output to labeled dataset 228 after operation 634 in operation 638 without performing operations 640-650. In comparison, operations 628-634 were performed with 10 initially labeled samples and operations 626-634 were performed with five supplemental samples selected in operation 642 for one or more additional iterations. Table I below shows the precision results:

TABLE I

| Number of labeled samples | operations 628-634 | operations 626-650 |
|---|---|---|
| 15 labels (10 initial, $M_{SL}$ = 1, 1 iteration of operations 640-650) | 0.47 | 0.73 |
| 20 labels (10 initial, $M_{SL}$ = 2, 2 iterations of operations 640-650) | 0.61 | 0.90 |
| 25 labels (10 initial, $M_{SL}$ = 3, 3 iterations of operations 640-650) | 0.76 | 0.92 |
| 30 labels (10 initial, $M_{SL}$ = 4, 4 iterations of operations 640-650) | 0.76 | 0.93 |

Table II below shows the recall results:

TABLE II

| Number of labeled samples | operations 628-634 | operations 626-650 |
|---|---|---|
| 15 labels (10 initial, $M_{SL}$ = 1, 1 iteration of operations 640-650) | 0.59 | 0.79 |
| 20 labels (10 initial, $M_{SL}$ = 2, 2 iterations of operations 640-650) | 0.73 | 0.88 |
| 25 labels (10 initial, $M_{SL}$ = 3, 3 iterations of operations 640-650) | 0.81 | 0.89 |
| 30 labels (10 initial, $M_{SL}$ = 4, 4 iterations of operations 640-650) | 0.83 | 0.91 |

Table III below shows the F1-score results:

TABLE III

| Number of labeled samples | operations 628-634 | operations 626-650 |
|---|---|---|
| 15 labels (10 initial, $M_{SL}$ = 1, 1 iteration of operations 640-650) | 0.49 | 0.76 |
| 20 labels (10 initial, $M_{SL}$ = 2, 2 iterations of operations 640-650) | 0.66 | 0.89 |
| 25 labels (10 initial, $M_{SL}$ = 3, 3 iterations of operations 640-650) | 0.77 | 0.90 |

TABLE III-continued

| Number of labeled samples | operations 628-634 | operations 626-650 |
|---|---|---|
| 30 labels (10 initial, $M_{SL}$ = 4, 4 iterations of operations 640-650) | 0.79 | 0.91 |

The precision, recall, and F1-score values demonstrate that master labeling application 222 achieves better classification results in terms of the ability to correctly label an item with fewer incorrect labels over prior algorithms that label unlabeled data using a fixed number of randomly selected observation vectors $x_i$. For example, the improvement may be attributable to the selection of supplemental labels that have minimum average distances and, as a result, are more informative.

Master labeling application 222 can be implemented as part of a machine learning application. Master labeling application 222 lowers the cost associated with training the object labeling process because fewer samples are needed to be labeled due to the identification of the samples that are most informative.

Among other applications, master labeling application 222 can be used for image recognition on the Internet. For example, the objective is to identify whether an image is or is not an image of a cat based on a limited time and resource budget. The labeling task is usually accomplished by volunteers. Using master labeling application 222, the best set for the training data is identified.

Master labeling application 222 can be used for image recognition in sports analysis to recognize human actions such as diving, walking, running, swinging, kicking, lifting, etc. Image recognition in this area is a challenging task due to significant intra-class variations, occlusion, and background cluster for big data. Most of the existing work uses action models based on statistical learning algorithms for classification. To obtain ideal recognition results, a massive amount of the labeled samples are required to train the complicated human action models. However, collecting labeled samples is very costly. Master labeling application 222 addresses this challenging by selecting the most informative labeled human action samples using a smaller budget while providing better classification results.

Figure 8A:
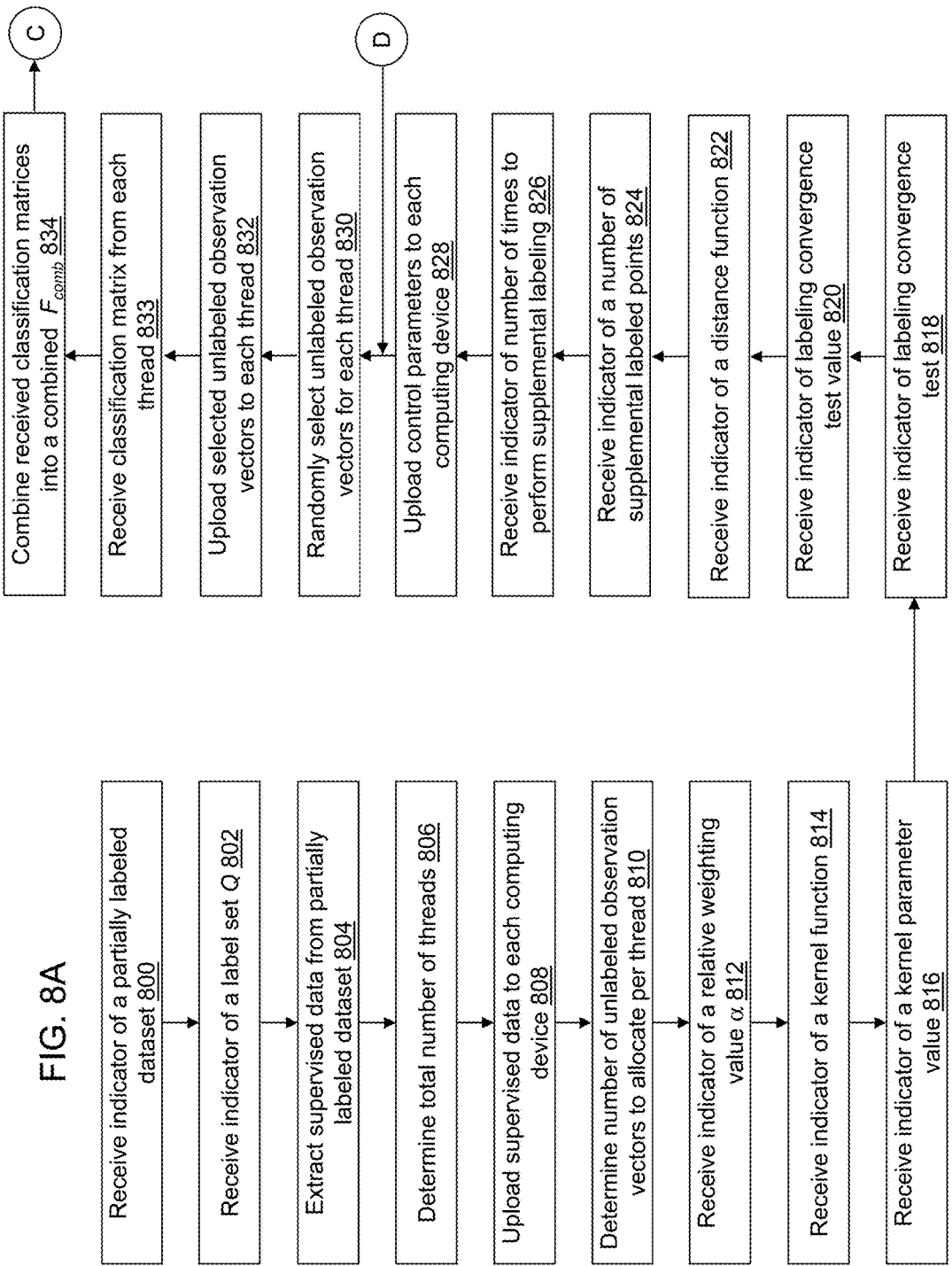
FIGS. 8A and 8B depict a flow diagram illustrating examples of operations performed by the master device of FIG. 2 in accordance with a third illustrative embodiment.
Figure 8B:
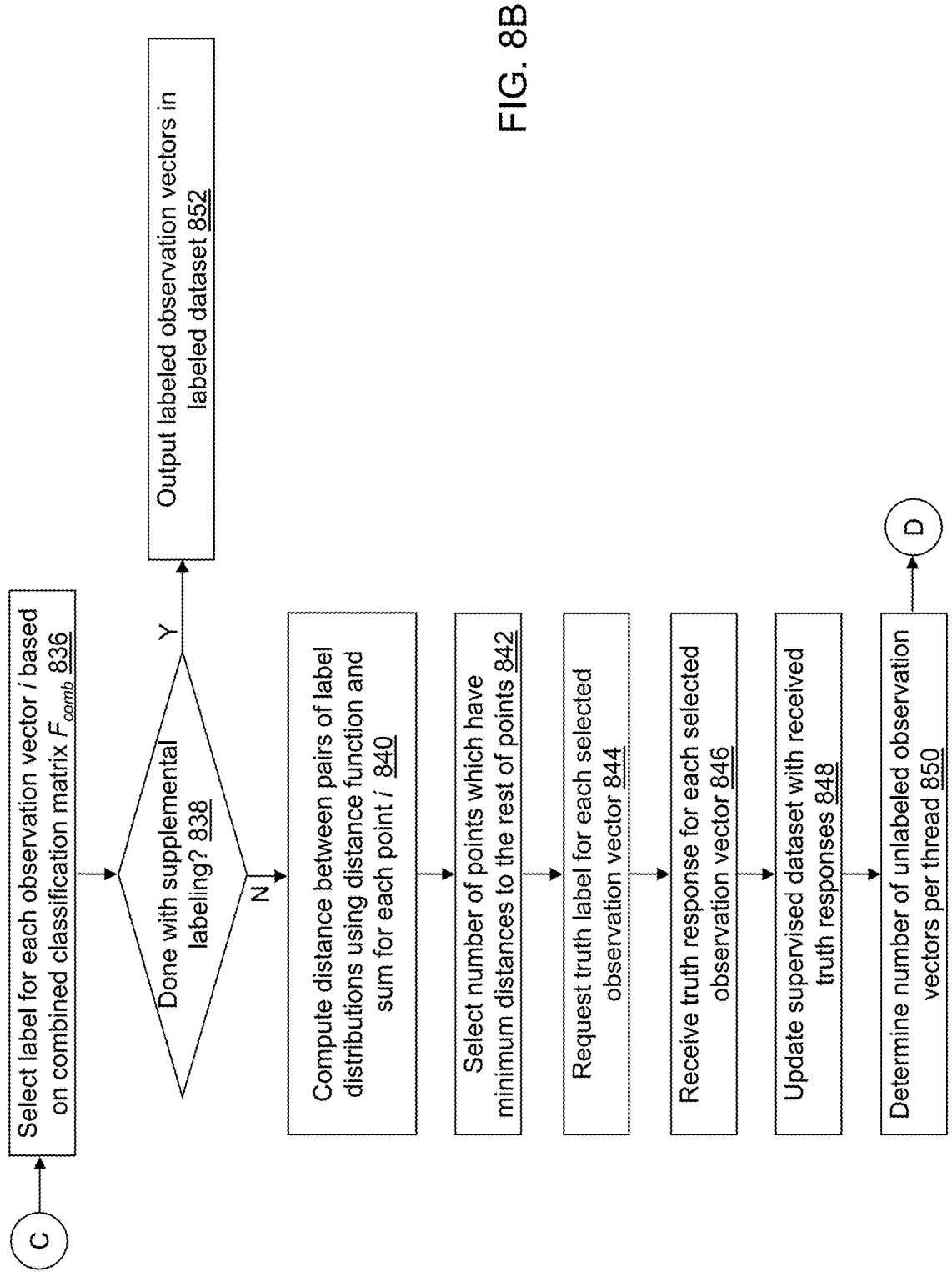

Referring to FIGS. 8A and 8B, additional example operations associated with master labeling application 222 are described. For example, master labeling application 222 may be used to create labeled dataset 228 from partially labeled dataset 224 using the plurality of node devices 104. Additional, fewer, or different operations may be performed depending on the embodiment of master labeling application 222. The order of presentation of the operations of FIGS. 8A and 8B is not intended to be limiting. Although some of the operational flows are presented in sequence, the various operations may be performed in various repetitions, concurrently (in parallel, for example, using threads), and/or in other orders than those that are illustrated. For example, a user may execute master labeling application 222, which causes presentation of a first user interface window, which may include a plurality of menus and selectors such as drop down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by master labeling application 222.

Referring to FIG. 8A, similar to operation 400, in an operation 800, the first indicator may be received that indicates partially labeled dataset 224.

Similar to operation 402, in an operation 802, the second indicator may be received that indicates a label set Q associated with partially labeled dataset 224.

Similar to operation 404, in an operation 804, supervised data 226 is extracted from partially labeled dataset 224.

Similar to operation 406, in an operation 806, the total number of threads V that will execute across the computing devices of the plurality of node devices 104 is determined.

Similar to operation 408, in an operation 808, supervised data 226 is uploaded to each node device 300.

Similar to operation 410, in an operation 810, the number of unlabeled data points to allocate to each thread is determined.

Similar to operation 412, in an operation 812, the third indicator may be received that indicates a relative weighting value $\alpha$, where $\alpha$ is selected between zero and one, non-inclusive.

Similar to operation 414, in an operation 814, the fourth indicator of a kernel function to apply may be received.

Similar to operation 416, in an operation 816, the fifth indicator of a kernel parameter value to use with the kernel function may be received.

Similar to operation 418, in an operation 818, the sixth indicator of a labeling convergence test may be received.

Similar to operation 420, in an operation 820, the seventh indicator of a labeling convergence test value may be received.

Similar to operation 614, in an operation 822, the eighth indicator of a distance function may be received.

Similar to operation 616, in an operation 824, the ninth indicator of a number of supplemental labeled points $N_{SL}$ may be received.

Similar to operation 617, in an operation 826, the tenth indicator of a number of times $M_{SL}$ to perform supplemental labeling may be received.

Similar to operation 422, in an operation 828, control parameters, such as the kernel function indicated by operation 814, the kernel parameter value indicated by operation 816, label set Q indicated by operation 810, relative weighting value $\alpha$ indicated by operation 812, the labeling convergence test indicated by operation 818, and/or the labeling convergence test value indicated by operation 820 are uploaded to each of the computing devices.

Similar to operation 424, in an operation 830, the number of unlabeled observation vectors or data points to allocate to each thread are selected.

Similar to operation 426, in an operation 832, the selected subset of unlabeled observation vectors for each thread is uploaded to each of the computing devices.

In an operation 833, the classification matrix $F_p$ of the unlabeled data subset is received or accessed from each thread p, where p=1, ..., V.

In an operation 834, the received classification matrix $F_p$ from each machine/thread is combined into a combined classification matrix $F_{comb}$ that may include overlapping observation vectors.

Referring to FIG. 8B, similar to operation 634, in an operation 836, the $y_i$-variable (target) value of each observation vector $x_i$ is labeled using $F_{comb}(t)$. When overlapping observation vectors are distributed in operation 832, the $y_i$-variable (target) value of each overlapping observation vector is determined by computing a count for the predicted label from each computing device and/or thread. The $y_i$-variable (target) value stored in labeled dataset 228 for each overlapping observation vector is the label with the highest computed count.

Similar to operation 636, in an operation 838, the determination is made concerning whether or not supplemental labeling is done. When supplemental labeling is done, processing continues in an operation 852. When supplemental labeling is not done, processing continues in an operation 840. For example, supplemental labeling is done when a number of times operations 840-850 have been performed is greater than or equal to $M_{SL}$.

Similar to operation 640, in operation 840, the distance matrix Dis is computed between each pair of label distributions defined by $F_{comb}(t)$. As an example, the distance function indicated from operation 822 is used to compute distance matrix Dis between each pair of label probability distributions defined by $F_{comb}(t)$.

Similar to operation 642, in an operation 842, the number of supplemental labeled points $N_{SL}$ are selected from distance matrix Dis by identifying the $N_{SL}$ data points having the smallest distances in distance matrix Dis. The index i to the observation vector $x_i$ associated with each data point may be identified as part of the selection.

Similar to operation 644, in an operation 844, the truth label is requested for each of the selected $N_{SL}$ data points by presenting the observation vector $x_i$ associated with each data point. For example, if the observation vector $x_i$ includes an image, the image is presented on display 216 with a request that a user determine the truth label, the true $y_i$-variable (target) value, for that observation vector $x_i$. The truth label may represent different values dependent on what the image represents or indicates. As another example, if the observation vector $x_i$ includes a sound signal, the sound signal is played on speaker 218 with a request that a user determine the truth label, the true $y_i$-variable (target) value, for that observation vector $x_i$. The truth label may represent different values dependent on what the sound signal represents or indicates.

Similar to operation 646, in an operation 846, the truth response label, the true $y_i$-variable (target) value for each observation vector $x_i$ of the selected $N_{SL}$ data points, is received.

In an operation 848, the truth response label, the true $y_i$-variable (target) value for each observation vector $x_i$ of the selected $N_{SL}$ data points, is updated in supervised data 226. As a result, l has been increased by $N_{SL}$. Partially labeled dataset 224 may be sorted so that the newly labeled data points are included in point set $x=\{x_1, \ldots, x_l, x_{l+1}, \ldots, x_n\}$, where the observation vectors $x_i$ ($i \le l$) are labeled as $y_i \in Q$, and the remaining observation vectors $x_i$ ($l < i \le n$) are unlabeled (not labeled as $y_i \in Q$).

Similar to operation 410, in an operation 850, the number of unlabeled data points to allocate to each thread is determined again because additional observation vectors have been labeled by a human, and processing continues in operation 830.

Similar to operation 638, in an operation 852, the labeled observation vectors are output, for example, to labeled dataset 228.

Figure 9:
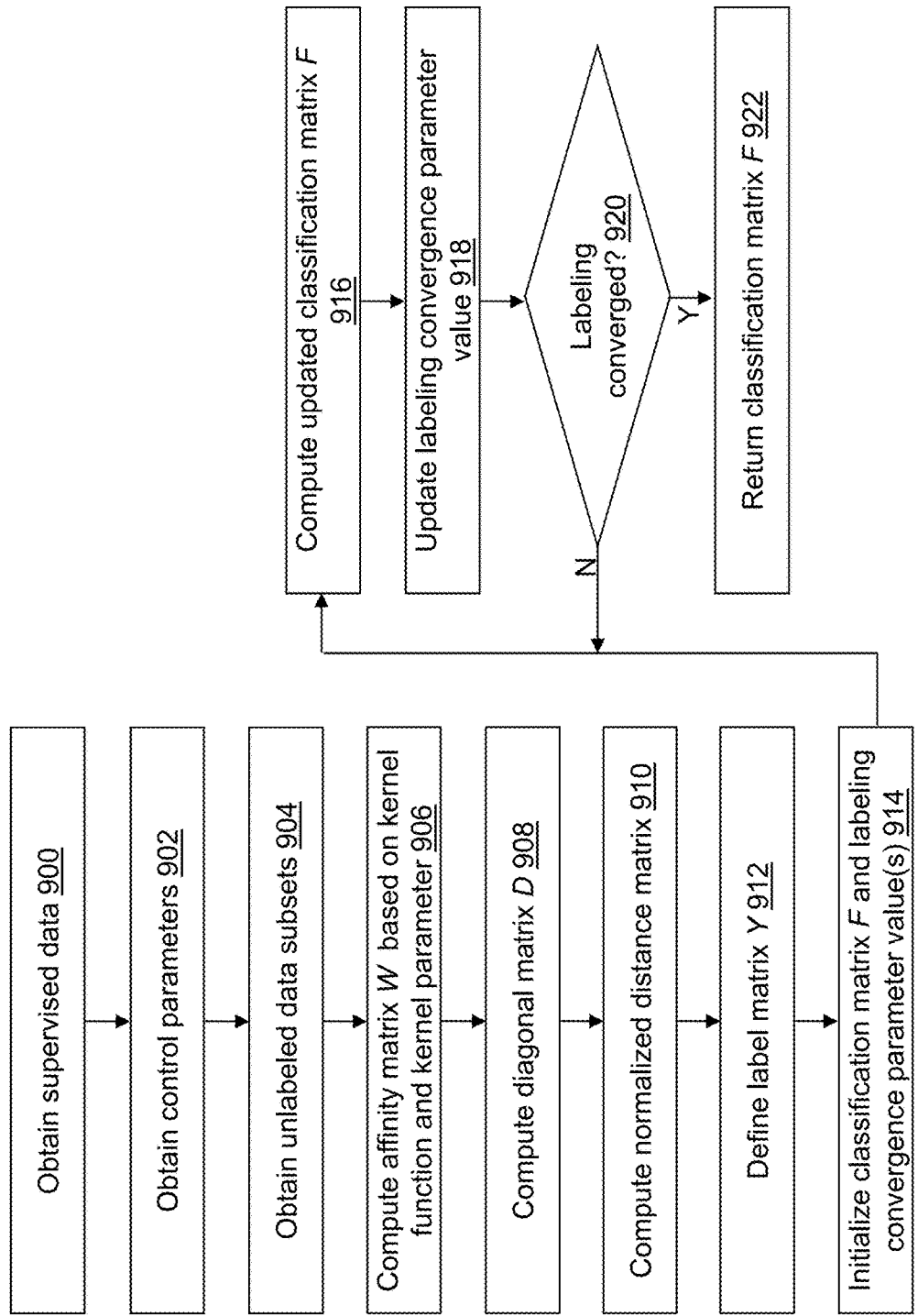
FIG. 9 depicts a flow diagram illustrating examples of operations performed by the distributed node of FIG. 3 in accordance with a third illustrative embodiment.

Referring to FIG. 9, example operations associated with local labeling application 212 are described. For example, local labeling application 312 may be used to create each locally labeled dataset of the one or more locally labeled datasets 318 and each classification matrix of the one or more classification matrices 320 from supervised data 314 and each associated unlabeled data subset of the one or more unlabeled data subsets 316. Additional, fewer, or different operations may be performed depending on the embodiment of local labeling application 312. The order of presentation of the operations of FIG. 9 is not intended to be limiting. Although some of the operational flows are presented in sequence, the various operations may be performed in various repetitions, concurrently (in parallel, for example, using threads), and/or in other orders than those that are illustrated. Each parallel process may create a locally labeled dataset of the one or more locally labeled datasets 318 and a classification matrix of the one or more classification matrices 320 from supervised data 314 and the associated unlabeled data subset of the one or more unlabeled data subsets 316. For example, a user may execute local labeling application 312, which causes presentation of a first user interface window, which may include a plurality of menus and selectors such as drop down menus, buttons, text boxes, hyperlinks, etc. associated with local labeling application 312 as understood by a person of skill in the art. The plurality of menus and selectors may be accessed in various orders. An indicator may indicate one or more user selections from a user interface, one or more data entries into a data field of the user interface, one or more data items read from second computer-readable medium 308 or otherwise defined with one or more default values, etc. that are received as an input by local labeling application 312.

Similar to operation 500, in an operation 900, supervised data 314 is obtained.

Similar to operation 502, in an operation 902, the control parameters are obtained from master device 102.

Similar to operation 504, in an operation 904, the one or more unlabeled data subsets allocated to node device 300 are obtained from master device 102 based on a number of threads selected for node device 300 to use.

Similar to operation 506, in an operation 906, the affinity matrix W is computed based on the kernel function and the kernel parameter value obtained in operation 902 or otherwise provided to each node device 300 of the plurality of node devices 104 or otherwise automatically executed by each node device 300.

Similar to operation 508, in an operation 908, the diagonal matrix D is computed based on the affinity matrix W.

Similar to operation 510, in an operation 910, the normalized distance matrix S is computed based on the affinity matrix W and the diagonal matrix D.

Similar to operation 512, in an operation 912, the label matrix Y is defined based on supervised data 314 obtained in operation 900 and an unlabeled data subset selected from the one or more unlabeled data subsets for execution by an allocated thread.

Similar to operation 514, in an operation 914, the classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test obtained in operation 902 or otherwise provided to each node device 300 of the plurality of node devices 104 or otherwise automatically executed by each node device 300. As an example, when the labeling convergence test "Num Iterations" is obtained in operation 902, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$ of the unlabeled data subset. As another example, when the labeling convergence test "Within Tolerance" is obtained in operation 902, a first labeling convergence parameter value $\Delta F$ may be initialized to a large number and associated with the tolerance value $\tau$.

Similar to operation 516, in an operation 916, the updated classification matrix $F(t+1)$ is computed using $F(t+1)=\alpha SF(t)+(1-\alpha)Y$, where for a first iteration of operation 228, $F(t)=F(0)$.

Similar to operation 518, in an operation 918, the one or more labeling convergence parameter values are updated. As an example, when the labeling convergence test "Num Iterations" is obtained in operation 902, $t=t+1$. As another example, when the labeling convergence test "Within Tolerance" is obtained in operation 902, $\Delta F=F(t+1)-F(t)$.

Similar to operation 520, in an operation 920, the determination is made concerning whether or not labeling has converged by evaluating the labeling convergence test. When labeling has converged, processing continues in an operation 922. When labeling has not converged, processing continues in operation 916 to compute a next update of classification matrix $F(t+1)$. As an example, when the labeling convergence test "Num Iterations" is obtained in operation 902, the first labeling convergence parameter value t is compared to the labeling convergence test value that is the number of iterations $M_L$. When $t \geq M_L$, labeling has converged. As another example, when the labeling convergence test "Within Tolerance" is obtained in operation 902, the first labeling convergence parameter value $\Delta F$ is compared to the labeling convergence test value that is the tolerance value $\tau$. When $\Delta F \leq \tau$, labeling has converged. Either or both convergence tests may be applied. Other convergence tests may further be applied.

In operation 922, the classification matrix $F(t)$ is returned to master device 102.

One or more operations of operations 900 to 922 may be performed by separate threads of node device 300 and/or by other node devices of the plurality of node devices 104.

Figure 10A:
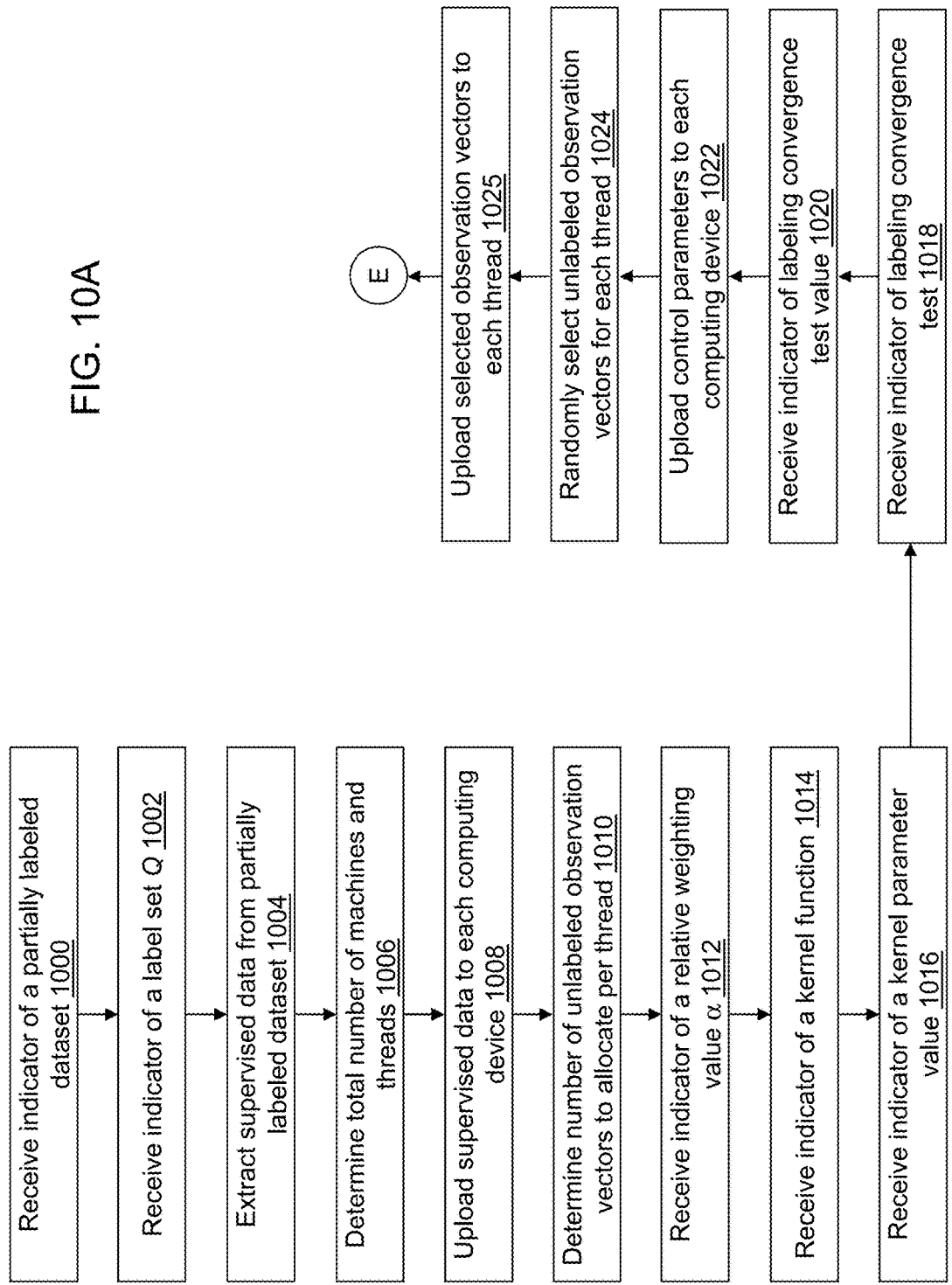
FIGS. 10A and 10B depict a flow diagram illustrating examples of operations performed by the master device of FIG. 2 in accordance with a fourth illustrative embodiment.
Figure 10B:
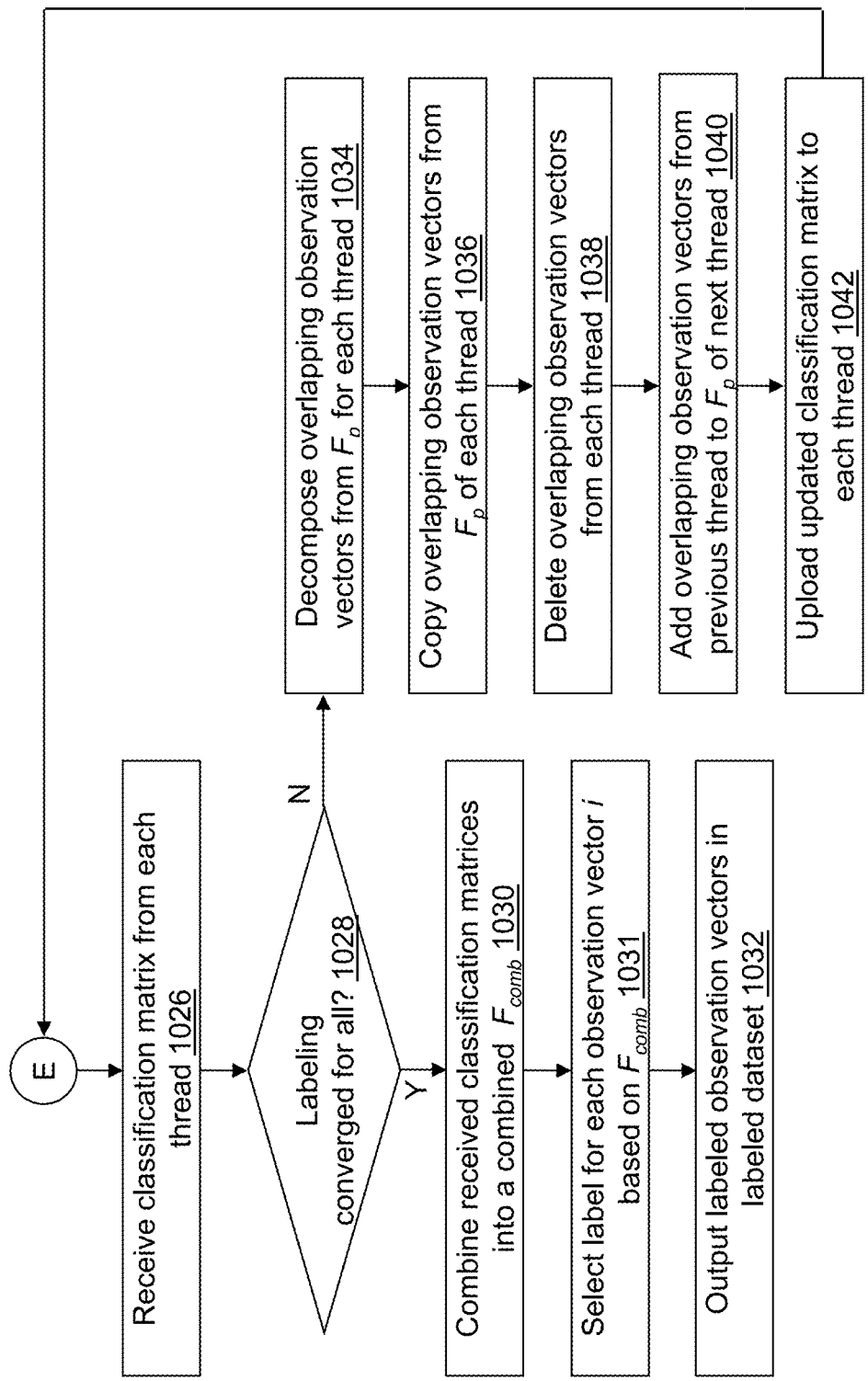

Referring to FIGS. 10A and 10B, example operations associated with master labeling application 222 are described. For example, master labeling application 222 may be used to create labeled dataset 228 from partially labeled dataset 224 using the plurality of node devices 104. Additional, fewer, or different operations may be performed depending on the embodiment of master labeling application 222. The order of presentation of the operations of FIGS. 10A and 10B is not intended to be limiting. Although some of the operational flows are presented in sequence, the various operations may be performed in various repetitions, concurrently (in parallel, for example, using threads), and/or in other orders than those that are illustrated. For example, a user may execute master labeling application 222, which causes presentation of a first user interface window, which may include a plurality of menus and selectors such as drop down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by master labeling application 222.

Referring to FIG. 10A, similar to operation 400, in an operation 1000, the first indicator may be received that indicates partially labeled dataset 224.

Similar to operation 402, in an operation 1002, the second indicator may be received that indicates a label set Q associated with partially labeled dataset 224.

Similar to operation 404, in an operation 1004, supervised data 226 is extracted from partially labeled dataset 224.

Similar to operation 406, in an operation 1006, the total number of threads V that will execute is determined.

Similar to operation 408, in an operation 1008, supervised data 226 is uploaded to each of the computing devices.

Similar to operation 410, in an operation 1010, the number of unlabeled data points to allocate to each thread is determined.

Similar to operation 412, in an operation 1012, the third indicator may be received that indicates a relative weighting value $\alpha$, where $\alpha$ is selected between zero and one, non-inclusive.

Similar to operation 414, in an operation 1014, the fourth indicator of a kernel function to apply may be received.

Similar to operation 416, in an operation 1016, the fifth indicator of a kernel parameter value to use with the kernel function may be received.

Similar to operation 418, in an operation 1018, the sixth indicator of a labeling convergence test may be received.

Similar to operation 420, in an operation 1020, the seventh indicator of a labeling convergence test value may be received.

Similar to operation 422, in an operation 1022, control parameters, such as the kernel function indicated by operation 1014, the kernel parameter value indicated by operation 1016, label set Q indicated by operation 1010, relative weighting value $\alpha$ indicated by operation 1012, the labeling convergence test indicated by operation 1018, and/or the labeling convergence test value indicated by operation 1020 are uploaded to each of the computing devices.

In an operation 1024, the number of unlabeled observation vectors or data points to allocate to each thread may be randomly selected with replacement from the remaining observation vectors $x_i$ ($1 < i \leq n$) that are unlabeled (not labeled as $y_i \in Q$). For example, separate subsets of the observation vectors $x_i$ ($1 < i \leq n$) are created for each thread or indices to the selected subset for each thread are stored, but the separate subsets include overlapping observation vectors.

Similar to operation 426, in an operation 1025, the selected subset of unlabeled observation vectors for each thread is uploaded to each respective thread.

Referring to FIG. 10B, similar to operation 833, in an operation 1026, the classification matrix $F_p$ of the unlabeled data subset is received or accessed from each thread p, where $p=1, \ldots, V$.

In an operation 1028, a determination is made concerning whether or not labeling has converged for all threads. For example, convergence may be determined for each thread by evaluating the labeling convergence test for each thread. As an example, when the labeling convergence test "Num Iterations" is obtained in operation 1018, the first labeling convergence parameter value t is compared to the labeling convergence test value that is the number of iterations $M_L$. When $t \geq M_L$, labeling has converged. As another example, when the labeling convergence test "Within Tolerance" is obtained in operation 1018, the first labeling convergence parameter value $\Delta F$ is compared to the labeling convergence test value that is the tolerance value $\tau$. When $\Delta F \leq \tau$, labeling has converged. Either or both convergence tests may be applied. Other convergence tests may further be applied.

When labeling has converged for all, processing continues in an operation 1030. When labeling has not converged for all, processing continues in an operation 1034.

Similar to operation 834, in operation 1030, the received classification matrix $F_p$ from each thread p are combined into a combined classification matrix $F_{comb}$.

Similar to operation 836, in an operation 1031, the $y_i$-variable (target) value of each observation vector $x_i$ is labeled using $F_{comb}(t)$.

Similar to operation 638, in an operation 1032, the labeled observation vectors are output, for example, to labeled dataset 228.

When overlapping observation vectors are distributed in operation 1025, the received classification matrices $F_p$ are coupled. One solution to resolve the optimization problem is to optimize the overlapping portion of the received classification matrices $F_p$ while fixing the non-overlapping portion of the received classification matrices $F_p$ and alternatively optimizing $F_p$ until all threads converge. We define $F_p^o(t)$ and $F_p^{no}(t)$, where t is an iteration number of operation 1034, o indicates an overlapping part, and no indicates a non-overlapping part. $F_p(t)$ can be decomposed as $F_p(t)=[F_p^o(t)\ F_p^{no}(t)]$. The overlapping part $F_p^o(t)$ is replaced with the latest results in the adjacent thread in operations 1034 to 1040. To accomplish this, in operation 1034, $F_p(t)$ is decomposed to define $F_p^o(t)$ and $F_p^{no}(t)$.

In an operation 1036, a copy of $F_p^o(t)$ for each thread is created. The copies may be stored in local memory such as second computer-readable medium 308.

In an operation 1038, each $F_p^o(t)$ is deleted or otherwise removed from $F_p(t)$ of each thread.

In an operation 1040, each overlapping observation vector $F_p^o(t)$ is added to $F_n$ of a next thread, where n indicates an index to a next thread such as n=p+1. For example, for a first thread n=2, for a second thread n=3, etc. For a last thread V, n=1. As a result, the overlapping portion of each classification matrix from each thread is successively added to the classification matrix of the adjacent thread to replace the previous overlapping portion.

In an operation 1042, updated classification matrix $F_p(t)$ for each thread is uploaded to each respective thread to compute $F_p(t+1)$, and processing continues in operation 1026 to await receipt of $F_p(t+1)$ from each thread.

Referring to FIG. 11, example operations associated with local labeling application 212 are described. For example, local labeling application 312 may be used to create each locally labeled dataset of the one or more locally labeled datasets 318 and each classification matrix of the one or more classification matrices 320 from supervised data 314 and each associated unlabeled data subset of the one or more unlabeled data subsets 316. Additional, fewer, or different operations may be performed depending on the embodiment of local labeling application 312. The order of presentation of the operations of FIG. 11 is not intended to be limiting. Although some of the operational flows are presented in sequence, the various operations may be performed in various repetitions, concurrently (in parallel, for example, using threads), and/or in other orders than those that are illustrated. Each parallel process may create a locally labeled dataset of the one or more locally labeled datasets 318 and a classification matrix of the one or more classification matrices 320 from supervised data 314 and the associated unlabeled data subset of the one or more unlabeled data subsets 316. For example, a user may execute local labeling application 312, which causes presentation of a first user interface window, which may include a plurality of menus and selectors such as drop down menus, buttons, text boxes, hyperlinks, etc. associated with local labeling application 312 as understood by a person of skill in the art. The plurality of menus and selectors may be accessed in various orders. An indicator may indicate one or more user selections from a user interface, one or more data entries into a data field of the user interface, one or more data items read from second computer-readable medium 308 or otherwise defined with one or more default values, etc. that are received as an input by local labeling application 312.

Similar to operation 500, in an operation 1100, supervised data 314 is obtained.

Similar to operation 502, in an operation 1102, the control parameters are obtained from master device 102. When master device 102 is performing the convergence test, the associated control parameters need not be uploaded to node device 300.

Similar to operation 504, in an operation 1104, the one or more unlabeled data subsets allocated to node device 300 are obtained from master device 102 based on a number of threads selected for node device 300 to use.

Similar to operation 506, in an operation 1106, the affinity matrix W is computed based on the kernel function and the kernel parameter value obtained in operation 902 or otherwise provided to each node device 300 of the plurality of node devices 104 or otherwise automatically executed by each node device 300.

Similar to operation 508, in an operation 1108, the diagonal matrix D is computed based on the affinity matrix W.

Similar to operation 510, in an operation 1110, the normalized distance matrix S is computed based on the affinity matrix W and the diagonal matrix D.

Similar to operation 512, in an operation 1112, the label matrix Y is defined based on supervised data 314 obtained in operation 900 and an unlabeled data subset selected from the one or more unlabeled data subsets for execution by an allocated thread.

Similar to operation 514, in an operation 1114, the classification matrix F and one or more labeling convergence parameter values are initialized. Classification matrix F is an n×c matrix. For example, classification matrix F is initialized as F(0)=Y. One or more labeling convergence parameter values may be initialized based on the labeling convergence test obtained in operation 1102 or otherwise provided to each node device 300 of the plurality of node devices 104 or otherwise automatically executed by each node device 300. As an example, when the labeling convergence test "Num Iterations" is obtained in operation 1102, a first labeling convergence parameter value t may be initialized to zero and associated with the number of iterations $M_L$ so that first labeling convergence parameter value t can be compared to the number of iterations $M_L$ to determine convergence by the labeling convergence test. Classification matrix F defines a label probability distribution matrix for each observation vector $x_i$ of the unlabeled data subset. As another example, when the labeling convergence test "Within Tolerance" is obtained in operation 1102, a first labeling convergence parameter value ΔF may be initialized to a large number and associated with the tolerance value τ.

Similar to operation 518, in an operation 1116, the one or more labeling convergence parameter values are updated. As an example, when the labeling convergence test "Num Iterations" is obtained in operation 1102, t=t+1. As another example, when the labeling convergence test "Within Tolerance" is obtained in operation 1102, ΔF=F(t+1)−F(t).

Similar to operation 922, in an operation 1118, the classification matrix F(t) is returned to master device 102.

One or more operations of operations 1100 to 1118 may be performed by separate threads of node device 300. Operations 1104 to 1118 may be performed after operation 1025 of FIG. 10A as part of initializing the classification matrix F(t).

Referring to FIG. 12, example operations associated with local labeling application 212 are described. For example, local labeling application 312 may be used to create each locally labeled dataset of the one or more locally labeled datasets 318 and/or each classification matrix of the one or more classification matrices 320 from supervised data 314 and/or each associated unlabeled data subset of the one or more unlabeled data subsets 316. Additional, fewer, or different operations may be performed depending on the embodiment of local labeling application 312. The order of presentation of the operations of FIG. 12 is not intended to be limiting. Although some of the operational flows are presented in sequence, the various operations may be performed in various repetitions, concurrently (in parallel, for example, using threads), and/or in other orders than those that are illustrated. Each parallel process may create a locally labeled dataset of the one or more locally labeled datasets 318 and a classification matrix of the one or more classification matrices 320 from supervised data 314 and the associated unlabeled data subset of the one or more unlabeled data subsets 316. For example, a user may execute local labeling application 312, which causes presentation of a first user interface window, which may include a plurality of menus and selectors such as drop down menus, buttons, text boxes, hyperlinks, etc. associated with local labeling application 312 as understood by a person of skill in the art. The plurality of menus and selectors may be accessed in various orders. An indicator may indicate one or more user selections from a user interface, one or more data entries into a data field of the user interface, one or more data items read from second computer-readable medium 308 or otherwise defined with one or more default values, etc. that are received as an input by local labeling application 312.

In an operation 1200, the classification matrix $F_p$ of the unlabeled data subset is received from master device 102 or accessed by each thread p of node device 300.

Similar to operation 516, in an operation 1202, the updated classification matrix $F_p(t+1)$ is computed using $F_p(t+1)=\alpha SF_p(t)+(1-\alpha)Y$.

Similar to operation 518, in an operation 1204, the one or more labeling convergence parameter values are updated. As an example, when the labeling convergence test "Num Iterations" is obtained in operation 1102, t=t+1. As another example, when the labeling convergence test "Within Tolerance" is obtained in operation 1102, $\Delta F_p=F_p(t+1)-F_p(t)$.

In an operation 1206, the classification matrix $F_p(t)$ and the updated one or more labeling convergence parameter values are returned to master device 102.

One or more operations of operations 1200 to 1206 may be performed by separate threads of node device 300. Operations 1200 to 1206 may be performed after operation 1046 of FIG. 10B as part of initializing the classification matrix $F_p(t)$.

Figure 13A:
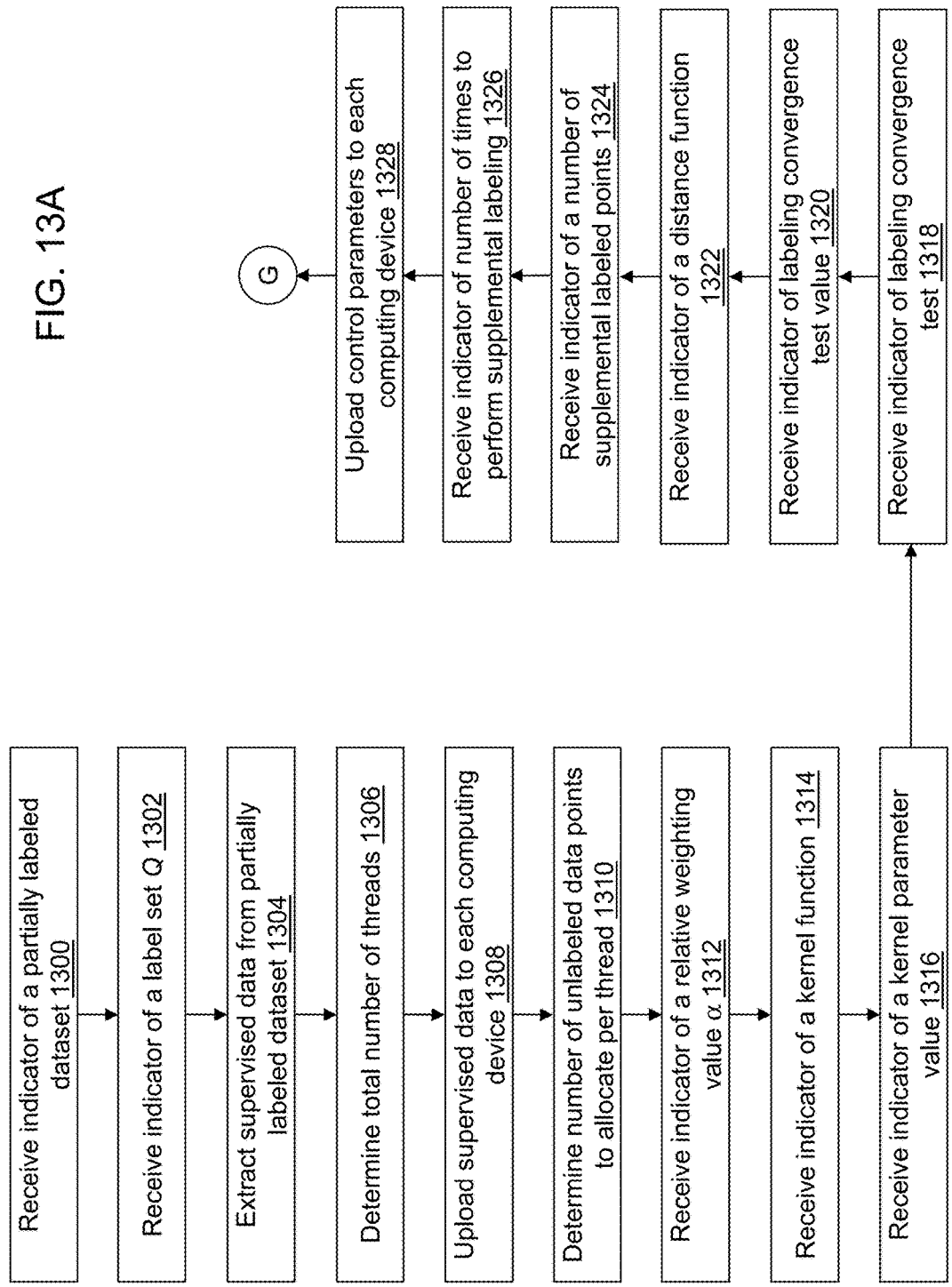
FIGS. 13A, 13B, and 13C depict a flow diagram illustrating examples of operations performed by the master device of FIG. 2 in accordance with a fifth illustrative embodiment.
Figure 13B:
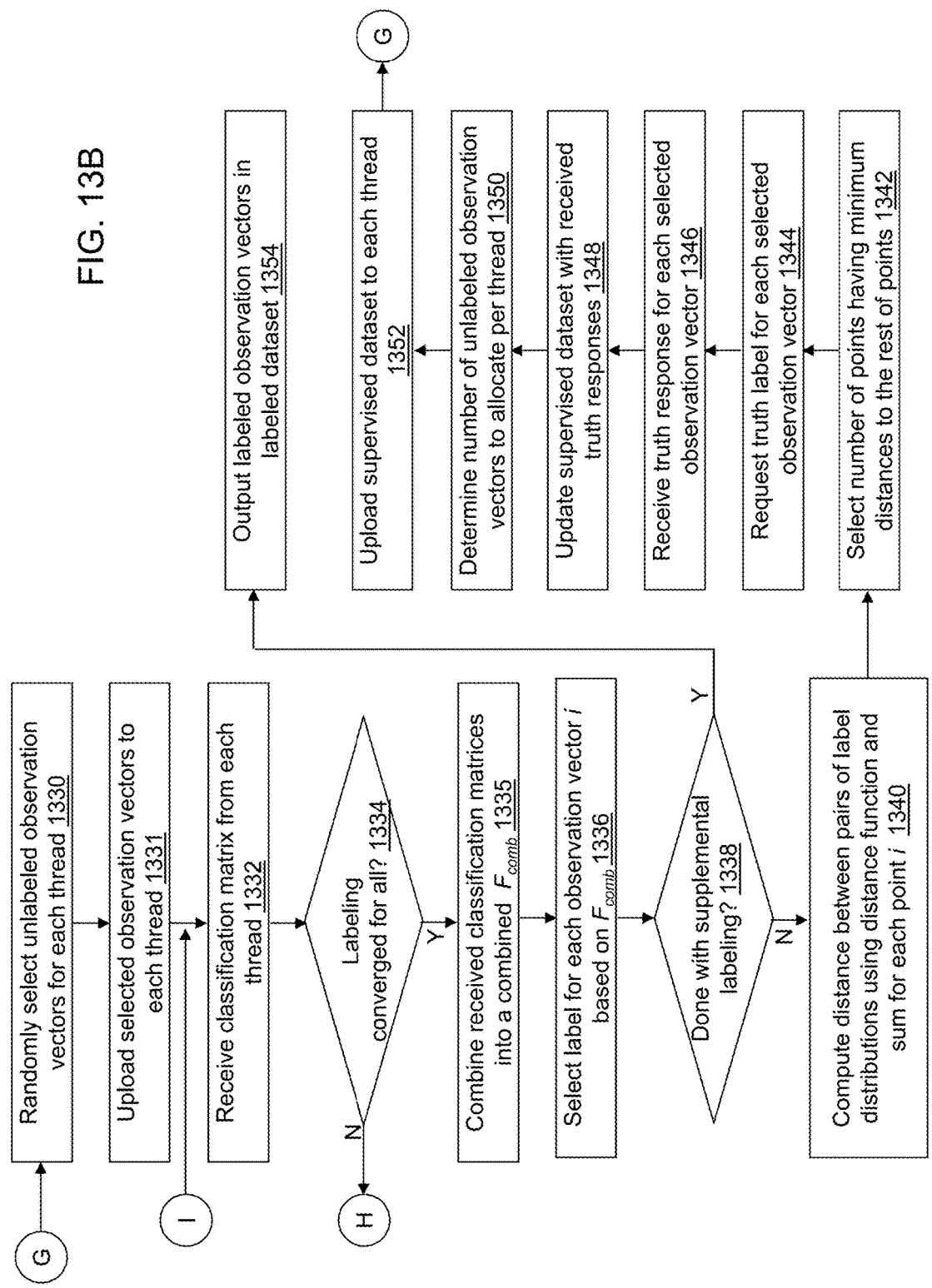
Figure 13C:
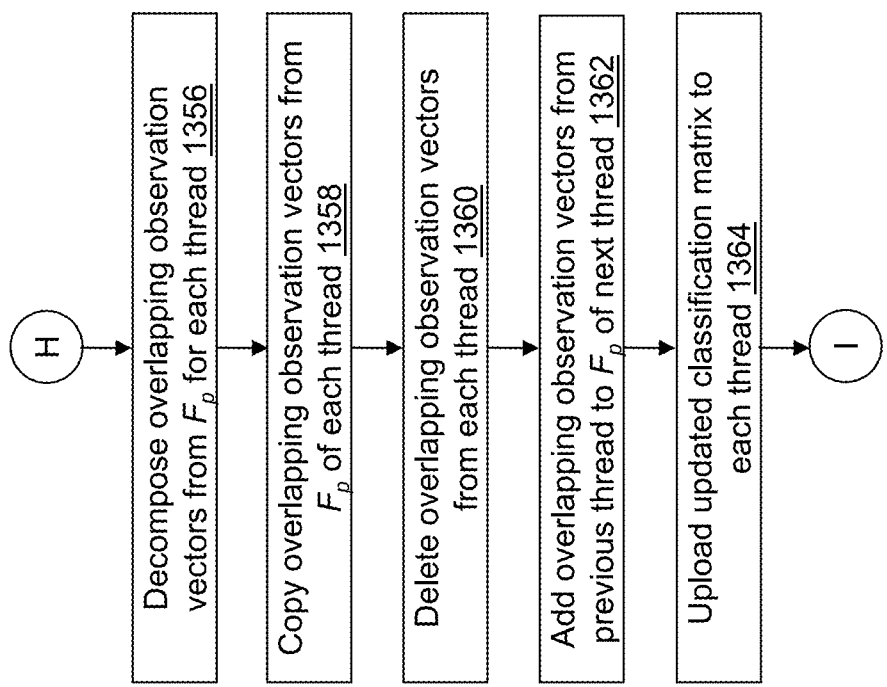

Referring to FIGS. 13A, 13B, and 13C, example operations associated with master labeling application 222 are described. For example, master labeling application 222 may be used to create labeled dataset 228 from partially labeled dataset 224 using the plurality of node devices 104. Additional, fewer, or different operations may be performed depending on the embodiment of master labeling application 222. The order of presentation of the operations of FIGS. 13A, 13B, and 13C is not intended to be limiting. Although some of the operational flows are presented in sequence, the various operations may be performed in various repetitions, concurrently (in parallel, for example, using threads), and/or in other orders than those that are illustrated. For example, a user may execute master labeling application 222, which causes presentation of a first user interface window, which may include a plurality of menus and selectors such as drop down menus, buttons, text boxes, hyperlinks, etc. associated with master labeling application 222 as understood by a person of skill in the art. The plurality of menus and selectors may be accessed in various orders. An indicator may indicate one or more user selections from a user interface, one or more data entries into a data field of the user interface, one or more data items read from computer-readable medium 208 or otherwise defined with one or more default values, etc. that are received as an input by master labeling application 222.

Referring to FIG. 13A, similar to operation 400, in an operation 1300, the first indicator may be received that indicates partially labeled dataset 224.

Similar to operation 402, in an operation 1302, the second indicator may be received that indicates a label set Q associated with partially labeled dataset 224.

Similar to operation 404, in an operation 1304, supervised data 226 is extracted from partially labeled dataset 224.

Similar to operation 406, in an operation 1306, the total number of threads V is determined.

Similar to operation 408, in an operation 1308, supervised data 226 is uploaded to each of the computing devices.

Similar to operation 410, in an operation 1310, the number of unlabeled data points to allocate to each thread is determined.

Similar to operation 412, in an operation 1312, the third indicator may be received that indicates a relative weighting value $\alpha$, where a is selected between zero and one, non-inclusive.

Similar to operation 414, in an operation 1314, the fourth indicator of a kernel function to apply may be received.

Similar to operation 416, in an operation 1316, the fifth indicator of a kernel parameter value to use with the kernel function may be received.

Similar to operation 418, in an operation 1318, the sixth indicator of a labeling convergence test may be received.

Similar to operation 420, in an operation 1320, the seventh indicator of a labeling convergence test value may be received.

Similar to operation 614, in an operation 1322, the eighth indicator of a distance function may be received.

Similar to operation 616, in an operation 1324, the ninth indicator of a number of supplemental labeled points $N_{SL}$ may be received.

Similar to operation 617, in an operation 1326, the tenth indicator of a number of times $M_{SL}$ to perform supplemental labeling may be received.

Similar to operation 422, in an operation 1328, control parameters, such as the kernel function indicated by operation 414, the kernel parameter value indicated by operation 416, label set Q indicated by operation 410, relative weighting value $\alpha$ indicated by operation 412, the labeling convergence test indicated by operation 418, and/or the labeling convergence test value indicated by operation 420 are uploaded to each of the computing devices.

Referring to FIG. 13B, similar to operation 424, in an operation 1330, the number of unlabeled observation vectors or data points to allocate to each thread are randomly selected without replacement from the remaining observation vectors $x_i$ (1≤i≤n) that are unlabeled (not labeled as $y_i \in Q$).

Similar to operation 426, in an operation 1331, the selected subset of unlabeled observation vectors for each thread is uploaded to each of the computing devices.

Similar to operation 833, in an operation 1332, the classification matrix $F_p$ of the unlabeled data subset is received or accessed from each thread p, where p=1, . . . , V.

Similar to operation 1028, in an operation 1334, the determination is made concerning whether or not labeling has converged for all threads. For example, convergence may be determined for each thread by evaluating the labeling convergence test for each thread. As an example, when the labeling convergence test "Num Iterations" is obtained in operation 1318, the first labeling convergence parameter value t is compared to the labeling convergence test value that is the number of iterations $M_L$. When $t \geq M_L$, labeling has converged. As another example, when the labeling convergence test "Within Tolerance" is obtained in operation 1318, the first labeling convergence parameter value ΔF is compared to the labeling convergence test value that is the tolerance value τ. When $\Delta F \leq \tau$, labeling has converged. Either or both convergence tests may be applied. Other convergence tests may further be applied. When labeling has converged for all, processing continues in an operation 1335. When labeling has not converged for all, processing continues in an operation 1356.

Similar to operation 834, in operation 1335, the received classification matrix $F_p$ from each thread p are combined into a combined classification matrix $F_{comb}$.

Similar to operation 836, in an operation 1336, the $y_i$-variable (target) value of each observation vector $x_i$ is labeled using $F_{comb}(t)$.

Similar to operation 636, in an operation 1338, the determination is made concerning whether or not supplemental labeling is done. When supplemental labeling is done, processing continues in an operation 1354. When supplemental labeling is not done, processing continues in an operation 1340. For example, supplemental labeling is done when a number of times operations 1340-1352 have been performed is greater than or equal to $M_{SL}$.

Similar to operation 640, in operation 1340, the distance matrix Dis is computed between each pair of label distributions defined by $F_{comb}(t)$. As an example, the distance function indicated from operation 1322 is used to compute distance matrix Dis between each pair of label probability distributions defined by $F_{comb}(t)$.

Similar to operation 642, in an operation 1342, the number of supplemental labeled points $N_{SL}$ are selected from distance matrix Dis by identifying the $N_{SL}$ data points having the smallest distances in distance matrix Dis. The index i to the observation vector $x_i$ associated with each data point may be identified as part of the selection.

Similar to operation 644, in an operation 1344, the truth label is requested for each of the selected $N_{SL}$ data points by presenting the observation vector $x_i$ associated with each data point.

Similar to operation 646, in an operation 1346, the truth response label, the true $y_i$-variable (target) value for each observation vector $x_i$ of the selected $N_{SL}$ data points, is received.

Similar to operation 848, in an operation 1348, the truth response label, the true $y_i$-variable (target) value for each observation vector $x_i$ of the selected $N_{SL}$ data points, is updated in supervised data 226. As a result, l has been increased by $N_{SL}$.

Similar to operation 410, in an operation 1350, the number of unlabeled data points to allocate to each thread is determined again because additional observation vectors have been labeled by a human.

Similar to operation 408 and operation 1308, in an operation 1352, the updated supervised data 226 is uploaded to each of the computing devices and processing continues in operation 1330.

Similar to operation 638, in operation 1354, the labeled observation vectors are output, for example, to labeled dataset 228.

Referring to FIG. 13C, similar to operation 1034, in an operation 1356, $F_p(t)$ is decomposed to define $F_p^o(t)$ and $F_p^{no}(t)$.

Similar to operation 1036, in an operation 1358, a copy of $F_p^o(t)$ for each thread is created. The copies may be stored in local memory such as second computer-readable medium 308.

Similar to operation 1038, in an operation 1360, each $F_p^o(t)$ is deleted or otherwise removed from $F_p(t)$ of each thread.

Similar to operation 1040, in an operation 1362, each overlapping observation vector $F_p^o(t)$ is added to $F_n$ of a next thread, where n indicates an index to a next thread such as n=p+1. For example, for a first thread n=2, for a second thread n=3, etc. For a last thread V, n=1. As a result, the overlapping portion of each classification matrix from each thread is successively added to the classification matrix of the adjacent thread to replace the previous overlapping portion.

Similar to operation 1042, in operation 1364, updated classification matrix $F_p(t)$ for each thread is uploaded to each respective thread to compute $F_p(t+1)$, and processing continues in operation 1332 to await receipt of $F_p(t+1)$ from each thread By distributing the labeling task across a plurality of node devices 104, the computation time can be significantly reduced while maintaining the obtained accuracy. Master labeling application 222 in combination with local labeling application 312 perform labeling using a plurality of threads and/or a plurality of computing devices. As a result, data labeling system 100 improves an execution time significantly compared to a single thread based system. Data labeling system 100 reduces the time complexity from $O(dn^2)$ to $O(dn^2/V^2)$ where V represents the total number of threads.

Figure 14:
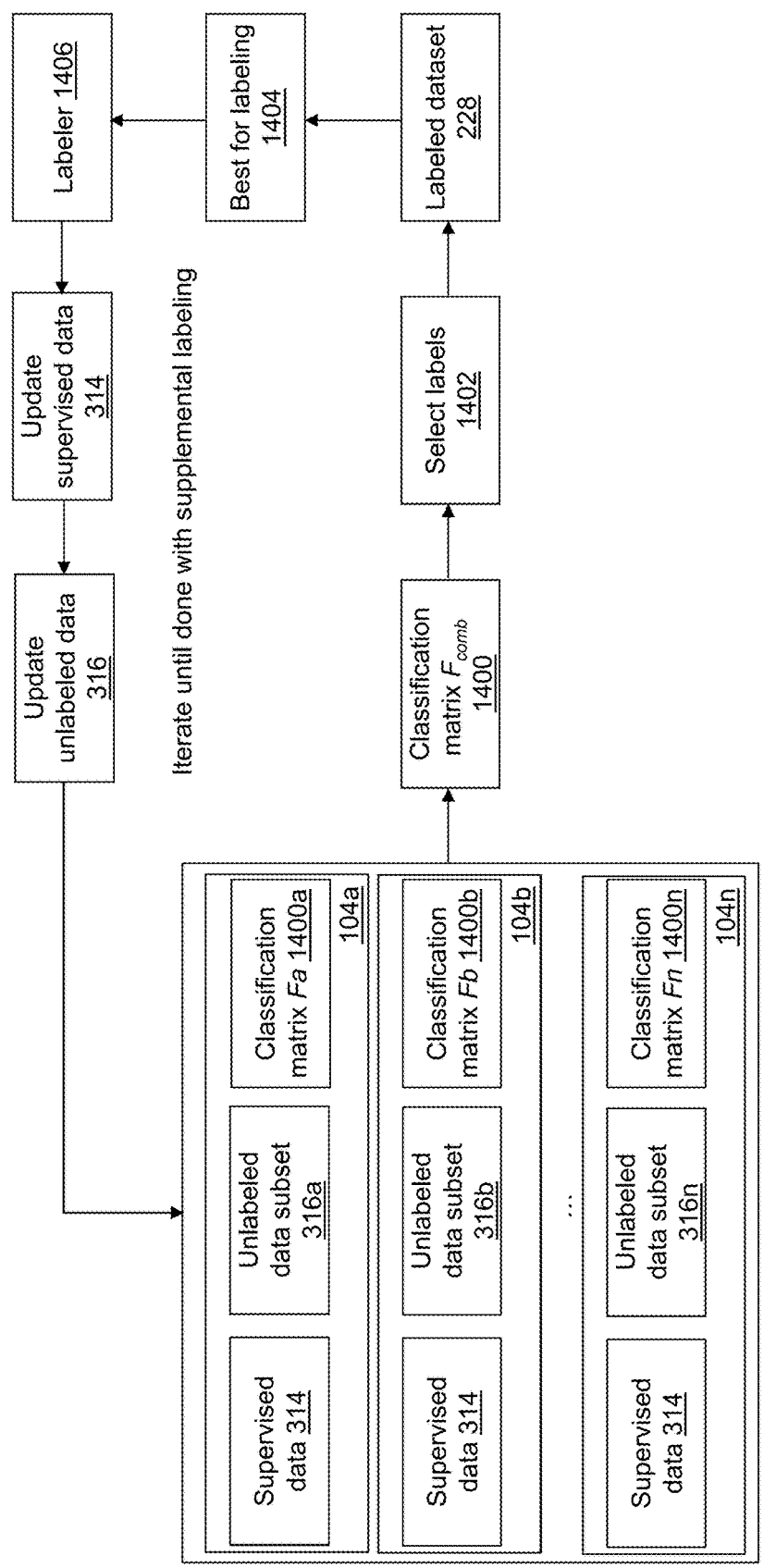
FIG. 14 depicts a block diagram summarizing first operations of the data labeling system of FIG. 1 in accordance with an illustrative embodiment.
Figure 15:
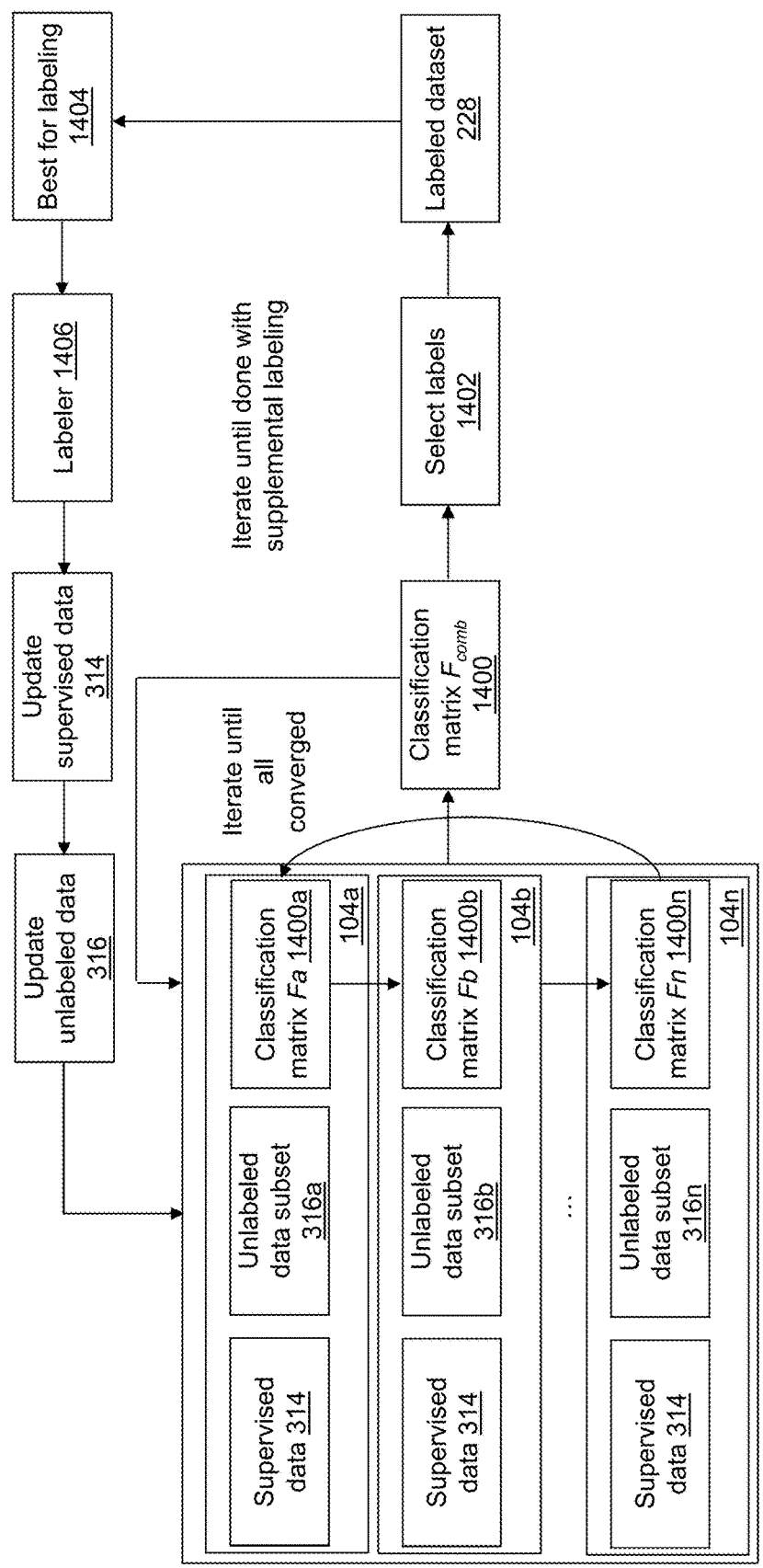
FIG. 15 depicts a block diagram summarizing second operations of the data labeling system of FIG. 1 in accordance with an illustrative embodiment.
Figure 16:
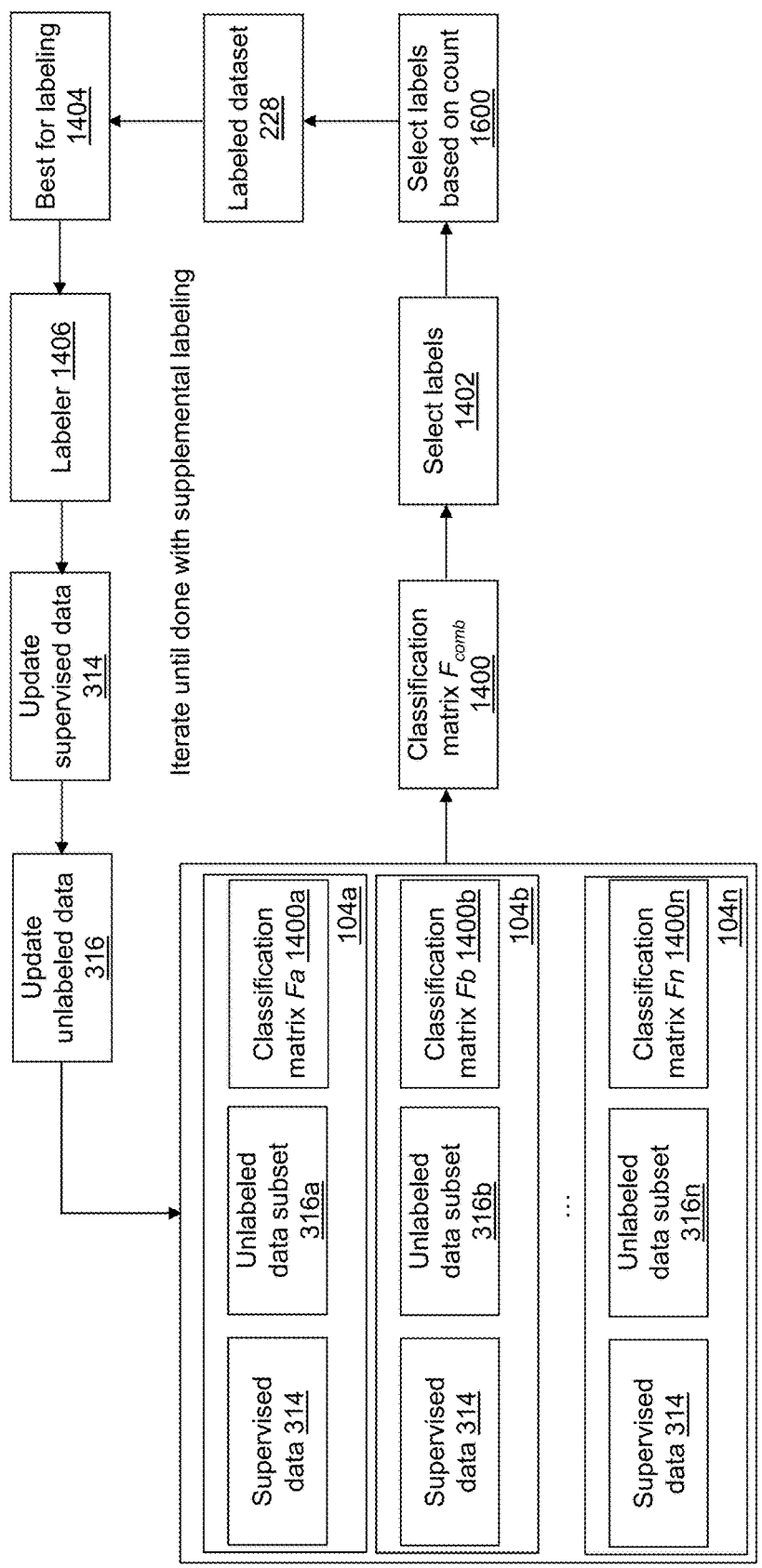
FIG. 16 depicts a block diagram summarizing third operations of the data labeling system of FIG. 1 in accordance with an illustrative embodiment.

Referring to FIG. 14, a block diagram summarizing first operations of data labeling system 100 are shown in accordance with an illustrative embodiment. Referring to FIG. 15, a block diagram summarizing second operations of data labeling system 100 are shown in accordance with an illustrative embodiment. The second operations may be used when data distribution is overlapped. Referring to FIG. 16, a block diagram summarizing third operations of data labeling system 100 are shown in accordance with an illustrative embodiment. The third operations may be used when data distribution is overlapped to provide a faster approximate solution. The first operations may be used when data distribution is non-overlapped. A first step performed by master labeling application 222 may be to detect if the distributed data is overlapped or not to determine whether or not to perform the first operations or one of the second operations or the third operations.

Referring to FIG. 14, supervised data 314 is distributed to each node device 300 of the plurality of node devices 104. A non-overlapping portion of the unlabeled data (unlabeled data subset 316a, unlabeled data subset 316b, . . . , unlabeled data subset 316n) is also distributed to each node device 300 of the plurality of node devices 104. Each node device 300 of the plurality of node devices 104 computes a converged classification matrix using its copy of supervised data 314 and non-overlapping portion of the unlabeled data (classification matrix $F_a$ 1400a, classification matrix $F_b$ 1400b, . . . , classification matrix $F_n$ 1400n) and send the converged classification matrix to master device 102 that combines them into combined classification matrix $F_{comb}$ 1400. Labels are selected 1402 for each observation vector using combined classification matrix $F_{comb}$ 1400 as described previously ($y_i = \text{argmax}_{j \leq c} F_{ij}$ (t)) and output to labeled dataset 228. The "best" observation vectors for supplemental labeling 1404 are selected based on the distance computation described previously using combined classification matrix $F_{comb}$ 1400.

A labeler 1406 provides labels for the selected "best" observation vectors. Supervised data 314 is updated with the provided labels. The unlabeled data 316 is also updated to remove now labeled observation vectors and the process repeats until supplemental labeling is done.

Referring to FIG. 15, supervised data 314 is distributed to each node device 300 of the plurality of node devices 104. Overlapping portions of the unlabeled data (unlabeled data subset 316a, unlabeled data subset 316b, . . . , unlabeled data subset 316n) is also distributed to each node device 300 of the plurality of node devices 104. Each node device 300 of the plurality of node devices 104 computes a converged classification matrix using its copy of supervised data 314 and non-overlapping portion of the unlabeled data (classification matrix $F_a$ 1400a, classification matrix $F_b$ 1400b, . . . , classification matrix $F_n$ 1400n). As described, for example, in operations 1356 to 1364, the overlapping portions of the classification matrix are successively updated each iteration between the plurality of node devices 104 until each node device 300 is converged.

The converged classification matrix from each node device 300 is sent to master device 102 that combines them into combined classification matrix 1400. Labels are selected 1402 for each observation vector using combined classification matrix $F_{comb}$ 1400 as described previously ($y_i = \text{argmax}_{j \leq c} F_{ij}(t)$) and output to labeled dataset 228. The "best" observation vectors for supplemental labeling 1404 are selected based on the distance computation described previously using combined classification matrix $F_{comb}$ 1400.

Labeler 1406 provides labels for the selected "best" observation vectors. Supervised data 314 is updated with the provided labels. The unlabeled data 316 is also updated to remove now labeled observation vectors and the process repeats until supplemental labeling is done.

Referring to FIG. 16, supervised data 314 is distributed to each node device 300 of the plurality of node devices 104. Overlapping portions of the unlabeled data (unlabeled data subset 316a, unlabeled data subset 316b, . . . , unlabeled data subset 316n) is also distributed to each node device 300 of the plurality of node devices 104. Each node device 300 of the plurality of node devices 104 computes a converged classification matrix using its copy of supervised data 314 and non-overlapping portion of the unlabeled data (classification matrix $F_a$ 1400a, classification matrix $F_b$ 1400b, . . . , classification matrix $F_n$ 1400n).

The converged classification matrix from each node device 300 is sent to master device 102 that combines them into combined classification matrix $F_{comb}$ 1400. Labels are selected 1402 for each observation vector using combined classification matrix $F_{comb}$ 1400 as described previously ($y_i = \text{argmax}_{j \leq c} F_{ij}(t)$). For the overlapping observation vectors, a count of each label assignment is computed, and the count is used to assign the label for the observation vector 1600. The assigned label for each observation vector is output to labeled dataset 228. The "best" observation vectors for supplemental labeling 1404 are selected based on the distance computation described previously using combined classification matrix $F_{comb}$ 1400.

Labeler 1406 provides labels for the selected "best" or "most informative" observation vectors. Supervised data 314 is updated with the provided labels. The unlabeled data 316 is also updated to remove now labeled observation vectors and the process repeats until supplemental labeling is done.

Figure 17:
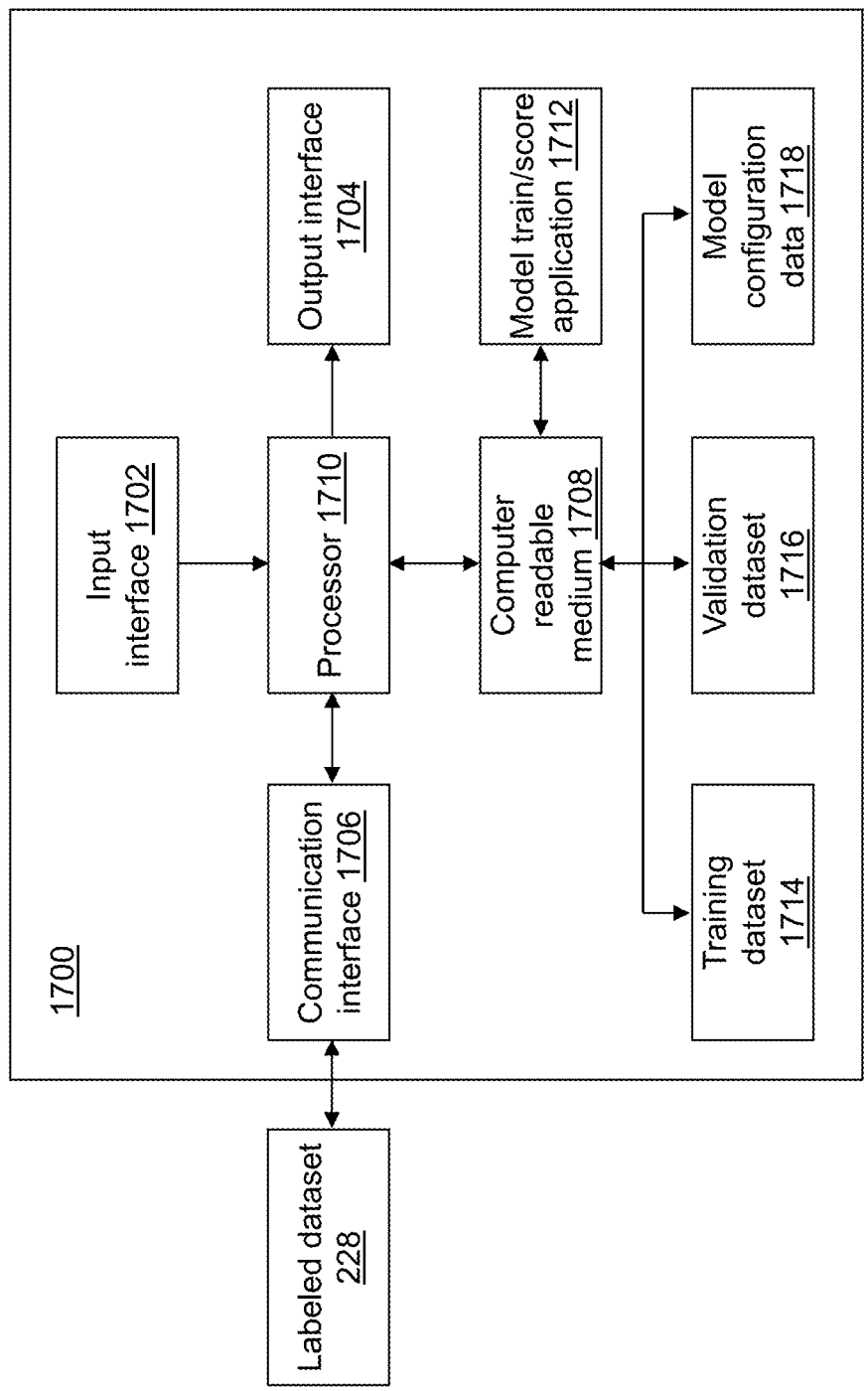
FIG. 17 depicts a block diagram of a model training device in accordance with an illustrative embodiment.

For illustration, referring to FIG. 17, a block diagram of a model training device 1700 is shown in accordance with an example embodiment. Model training device 1700. Model training device 1700 may include a third input interface 1702, a third output interface 1704, a third communication interface 1706, a third computer-readable medium 1708, a third processor 1710, a model train/score application 1712, a training dataset 1714, a validation dataset 1716, and model configuration data 1718. Labeled dataset 228 is split into training dataset 1714 and validation dataset 1716 based on a selection of a percent of labeled dataset 228 to use for training with the remainder allocated to validation of the trained model.

Third input interface 1702 provides the same or similar functionality as that described with reference to input interface 202 of master device 102 though referring to model training device 1700. Third output interface 1704 provides the same or similar functionality as that described with reference to output interface 204 of master device 102 though referring to model training device 1700. Third communication interface 1706 provides the same or similar functionality as that described with reference to communication interface 206 of master device 102 though referring to model training device 1700. Data and messages may be transferred between model training device 1700 and another computing device such as master device 102 using third communication interface 1706. Third computer-readable medium 1708 provides the same or similar functionality as that described with reference to computer-readable medium 208 of master device 102 though referring to model training device 1700. Third processor 1710 provides the same or similar functionality as that described with reference to processor 210 of master device 102 though referring to model training device 1700.

Model train/score application 1712 may be integrated with other analytic tools. As an example, model train/score application 1712 may be part of an integrated data analytics software application and/or software architecture such as that offered by SAS Institute Inc. of Cary, N.C., USA. For example, model train/score application 1712 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, model train/score application 1712 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS® Viya™, SAS In-Memory Statistics for Hadoop®, SAS® Forecast Server, all of which are developed and provided by SAS Institute Inc. of Cary, N.C., USA. Merely for illustration, model train/score application 1712 may implement a model type that may be selected from "Decision Tree", "Factorization Machine", "Random Forest", "Gradient Boosting Tree", "Neural Network", "Support Vector Machine", etc.

The selected model type is trained using training dataset 1714. Once trained, the trained model is scored using validation dataset 1716. Once validated, the model configuration for the validated model is stored in model configuration data 1718 for use in predicting results.

Figure 18:
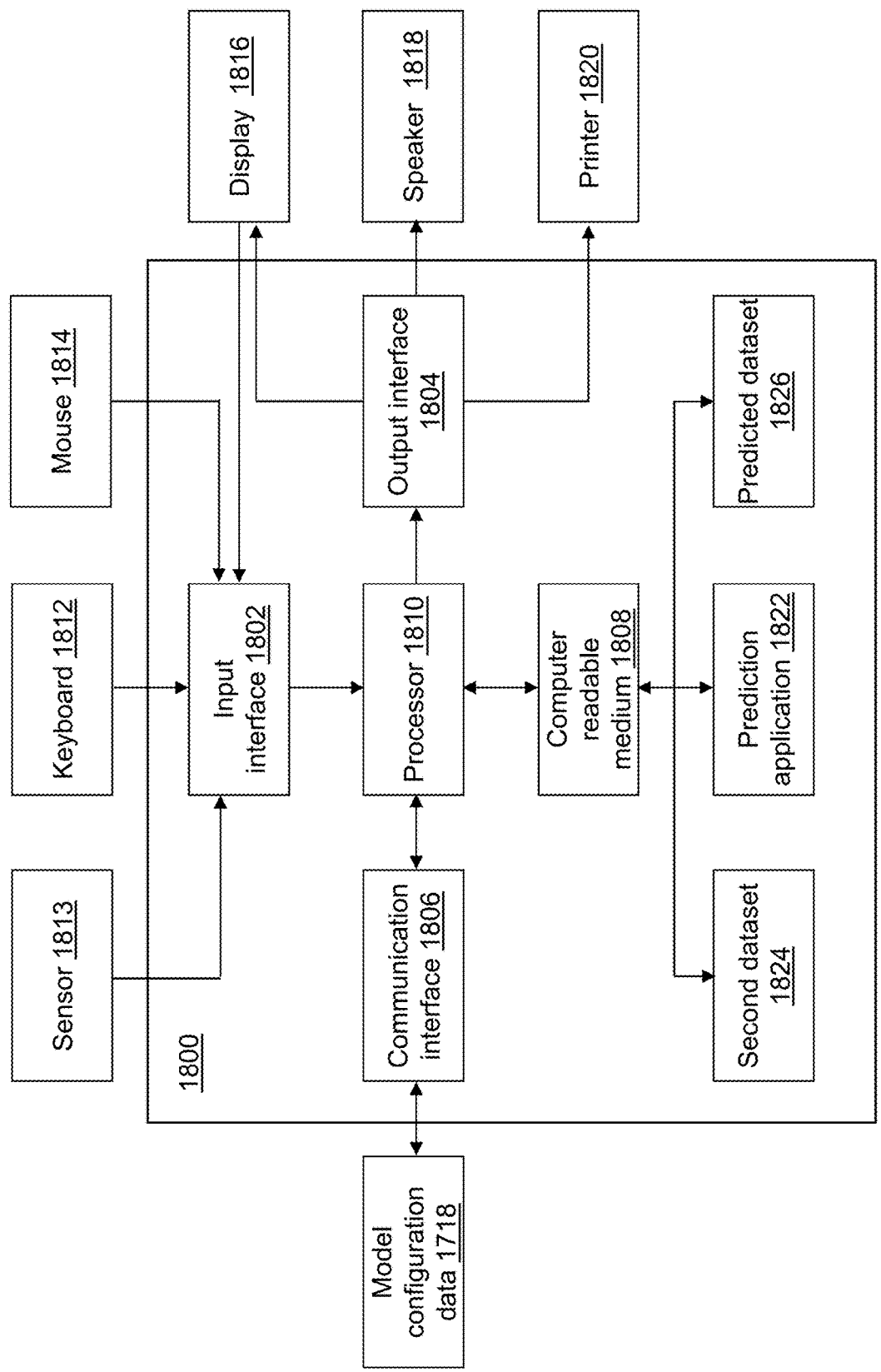
FIG. 18 depicts a block diagram of a prediction device in accordance with an illustrative embodiment.

Referring to FIG. 18, a block diagram of a prediction device 1800 is shown in accordance with an illustrative embodiment. Prediction device 1800 may include a fourth input interface 1802, a fourth output interface 1804, a fourth communication interface 1806, a fourth non-transitory computer-readable medium 1808, a fourth processor 1810, a prediction application 1822, selected model data 326, a second dataset 1824, and predicted dataset 1826. Fewer, different, and/or additional components may be incorporated into prediction device 1800. Prediction device 1800 and training device 1700 and/or master device 102 may be the same or different devices.

Fourth input interface 1802 provides the same or similar functionality as that described with reference to input interface 202 of master device 102 though referring to prediction device 1800. Fourth output interface 1804 provides the same or similar functionality as that described with reference to output interface 204 of master device 102 though referring to prediction device 1800. Fourth communication interface 1806 provides the same or similar functionality as that described with reference to communication interface 206 of master device 102 though referring to prediction device 1800. Data and messages may be transferred between prediction device 1800 and training device 1700 and/or master device 102 using fourth communication interface 1806. Fourth computer-readable medium 1808 provides the same or similar functionality as that described with reference to computer-readable medium 208 of master device 102 though referring to prediction device 1800. Fourth processor 1810 provides the same or similar functionality as that described with reference to processor 210 of master device 102 though referring to prediction device 1800.

Prediction application 1822 performs operations associated with classifying or predicting a characteristic of data stored in second dataset 1824 and/or identifying outliers in second dataset 1824 to support various data analysis functions as well as provide alert/messaging related to the classified data and/or identified outliers. Dependent on the type of data stored in labeled dataset 228 and second dataset 1824, prediction application 1822 may identify anomalies as part of process control, for example, of a manufacturing process, for machine condition monitoring, for example, an electro-cardiogram device, for image classification, for intrusion detection, for fraud detection, etc. Some or all of the operations described herein may be embodied in prediction application 1822. The operations may be implemented using hardware, firmware, software, or any combination of these methods.

Referring to the example embodiment of FIG. 18, prediction application 1822 is implemented in software (comprised of computer-readable and/or computer-executable instructions) stored in fourth computer-readable medium 1808 and accessible by fourth processor 1810 for execution of the instructions that embody the operations of prediction application 1822. Prediction application 1822 may be written using one or more programming languages, assembly languages, scripting languages, etc. Prediction application 1822 may be integrated with other analytic tools. As an example, prediction application 1822 may be part of an integrated data analytics software application and/or software architecture such as that offered by SAS Institute Inc. of Cary, N.C., USA. For example, prediction application 1822 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, prediction application 1822 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 1822 further may be performed by an ESPE. Prediction application 1822, model train/score application 412, and/or master labeling application 222 may be the same or different applications that are integrated in various manners to fully label partially labeled dataset 224 and execute a predictive model type using labeled dataset 228 and/or second dataset 1824 in a single computing device or a plurality of distributed computing devices.

Prediction application 1822 may be implemented as a Web application. Prediction application 1822 may be integrated with other system processing tools to automatically process data generated as part of operation of an enterprise, to classify data in the processed data, to identify any outliers in the processed data, and/or to provide a warning or alert associated with the data classification and/or outlier identification using fourth input interface 1802, fourth output interface 1804, and/or fourth communication interface 1806 so that appropriate action can be initiated in response. For example, a warning or an alert may be presented using a second display 1816, a second speaker 1818, a second printer 1820, etc. or sent to one or more computer-readable media, display, speaker, printer, etc. of distributed computing system 1828.

Partially labeled dataset 224 and second dataset 1824 may be generated, stored, and accessed using the same or different mechanisms. Similar to partially labeled dataset 224, second dataset 1824 may include a plurality of rows and a plurality of columns with the plurality of rows referred to as observations or records, and the columns referred to as variables that are associated with an observation. Second dataset 1824 may be transposed.

Similar to partially labeled dataset 224, second dataset 1824 may be stored on fourth computer-readable medium 1808 or on one or more computer-readable media of node devices 104 and accessed by prediction device 1800 using fourth communication interface 1806. Data stored in second dataset 1824 may be a sensor measurement or a data communication value, for example, from a sensor 1813, may be generated or captured in response to occurrence of an event or a transaction, generated by a device such as in response to an interaction by a user with the device, for example, from a second keyboard 1812 or a second mouse 1814, etc. The data stored in second dataset 1824 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 1824 may be captured at different time points periodically, intermittently, when an event occurs, etc. One or more columns may include a time value. Similar to partially labeled dataset 224, data stored in second dataset 1824 may be generated as part of the IoT, and some or all data may be pre- or post-processed by an ESPE.

Similar to partially labeled dataset 224, second dataset 1824 may be stored in various compressed formats such as a coordinate format, a compressed sparse column format, a compressed sparse row format, etc. Second dataset 1824 further may be stored using various structures as known to those skilled in the art including a file system, a relational database, a system of tables, a structured query language database, etc. on prediction device 1800 and/or on node devices 104. Prediction device 1800 and/or master device 102 may coordinate access to second dataset 1824 that is distributed across node devices 104. For example, second dataset 1824 may be stored in a cube distributed across a grid of computers as understood by a person of skill in the art. As another example, second dataset 1824 may be stored in a multi-node Hadoop® cluster. As another example, second dataset 1824 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 1824.

Figure 19:
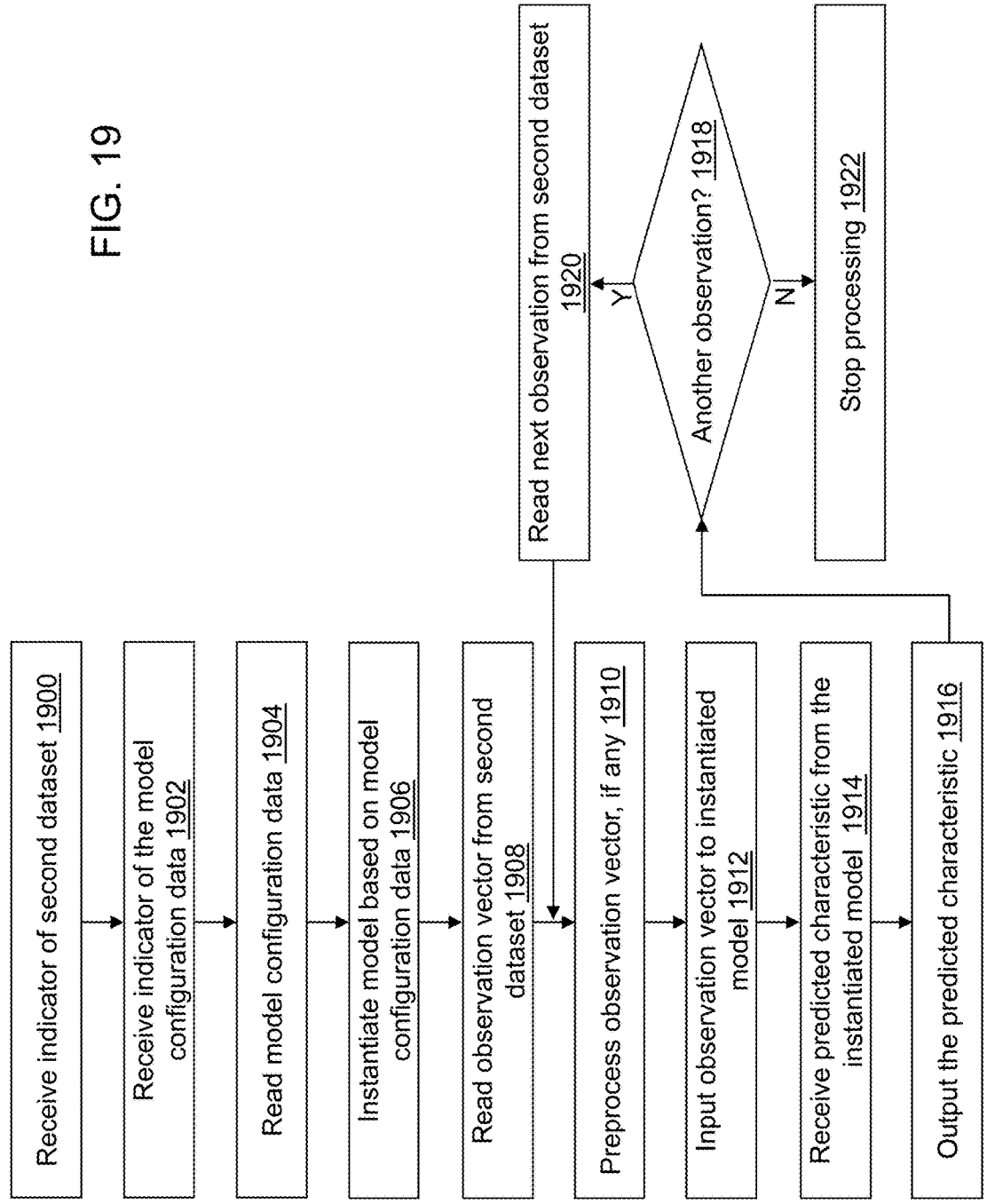
FIG. 19 depicts a flow diagram illustrating examples of operations performed by the prediction device of FIG. 18 in accordance with an illustrative embodiment.

Referring to FIG. 19, example operations of prediction application 1822 are described. Additional, fewer, or different operations may be performed depending on the embodiment of prediction application 1822. The order of presentation of the operations of FIG. 19 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1900, an eleventh indicator may be received that indicates second dataset 1824. For example, the eleventh indicator indicates a location and a name of second dataset 1824. As an example, the eleventh indicator may be received by prediction application 1822 after selection from a user interface window or after entry by a user into a user interface window. In an alternative embodiment, second dataset 1824 may not be selectable. For example, a most recently created dataset may be used automatically. As another example, second dataset 1824 may be provided automatically as part of integration between prediction application 1822, model train/score application 412, and/or master labeling application 222.

In an operation 1902, a twelfth indicator may be received that indicates model configuration data 1718. For example, the eighth indicator indicates a location and a name of model configuration data 1718. As an example, the twelfth indicator may be received by prediction application 1822 after selection from a user interface window or after entry by a user into a user interface window. In an alternative embodiment, model configuration data 1718 may not be selectable. For example, most recently created model configuration data may be used automatically. As another example, model configuration data 1718 may be provided automatically as part of integration between prediction application 1822, model train/score application 412, and/or master labeling application 222.

In an operation 1904, a model description is read from model configuration data 1718.

In an operation 1906, a model is instantiated with information read from model configuration data 1718. For example, the type of model, its hyperparameters, and other characterizing elements are read and used to instantiate a model.

In an operation 1908, an observation vector is read from second dataset 1824.

In an operation 1910, the observation vector is pre-processed, if any pre-processing is performed.

In an operation 1912, the optionally pre-processed observation vector is input to the instantiated model.

In an operation 1914, an output of the instantiated model is received. The output may indicate a predicted characteristic of the observation vector.

In an operation 1916, the predicted characteristic may be output, for example, by storing the predicted characteristic with the observation vector to predicted dataset 1826. In addition, or in the alternative, the predicted characteristic may be presented on second display 1816, printed on second printer 1820, a message including the predicted characteristic may be sent to another computing device using fourth communication interface 1806, an alarm or other alert signal may be sounded through second speaker 1818, etc.

In an operation 1918, a determination is made concerning whether or not second dataset 1824 includes another observation vector. When second dataset 1824 includes another observation vector, processing continues in an operation 1920. When second dataset 1824 does not include another observation vector, processing continues in an operation 1922.

In operation 1920, a next observation vector is read from second dataset 1824, and processing continues in operation 1910.

In operation 1922, processing stops and cleanup is performed as needed.

There are applications for prediction application 1822, model train/score application 412, and/or master labeling application 222 in many areas such as process control and equipment health monitoring, image processing and classification, data segmentation, data analysis, etc. Model train/score application 412 executes models that include decision tree models, random forest models, gradient boost models, neural network models, support vector machine models, factorization machine models, etc.

Figure 20:
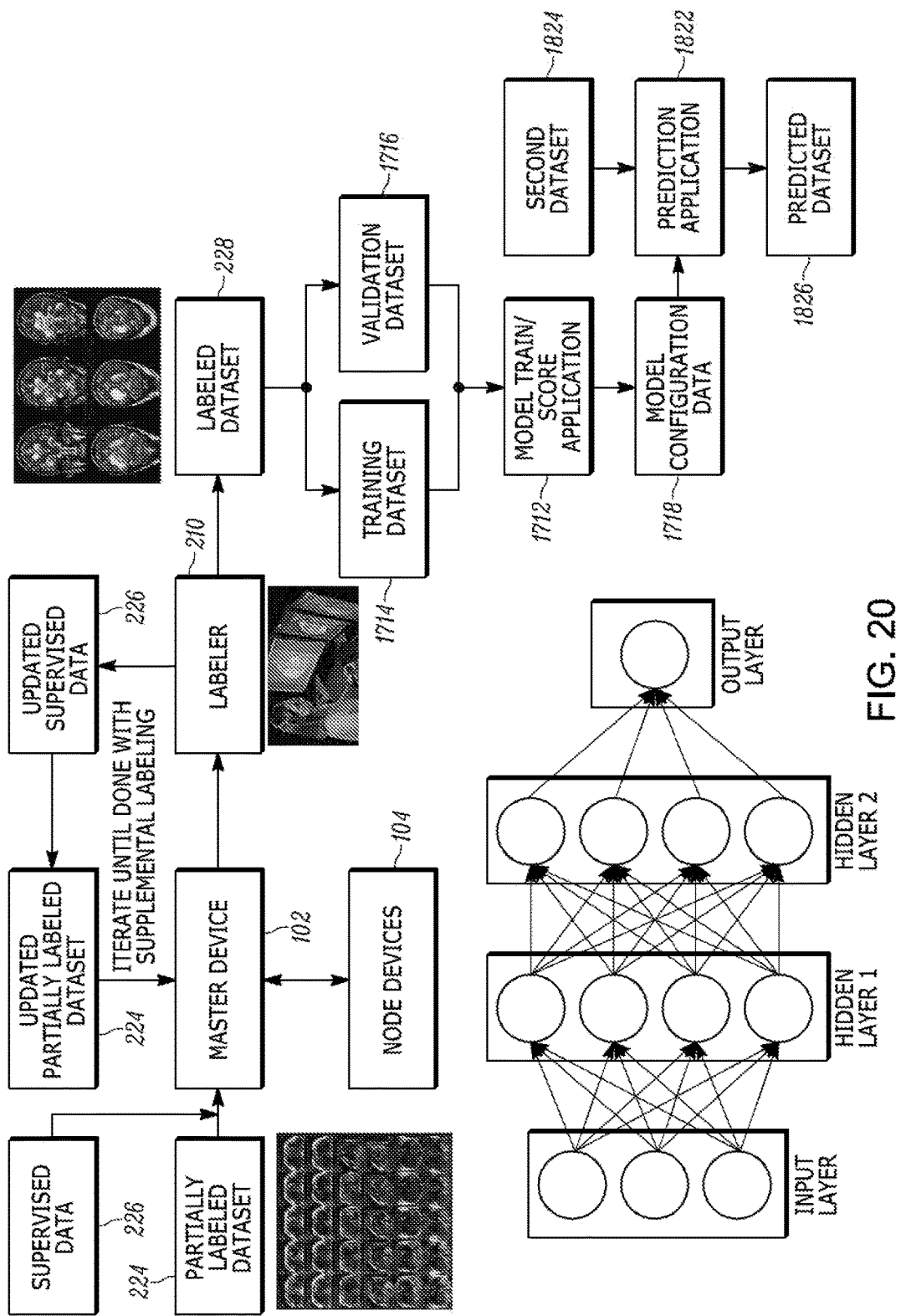
FIG. 20 depicts a block diagram illustrating use of the data labeling system of FIG. 1 in accordance with an illustrative embodiment.

Referring to FIG. 20, a block diagram illustrating use of data labeling system 100 is shown in accordance with an illustrative embodiment. In the illustrative embodiment, each observation vector is a magnetic resonance image of a portion of a body. Some of the images include a tumor or other anomaly and some do not. A small subset of the images has been labeled as either including a tumor/anomaly or not including a tumor/anomaly by a skilled clinician. One or more of the operations described above are applied to defined labeled dataset 228 in which all of the images have been labeled.

Labeled dataset 228 may be used to define prediction application 1822 using model train/score application 1712 to automatically predict whether or not a new image does or does not include a tumor/anomaly. Labeled dataset 228 may be split into training dataset 1712 and validation dataset 1716, which are input to model train/score application 1712, to train and to validate a predictive model stored in model configuration data 1718. Second dataset 1824 that includes unlabeled images is input to the predictive model implemented by prediction application 1822 to create predicted dataset 1826 that includes a prediction of whether or not a new image does or does not include a tumor/anomaly.

Data labeling system 100 can be applied to computer vision, machine learning, pattern recognition, etc. In the application of medical imaging diagnosis, there may be a large number of unlabeled medical images that are distributed due to their geographic locations. Data labeling system 100 selects the most informative labeled images in a parallel fashion. By repeating the labeling of the selected medical images with a doctor's expertise and distributing the labeled and unlabeled images to different computing devices, Data labeling system 100 is calculating the distance matrices and similar measure in a distributed way significantly reducing the computational complexity and the time required for semi-supervised learning.

An airline dataset is a two class dataset where the goal is to predict if the airline is delayed or not, which is a binary classification problem. The airline dataset was used as partially labeled dataset 224. In two different experiments, supervised data 226 included 100 and 500 observation vectors, respectively. Partially labeled dataset included 98,267 unlabeled observation vectors. As a result, supervised data 226 was 0.1% and 0.5% compared to the unlabeled observation vectors. There were four inputs. A gamma value for a Gaussian kernel used to compute a similarity measure was selected to be 280000. The maximum number of iterations was selected as 3. Data labeling system 100 included 142 computing devices with three threads in each computing device. For each supplemental labeling iteration, the top five most informative observation vectors were updated with their ground truth labels and added to supervised data 226.

After defining labeled dataset 228, a neural network was applied as a classifier for supervised learning. The neural network (NNET) model was based on a NNET procedure implemented using SAS® Visual Data Mining and Machine Learning. 50 percent of labeled dataset 228 was used to define training dataset 1714 and 50 percent of labeled dataset 228 was used to define validation dataset 1716. The number of layers of the neural network was adjusted to achieve a best classification performance. Results were generated 1) using only the NNET with two layers, 2) using only the NNET with seven layers, 3) using only master labeling application 222 and local labeling application 312, and 4) using labeled dataset 228 computed by master labeling application 222 and local labeling application 312 input to the NNET with seven layers. The comparative results are shown in Table 4 below for 0.1% and are shown in Table 5 below for 0.5%.

TABLE 4

|  | NNET (2 layers) | NNET (7 layers) | Labeling application (LA) | LA + NNET (7 layers) |
|---|---|---|---|---|
| Accuracy | 76.2% | 73.6% | 94.4% | 97.5% |
| Sensitivity | 100% | 100% | 99.4% | 99.7% |
| Specificity | 10.5% | 0.6% | 80.9% | 93.7% |
| Labeled Obs | 100 | 100 | 100 | 100 |
| Unlabeled Obs | 100K | 100K | 100K | 100K |

TABLE 5

|  | NNET (3 layers) | NNET (7 layers) | LA | LA + NNET (7 layers) |
|---|---|---|---|---|
| Accuracy | 93.9% | 73.4% | 97.5% | 98.3% |
| Sensitivity | 98.2% | 100% | 99.2% | 99.7% |
| Specificity | 81.7% | 0% | 93.0% | 94.7% |
| Labeled Obs | 500 | 500 | 500 | 500 |
| Unlabeled Obs | 100K | 100K | 100K | 100K |

Table 4 shows that a good neural network model cannot be trained because it fails to provide a good classification. Compared to using only master labeling application 222 and local labeling application 312, using labeled dataset 228 computed by master labeling application 222 and local labeling application 312 input to the NNET with seven layers achieves overall the best performance in accuracy (3.1% better) and specificity (12.5% better).

From the results shown in Table 5, using labeled dataset 228 computed by master labeling application 222 and local labeling application 312 input to the NNET with seven layers again outperforms the other methods. Compared to using only NNET with three layers, the accuracy is improved by 4.4%, the sensitivity is improved by 1.5%, and the specificity is improved by 13%. These results show that using labeled dataset 228 computed by master labeling application 222 and local labeling application 312 applied to a supervised learning model such as a neural network is a promising solution to address the issue of the labeled data scarcity. The noise introduced in label augmentation can be significantly reduced by further processing.

Data labeling system 100 predicts the label, target variable y, for unlabeled observation vectors in partially labeled dataset 224, where unlabeled observation vectors were not labeled by an expert process or a human. To improve a labeling accuracy while avoiding significant additional cost and processing time required to label a larger segment of partially labeled dataset 224, a most informative set of previously unlabeled data is identified and presented for labeling by a user. The resulting new labels incrementally increase a number of observation vectors in supervised data 226 that are no longer unlabeled in partially labeled dataset 224. The process of labeling the remaining unlabeled observation vectors in partially labeled dataset 224 is repeated.

Data labeling system 100 further supports the improved labeling accuracy performance in a faster manner using the plurality of node devices 300 that perform operations on their portion of the unlabeled observation vectors in partially labeled dataset 224. Supervised data 226 is used at all of the computing devices of the plurality of node devices 300. The portion of the unlabeled observation vectors in partially labeled dataset 224 may be overlapping or non-overlapping with that stored at other node devices of the plurality of node devices 300. Master device 102 combines the information from the plurality of node devices 300 to identify the most informative set of previously unlabeled data and to present them for labeling by a user. The resulting new labels incrementally increase a number of observation vectors in supervised data 226 that are no longer unlabeled in partially labeled dataset 224. Thus, data labeling system 100 also provides improved labeling accuracy in a faster manner using distributed data and processing by the plurality of node devices 300 that is controlled by master device 102 irrespective of whether or not there is overlapping or non-overlapping observation vectors distributed to the plurality of node devices 300.

Supervised learning requires that the target (dependent) variable y be labeled in training data so that a model can be built to predict the label of new unlabeled data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Data labeling system 100 solves this problem by providing a cost effective, accurate, and fast process for labeling unlabeled data so that partially labeled dataset 224 becomes labeled dataset 228, which includes labels for all of the data. Labeled dataset 228 provides observation vectors for training a predictive model that previously would have been discarded resulting in improved models and more accurate predictions as shown in the results presented above.

Implementing some examples of the present disclosure at least in part by using the above-described machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, an Artificial Intelligence (AI) accelerator design, and/or some other machine-learning-specific processor that implements one or more neural networks using semiconductor (e.g., silicon (Si), gallium arsenide (GaAs)) devices.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a label set, wherein the label set defines permissible values for a target variable;
   identify supervised data that includes a labeled subset of a plurality of observation vectors, wherein a value of the permissible values of the target variable is predefined for the labeled subset of the plurality of observation vectors;
   determine a total number of threads that will perform labeling of an unlabeled subset of the plurality of observation vectors, wherein the unlabeled subset of the plurality of observation vectors have not been labeled;
   upload the identified supervised data to each thread of the total number of threads;
   randomly select unlabeled observation vectors from the unlabeled subset of the plurality of observation vectors to allocate to each thread of the total number of threads;
   upload the randomly selected, unlabeled observation vectors to each thread of the total number of threads based on the allocation;
   receive, from each thread of the total number of threads, the value of the target variable for each observation vector of the unlabeled subset of the plurality of observation vectors uploaded to a respective thread, the value of the target variable selected based on a label probability defined by a thread, converged classification matrix that defines the label probability for each permissible value defined in the label set for each observation vector of the unlabeled subset of the plurality of observation vectors uploaded to the respective thread, wherein the thread, converged classification matrix is computed by the respective thread;
   determine the value of the target variable for each observation vector of the unlabeled subset of the plurality of observation vectors based on the value of the target variable received from each thread; and
   output the determined value of the target variable for each observation vector of the plurality of observation vectors to a labeled dataset.

2. The non-transitory computer-readable medium of claim 1, wherein the labeled subset of the plurality of observation vectors is less than one percent of the plurality of observation vectors.

3. The non-transitory computer-readable medium of claim 1, wherein each observation vector defines an image, and the value of the target variable defines an image label determined using the converged classification matrix.

4. The non-transitory computer-readable medium of claim 1, wherein the total number of threads are all controlled by the computing device.

5. The non-transitory computer-readable medium of claim 1, wherein the total number of threads include at least one thread controlled by a different computing device than the computing device.

6. The non-transitory computer-readable medium of claim 1, wherein the total number of threads are all controlled by a different computing device than the computing device.

7. The non-transitory computer-readable medium of claim 1, wherein computing the converged classification matrix by the respective thread comprises computer-readable instructions that further cause the computing device to:
   compute an affinity matrix using a kernel function, the identified supervised data, and the randomly selected, unlabeled observation vectors allocated to the respective thread;
   compute a diagonal matrix by summing each row of the computed affinity matrix, wherein the sum of each row is stored in a diagonal of the row with zeroes in remaining positions of the row;
   compute a normalized distance matrix using the computed affinity matrix and the computed diagonal matrix; and define a label matrix using the value of the target variable of each observation vector of the randomly selected, unlabeled observation vectors allocated to the respective thread.

8. The non-transitory computer-readable medium of claim 7, wherein the converged classification matrix is initialized as the defined label matrix.

9. The non-transitory computer-readable medium of claim 8, wherein the converged classification matrix is converged using $F(t+1)=\alpha SF(t)+(1-\alpha)Y$, where $F(t+1)$ is a next classification matrix, $\alpha$ is a relative weighting value, S is the normalized distance matrix, $F(t)$ is the classification matrix, Y is the label matrix, and t is an iteration number.

10. The non-transitory computer-readable medium of claim 9, wherein the classification matrix is converged when a second predefined number of iterations of computations of $F(t+1)=\alpha SF(t)+(1-\alpha)Y$ is complete.

11. The non-transitory computer-readable medium of claim 7, wherein the kernel function is a Gaussian kernel function.

12. The non-transitory computer-readable medium of claim 7, wherein the affinity matrix is defined as $$W_{ij} = \exp\frac{-\|x_i - x_j\|^2}{2s^2}$$

if $i \neq j$ and $W_{ii}=0$, where s is a Gaussian bandwidth parameter, x is an observation vector of the randomly selected, unlabeled observation vectors allocated to the respective thread, $i=1, \ldots, n$, $j=1, \ldots, n$, and n is a number of vectors of the randomly selected, unlabeled observation vectors allocated to the respective thread.

13. The non-transitory computer-readable medium of claim 7, wherein the diagonal matrix is defined as $D_{ii}=\Sigma_{j=1}^{n}W_{ij}$ and $D_{ij}=0$ if $i \neq j$, where W is the computed affinity matrix, $i=1, \ldots, n$, and n is a number of vectors of the randomly selected, unlabeled observation vectors allocated to the respective thread.

14. The non-transitory computer-readable medium of claim 7, wherein the normalized distance matrix is defined as $S=D^{-1/2}WD^{-1/2}$, where W is the computed affinity matrix and D is the computed diagonal matrix.

15. The non-transitory computer-readable medium of claim 7, wherein the label matrix is defined as $Y_{ik}=1$ if $x_i$ is labeled as $y_i=k$; otherwise, $Y_{ik}=0$, where $x_i$ is an observation vector of the randomly selected, unlabeled observation vectors allocated to the respective thread, $i=1, \ldots, n$, n is a number of vectors of the randomly selected, unlabeled observation vectors allocated to the respective thread, $k=1, \ldots, c$, and c is a number of permissible values of the label set.

16. The non-transitory computer-readable medium of claim 1, comprising computer-readable instructions that further cause the computing device to train a predictive model with the labeled dataset.

17. The non-transitory computer-readable medium of claim 1, comprising computer-readable instructions that further cause the computing device to:
divide the labeled dataset into a training dataset and a validation dataset;
train a predictive model with the training dataset; and
validate the trained predictive model with the validation dataset.

18. The non-transitory computer-readable medium of claim 17, comprising computer-readable instructions that further cause the computing device to:
receive an indicator of a dataset that includes a second plurality of observation vectors, wherein the value of the permissible values of the target variable is not defined for the second plurality of observation vectors; and
execute the validated predictive model with each observation vector of the second plurality of observation vectors to predict the value of the target variable.

19. A non-transitory computer-readable medium having stored thereon computer-readable instructions that when executed by a computing device cause the computing device to:
read a label set, wherein the label set defines permissible values for a target variable;
identify supervised data that includes a labeled subset of a plurality of observation vectors, wherein a value of the permissible values of the target variable is predefined for the labeled subset of the plurality of observation vectors;
determine a total number of threads that will perform labeling of an unlabeled subset of the plurality of observation vectors, wherein the unlabeled subset of the plurality of observation vectors have not been labeled;
upload the identified supervised data to each thread of the total number of threads;
randomly select unlabeled observation vectors from the unlabeled subset of the plurality of observation vectors to allocate to each thread of the total number of threads;
upload the randomly selected, unlabeled observation vectors to each thread of the total number of threads based on the allocation;
receive, from each thread of the total number of threads, the value of the target variable for each observation vector of the unlabeled subset of the plurality of observation vectors uploaded to a respective thread, the value of the target variable selected based on a label probability defined by a thread, converged classification matrix that defines the label probability for each permissible value defined in the label set for each observation vector of the unlabeled subset of the plurality of observation vectors uploaded to the respective thread, wherein the thread, converged classification matrix is computed by the respective thread;
identify overlapping observation vectors of the unlabeled subset of the plurality of observation vectors, wherein an overlapping observation vector of the overlapping observation vectors includes a plurality of received values of the target variable;
for each overlapping observation vector of the identified overlapping observation vectors,
compute a number of times each permissible value defined in the label set is received for a respective overlapping observation vector; and
select the value of the target variable associated with a maximum value of the computed number of times for the respective overlapping observation vector;
determine the value of the target variable for each overlapping observation vector of the identified overlapping observation vectors based on the selected value;
determine the value of the target variable for each non-overlapping observation vector of the unlabeled subset of the plurality of observation vectors based on the received value; and output the determined value of the target variable for each observation vector of the plurality of observation vectors to a labeled dataset.

20. A non-transitory computer-readable medium having stored thereon computer-readable instructions that when executed by a computing device cause the computing device to:
  read a label set, wherein the label set defines permissible values for a target variable;
  identify supervised data that includes a labeled subset of a plurality of observation vectors, wherein a value of the permissible values of the target variable is predefined for the labeled subset of the plurality of observation vectors;
  determine a total number of threads that will perform labeling of an unlabeled subset of the plurality of observation vectors, wherein the unlabeled subset of the plurality of observation vectors have not been labeled;
  upload the identified supervised data to each thread of the total number of threads;
  randomly select unlabeled observation vectors from the unlabeled subset of the plurality of observation vectors to allocate to each thread of the total number of threads;
  upload the randomly selected, unlabeled observation vectors to each thread of the total number of threads based on the allocation;
  (a) receive, from a thread of the total number of threads, a thread converged classification matrix, wherein the thread converged classification matrix defines a label probability for each permissible value defined in the label set for each observation vector of the unlabeled subset of the plurality of observation vectors uploaded to the thread, wherein the thread, converged classification matrix is computed by the thread;
  (b) select the value of the target variable associated with a maximum label probability value identified from the received, thread converged classification matrix;
  repeat (a) and (b) with each thread of the total number of threads as the thread;
  determine the value of the target variable for each observation vector of the unlabeled subset of the plurality of observation vectors based on the selected value of the target variable; and
  output the determined value of the target variable for each observation vector of the plurality of observation vectors to a labeled dataset.

21. The non-transitory computer-readable medium of claim 20, wherein before determining the value of the target variable the computer-readable instructions further cause the computing device to:
  combine the thread converged classification matrix received from each thread into a combined, converged classification matrix, wherein the combined, converged classification matrix also includes the identified supervised data;
  (c) compute a distance matrix that defines a distance value between each pair of the plurality of observation vectors using a distance function and the combined, converged classification matrix;
  (d) select a number of observation vectors from the computed distance matrix that have minimum values for the distance value;
  (e) request that a human provide a label for each of the selected observation vectors;
  receive a response from the human to the request for each of the selected observation vectors;
  (g) update the identified supervised data to include the received response as the value of the target variable for each of the selected observation vectors;
  (h) remove the selected observation vectors from the unlabeled subset of the plurality of observation vectors;
  (i) randomly select second unlabeled observation vectors from the unlabeled subset of the plurality of observation vectors to allocate to each thread of the total number of threads;
  (j) upload the randomly selected, second unlabeled observation vectors to each thread of the total number of threads based on the second allocation;
  (k) receive from each thread of the total number of threads, a second thread converged classification matrix computed as a result of the uploaded randomly selected, second unlabeled observation vectors; and
  (l) combine the second thread converged classification matrix received from each thread into a second combined, converged classification matrix, wherein the combined, converged classification matrix is replaced with the second combined, converged classification matrix;
  repeat (c) to (l) a predefined number of times; and
  select the value of the target variable associated with a maximum label probability value identified from the combined, converged classification matrix.

22. The non-transitory computer-readable medium of claim 16, wherein the distance function is based on a Kullback-Leibler divergence computation.

23. A non-transitory computer-readable medium having stored thereon computer-readable instructions that when executed by a computing device cause the computing device to:
  read a label set, wherein the label set defines permissible values for a target variable;
  identify supervised data that includes a labeled subset of a plurality of observation vectors, wherein a value of the permissible values of the target variable is predefined for the labeled subset of the plurality of observation vectors;
  determine a total number of threads that will perform labeling of an unlabeled subset of the plurality of observation vectors, wherein the unlabeled subset of the plurality of observation vectors have not been labeled;
  upload the identified supervised data to each thread of the total number of threads;
  randomly select unlabeled observation vectors from the unlabeled subset of the plurality of observation vectors to allocate to each thread of the total number of threads;
  upload the randomly selected, unlabeled observation vectors to each thread of the total number of threads based on the allocation;
  (a) receive, from a thread of the total number of threads, a converged classification matrix, wherein the converged classification matrix defines a label probability for each permissible value defined in the label set for each observation vector of the unlabeled subset of the plurality of observation vectors uploaded to the thread, wherein the converged classification matrix is computed by the thread;
  (b) select the value of the target variable associated with a maximum label probability value identified from the received, converged classification matrix;
  repeat (a) and (b) with each thread of the total number of threads as the thread;

identify overlapping observation vectors of the unlabeled subset of the plurality of observation vectors, wherein an overlapping observation vector of the overlapping observation vectors includes a plurality of selected values of the target variable;

for each overlapping observation vector of the identified overlapping observation vectors,
compute a number of times each permissible value defined in the label set is selected in (b) for a respective overlapping observation vector; and (c) select the value of the target variable associated with a maximum value of the computed number of times for the respective overlapping observation vector;

determine the value of the target variable for each overlapping observation vector of the identified overlapping observation vectors based on the value selected in (c);

determine the value of the target variable for each non-overlapping observation vector of the unlabeled subset of the plurality of observation vectors based on the value selected in (b) for a respective non-overlapping observation vector; and output the determined value of the target variable for each observation vector of the plurality of observation vectors to a labeled dataset.

24. A non-transitory computer-readable medium having stored thereon computer-readable instructions that when executed by a computing device cause the computing device to:

read a label set, wherein the label set defines permissible values for a target variable;

identify supervised data that includes a labeled subset of a plurality of observation vectors, wherein a value of the permissible values of the target variable is pre-defined for the labeled subset of the plurality of observation vectors;

determine a total number of threads that will perform labeling of an unlabeled subset of the plurality of observation vectors, wherein the unlabeled subset of the plurality of observation vectors have not been labeled;

upload the identified supervised data to each thread of the total number of threads;

randomly select unlabeled observation vectors from the unlabeled subset of the plurality of observation vectors to allocate to each thread of the total number of threads;

upload the randomly selected, unlabeled observation vectors to each thread of the total number of threads based on the allocation;

(a) receive, from each thread of the total number of threads, a thread classification matrix, wherein the thread classification matrix defines a label probability for each permissible value defined in the label set for each observation vector of the unlabeled subset of the plurality of observation vectors uploaded to a respective thread, wherein the classification matrix is computed by the respective thread;

(b) identify overlapping observation vectors of the unlabeled subset of the plurality of observation vectors, wherein an overlapping observation vector of the overlapping observation vectors includes a plurality of selected values of the target variable;

(c) for each thread of the total number of threads as a current thread,
select overlapping observation vectors included in the thread classification matrix received from the current thread;

create a copy of overlapping observation vectors included in the thread classification matrix received from a next thread relative to the current thread;

remove the overlapping observation vectors from the thread classification matrix received from the next thread; and add the selected overlapping observation vectors to update the thread classification matrix received from the next thread;

(d) upload the updated thread classification matrices to each respective thread of the total number of threads;

repeat (a) to (d) until the thread classification matrix received from each thread is a thread, converged classification matrix;

combine the received, thread converged classification matrix from each thread into a combined, converged classification matrix;

(e) select the value of the target variable associated with a maximum label probability value identified from the combined, converged classification matrix;

for each overlapping observation vector of the identified overlapping observation vectors,
compute a number of times each permissible value defined in the label set is selected in (e) for a respective overlapping observation vector; and (f) select the value of the target variable associated with a maximum value of the computed number of times for the respective overlapping observation vector;

determine the value of the target variable for each overlapping observation vector of the identified overlapping observation vectors based on the value selected in (f);

determine the value of the target variable for each non-overlapping observation vector of the unlabeled subset of the plurality of observation vectors based on the value selected in (e) for a respective non-overlapping observation vector; and output the determined value of the target variable for each observation vector of the plurality of observation vectors to a labeled dataset.

25. A computing device comprising:
a processor; and
a non-transitory computer-readable medium operably coupled to the processor, the computer-readable medium having computer-readable instructions stored thereon that, when executed by the processor, cause the computing device to
read a label set, wherein the label set defines permissible values for a target variable;
identify supervised data that includes a labeled subset of a plurality of observation vectors, wherein a value of the permissible values of the target variable is pre-defined for the labeled subset of the plurality of observation vectors;
determine a total number of threads that will perform labeling of an unlabeled subset of the plurality of observation vectors, wherein the unlabeled subset of the plurality of observation vectors have not been labeled;
upload the identified supervised data to each thread of the total number of threads;
randomly select unlabeled observation vectors from the unlabeled subset of the plurality of observation vectors to allocate to each thread of the total number of threads;
upload the randomly selected, unlabeled observation vectors to each thread of the total number of threads based on the allocation;

receive, from each thread of the total number of threads, the value of the target variable for each observation vector of the unlabeled subset of the plurality of observation vectors uploaded to a respective thread, the value of the target variable selected based on a label probability defined by a thread, converged classification matrix that defines the label probability for each permissible value defined in the label set for each observation vector of the unlabeled subset of the plurality of observation vectors uploaded to the respective thread, wherein the thread, converged classification matrix is computed by the respective thread;

determine the value of the target variable for each observation vector of the unlabeled subset of the plurality of observation vectors based on the value of the target variable received from each thread; and output the determined value of the target variable for each observation vector of the plurality of observation vectors to a labeled dataset.

26. A method of predicting occurrence of an event or classifying an object using semi-supervised data to label unlabeled data in a dataset, the method comprising:

reading, by a computing device, a label set, wherein the label set defines permissible values for a target variable;

identifying, by the computing device, supervised data that includes a labeled subset of a plurality of observation vectors, wherein a value of the permissible values of the target variable is pre-defined for the labeled subset of the plurality of observation vectors;

determining, by the computing device, a total number of threads that will perform labeling of an unlabeled subset of the plurality of observation vectors, wherein the unlabeled subset of the plurality of observation vectors have not been labeled;

uploading, by the computing device, the identified supervised data to each thread of the total number of threads;

randomly selecting, by the computing device, unlabeled observation vectors from the unlabeled subset of the plurality of observation vectors to allocate to each thread of the total number of threads;

uploading, by the computing device, the randomly selected, unlabeled observation vectors to each thread of the total number of threads based on the allocation;

receiving, from each thread of the total number of threads, the value of the target variable for each observation vector of the unlabeled subset of the plurality of observation vectors uploaded to a respective thread, the value of the target variable selected based on a label probability defined by a thread, converged classification matrix that defines the label probability for each permissible value defined in the label set for each observation vector of the unlabeled subset of the plurality of observation vectors uploaded to the respective thread, wherein the thread, converged classification matrix is computed by the respective thread;

determining, by the computing device, the value of the target variable for each observation vector of the unlabeled subset of the plurality of observation vectors based on the value of the target variable received from each thread; and outputting, by the computing device, the determined value of the target variable for each observation vector of the plurality of observation vectors to a labeled dataset.

27. A method of predicting occurrence of an event or classifying an object using semi-supervised data to label unlabeled data in a dataset, the method comprising:

reading, by a computing device, a label set, wherein the label set defines permissible values for a target variable;

identifying, by the computing device, supervised data that includes a labeled subset of a plurality of observation vectors, wherein a value of the permissible values of the target variable is pre-defined for the labeled subset of the plurality of observation vectors;

determining, by the computing device, a total number of threads that will perform labeling of an unlabeled subset of the plurality of observation vectors, wherein the unlabeled subset of the plurality of observation vectors have not been labeled;

uploading, by the computing device, the identified supervised data to each thread of the total number of threads;

randomly selecting, by the computing device, unlabeled observation vectors from the unlabeled subset of the plurality of observation vectors to allocate to each thread of the total number of threads;

uploading, by the computing device, the randomly selected, unlabeled observation vectors to each thread of the total number of threads based on the allocation;

receiving, from each thread of the total number of threads, the value of the target variable for each observation vector of the unlabeled subset of the plurality of observation vectors uploaded to a respective thread, the value of the target variable selected based on a label probability defined by a thread, converged classification matrix that defines the label probability for each permissible value defined in the label set for each observation vector of the unlabeled subset of the plurality of observation vectors uploaded to the respective thread, wherein the thread, converged classification matrix is computed by the respective thread;

identifying, by the computing device, overlapping observation vectors of the unlabeled subset of the plurality of observation vectors, wherein an overlapping observation vector of the overlapping observation vectors includes a plurality of received values of the target variable;

for each overlapping observation vector of the identified overlapping observation vectors,
  computing, by the computing device, a number of times each permissible value defined in the label set is received for a respective overlapping observation vector; and
  selecting, by the computing device, the value of the target variable associated with a maximum value of the computed number of times for the respective overlapping observation vector;

determining, by the computing device, the value of the target variable for each overlapping observation vector of the identified overlapping observation vectors based on the selected value;

determining, by the computing device, the value of the target variable for each non-overlapping observation vector of the unlabeled subset of the plurality of observation vectors based on the received value; and outputting, by the computing device, the determined value of the target variable for each observation vector of the plurality of observation vectors to a labeled dataset.

28. A method of predicting occurrence of an event or classifying an object using semi-supervised data to label unlabeled data in a dataset, the method comprising:

reading, by a computing device, a label set, wherein the label set defines permissible values for a target variable;

identifying, by the computing device, supervised data that includes a labeled subset of a plurality of observation vectors, wherein a value of the permissible values of the target variable is pre-defined for the labeled subset of the plurality of observation vectors;

determining, by the computing device, a total number of threads that will perform labeling of an unlabeled subset of the plurality of observation vectors, wherein the unlabeled subset of the plurality of observation vectors have not been labeled;

uploading, by the computing device, the identified supervised data to each thread of the total number of threads;

randomly selecting, by the computing device, unlabeled observation vectors from the unlabeled subset of the plurality of observation vectors to allocate to each thread of the total number of threads;

uploading, by the computing device, the randomly selected, unlabeled observation vectors to each thread of the total number of threads based on the allocation;

(a) receiving, from a thread of the total number of threads, a thread converged classification matrix, wherein the thread converged classification matrix defines a label probability for each permissible value defined in the label set for each observation vector of the unlabeled subset of the plurality of observation vectors uploaded to the thread, wherein the thread, converged classification matrix is computed by the thread;

(b) selecting, by the computing device, the value of the target variable associated with a maximum label probability value identified from the received, thread converged classification matrix;

repeating (a) and (b), by the computing device, with each thread of the total number of threads as the thread;

determining, by the computing device, the value of the target variable for each observation vector of the unlabeled subset of the plurality of observation vectors based on the selected value of the target variable; and outputting, by the computing device, the determined value of the target variable for each observation vector of the plurality of observation vectors to a labeled dataset.

29. A method of predicting occurrence of an event or classifying an object using semi-supervised data to label unlabeled data in a dataset, the method comprising:

reading, by a computing device, a label set, wherein the label set defines permissible values for a target variable;

identifying, by the computing device, supervised data that includes a labeled subset of a plurality of observation vectors, wherein a value of the permissible values of the target variable is pre-defined for the labeled subset of the plurality of observation vectors;

determining, by the computing device, a total number of threads that will perform labeling of an unlabeled subset of the plurality of observation vectors, wherein the unlabeled subset of the plurality of observation vectors have not been labeled;

uploading, by the computing device, the identified supervised data to each thread of the total number of threads;

randomly selecting, by the computing device, unlabeled observation vectors from the unlabeled subset of the plurality of observation vectors to allocate to each thread of the total number of threads;

uploading, by the computing device, the randomly selected, unlabeled observation vectors to each thread of the total number of threads based on the allocation;

(a) receiving, from a thread of the total number of threads, a converged classification matrix, wherein the converged classification matrix defines a label probability for each permissible value defined in the label set for each observation vector of the unlabeled subset of the plurality of observation vectors uploaded to the thread, wherein the converged classification matrix is computed by the thread;

(b) selecting, by the computing device, the value of the target variable associated with a maximum label probability value identified from the received, converged classification matrix;

repeating (a) and (b), by the computing device, with each thread of the total number of threads as the thread;

identifying, by the computing device, overlapping observation vectors of the unlabeled subset of the plurality of observation vectors, wherein an overlapping observation vector of the overlapping observation vectors includes a plurality of selected values of the target variable;

for each overlapping observation vector of the identified overlapping observation vectors,
  computing, by the computing device, a number of times each permissible value defined in the label set is selected in (b) for a respective overlapping observation vector; and
  (c) selecting, by the computing device, the value of the target variable associated with a maximum value of the computed number of times for the respective overlapping observation vector;

determining, by the computing device, the value of the target variable for each overlapping observation vector of the identified overlapping observation vectors based on the value selected in (c);

determining, by the computing device, the value of the target variable for each non-overlapping observation vector of the unlabeled subset of the plurality of observation vectors based on the value selected in (b) for a respective non-overlapping observation vector; and outputting, by the computing device, the determined value of the target variable for each observation vector of the plurality of observation vectors to a labeled dataset.

* * * * *

UNITED STATES PATENT AND TRADEMARK OFFICE
CERTIFICATE OF CORRECTION

PATENT NO. : 10,127,477 B2
APPLICATION NO. : 15/686863
DATED : November 13, 2018
INVENTOR(S) : Xu Chen et al.

It is certified that error appears in the above-identified patent and that said Letters Patent is hereby corrected as shown below:

In the Specification

Column 17, Line 41:
Delete the phrase "$D_{ii} = \Sigma_{j=1}{}^{n_p} W_{ij}$" and replace with --$D_{ii} = \Sigma_{j=1}^{n_p} W_{ij}$--.

Column 20, Line 43:
Delete the phrase "$D_{ii} = \Sigma_{j=1}^{n} W_{ij}$" and replace with --$D_{ii} = \Sigma_{j=1}^{n} W_{ij}$--.

Column 21, Line 28:
Delete the phrase "convergence test value that is the number of iterations K" and replace with --convergence test value that is the number of iterations $M_L$.--.

Column 34, Line 37:
Delete the phrase "value α, where $a$ is selected between zero and one," and replace with --value α, where $α$ is selected between zero and one,--.

In the Claims

Claim 13, Column 47, Line 38:
Delete the phrase "$D_{ii} = \Sigma_{j=1}^{n} W_{ij}$" and replace with --$D_{ii} = \Sigma_{j=1}^{n} W_{ij}$--.

Claim 22, Column 50, Line 28-29:
Delete the phrase "The non-transitory computer-readable medium of claim 16," and replace with --The non-transitory computer-readable medium of claim 21--.

Signed and Sealed this
Twenty-ninth Day of January, 2019

Andrei Iancu
*Director of the United States Patent and Trademark Office*